(12) United States Patent
Segal

(10) Patent No.: US 10,911,716 B2
(45) Date of Patent: Feb. 2, 2021

(54) SYSTEM AND METHOD FOR INTERACTIVE VIDEO CONFERENCING

(71) Applicant: Touchcast LLC, New York, NY (US)

(72) Inventor: Edo Segal, New York, NY (US)

(73) Assignee: TOUCHCAST LLC, New York, NY (US)

( * ) Notice: Subject to any disclaimer, the term of this patent is extended or adjusted under 35 U.S.C. 154(b) by 0 days.

(21) Appl. No.: 16/508,058

(22) Filed: Jul. 10, 2019

(65) Prior Publication Data

US 2019/0394425 A1    Dec. 26, 2019

Related U.S. Application Data

(63) Continuation of application No. 16/134,638, filed on Sep. 18, 2018, now Pat. No. 10,356,363, and a
(Continued)

(51) Int. Cl.
*H04N 7/15*          (2006.01)
*H04N 5/222*         (2006.01)
(Continued)

(52) U.S. Cl.
CPC ............ *H04N 7/15* (2013.01); *G06F 3/0482* (2013.01); *G06F 3/0488* (2013.01); *G11B 27/031* (2013.01); *H04N 5/2222* (2013.01); *H04N 21/4223* (2013.01); *H04N 21/42203* (2013.01); *H04N 21/4316* (2013.01); *H04N 21/47* (2013.01); *H04N 21/4722* (2013.01);
(Continued)

(58) Field of Classification Search
USPC ...................................... 348/14.08
See application file for complete search history.

(56) References Cited

U.S. PATENT DOCUMENTS 6,020,931 A    2/2000 Bilbrey et al.
7,577,978 B1   8/2009 Wistendahl et al.
(Continued)

FOREIGN PATENT DOCUMENTS

EP    2262167    12/2010
GB    2 502 986  12/2013
(Continued)

*Primary Examiner* — Amal S Zenati
(74) *Attorney, Agent, or Firm* — Leason Ellis LLP

(57) ABSTRACT

Respectively customizable interactive audio/video content is provided to each of a plurality of computing devices during a networked communication session. At least some of the computing devices capture audio video content via a microphone and camera respectively operable with each of the at least some of the computing devices. Further, the at least one processor is configured to receive, from each of the at least some of the computing devices, the respective audio and video content. The at least one processor is configured to generate a composited interactive audio/video feed including at least one of the audio and video content received from each of the at least some computing devices during the networked communication session. Moreover, the at least one processor is configured to transmit to each of the plurality of computing devices during the networked communication session the composited interactive audio/video feed.

16 Claims, 43 Drawing Sheets

Related U.S. Application Data continuation-in-part of application No. 15/683,403, filed on Aug. 22, 2017, now Pat. No. 10,033,967, which is a continuation of application No. 15/247,534, filed on Aug. 25, 2016, now Pat. No. 9,787,945, and a continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448.

(60) Provisional application No. 62/559,972, filed on Sep. 18, 2017, provisional application No. 62/565,094, filed on Sep. 28, 2017, provisional application No. 62/209,727, filed on Aug. 25, 2015, provisional application No. 62/242,029, filed on Oct. 15, 2015, provisional application No. 62/329,081, filed on Apr. 28, 2016, provisional application No. 61/839,757, filed on Jun. 26, 2013, provisional application No. 61/845,743, filed on Jul. 12, 2013.

(51) Int. Cl.

| | | |
|---|---|---|
| *H04N 21/47* | (2011.01) | |
| *G06F 3/0482* | (2013.01) | |
| *H04N 21/6587* | (2011.01) | |
| *H04N 21/4788* | (2011.01) | |
| *H04N 21/4782* | (2011.01) | |
| *H04N 21/4722* | (2011.01) | |
| *H04N 21/431* | (2011.01) | |
| *G11B 27/031* | (2006.01) | |
| *G06F 3/0488* | (2013.01) | |
| *H04N 21/422* | (2011.01) | |
| *H04N 21/4223* | (2011.01) | |
| *G06F 3/16* | (2006.01) | |
| *H04N 7/14* | (2006.01) | |
| *H04N 21/478* | (2011.01) | |

(52) U.S. Cl.
CPC ..... *H04N 21/4782* (2013.01); *H04N 21/4788* (2013.01); *H04N 21/6587* (2013.01); *G06F 3/04883* (2013.01); *G06F 3/167* (2013.01); *H04N 7/147* (2013.01); *H04N 21/478* (2013.01)

(56) References Cited

U.S. PATENT DOCUMENTS

| | | |
|---|---|---|
| 8,508,614 B2 | 8/2013 | Segal |
| 8,584,164 B2 | 11/2013 | Walter et al. |
| 8,745,657 B2 | 6/2014 | Chalozin et al. |
| 9,036,043 B2 | 5/2015 | Segal |
| 9,363,448 B2 | 6/2016 | Segal |
| 9,661,256 B2 | 5/2017 | Segal |
| 9,787,945 B2 | 10/2017 | Segal |
| 10,033,967 B2 | 7/2018 | Segal et al. |
| 10,356,363 B2 | 7/2019 | Segal |
| 2001/0006382 A1 | 7/2001 | Sevat |
| 2002/0186233 A1 | 12/2002 | Holtz et al. |
| 2004/0015398 A1 | 1/2004 | Hayward |
| 2005/0137958 A1 | 6/2005 | Huber et al. |
| 2005/0204438 A1 | 9/2005 | Wang |
| 2006/0075668 A1 | 4/2006 | Sauer |
| 2006/0206562 A1 | 9/2006 | Callegari |
| 2007/0089134 A1 | 4/2007 | Stearns |
| 2007/0266322 A1 | 11/2007 | Tretter |
| 2008/0033806 A1 | 2/2008 | Howe |
| 2008/0068448 A1 | 3/2008 | Hansen |
| 2008/0096175 A1 | 4/2008 | Du Toit et al. |
| 2008/0109300 A1 | 5/2008 | Bason |
| 2008/0150913 A1 | 6/2008 | Bell et al. |
| 2008/0218584 A1 | 9/2008 | Matsumoto et al. |
| 2009/0066690 A1 | 3/2009 | Harrison |
| 2009/0153804 A1 | 6/2009 | Giraldo et al. |
| 2009/0237565 A1 | 9/2009 | Staker et al. |
| 2010/0083191 A1 | 4/2010 | Marshall |
| 2010/0174783 A1 | 7/2010 | Zarom |
| 2010/0333004 A1* | 12/2010 | Kristiansen ............ H04N 7/152 715/765 |
| 2011/0161990 A1 | 6/2011 | Smith |
| 2011/0202827 A1 | 8/2011 | Freishtat |
| 2011/0249075 A1 | 10/2011 | Abuan et al. |
| 2011/0254912 A1* | 10/2011 | Mock .................. H04L 12/1818 348/14.03 |
| 2011/0298935 A1 | 12/2011 | Segal |
| 2012/0158524 A1 | 6/2012 | Hintz |
| 2012/0206562 A1* | 8/2012 | Yang .................. H04L 12/1813 348/14.09 |
| 2012/0212571 A1 | 8/2012 | Wang et al. |
| 2013/0031593 A1 | 1/2013 | Booth |
| 2013/0073985 A1 | 3/2013 | Hamlin et al. |
| 2013/0117129 A1 | 5/2013 | Brown et al. |
| 2013/0155187 A1 | 6/2013 | Skyberg |
| 2013/0173355 A1 | 7/2013 | Barcenas |
| 2013/0212615 A1 | 8/2013 | Schultz |
| 2013/0312041 A1* | 11/2013 | Gresta ................ H04N 7/17318 725/61 |
| 2014/0002581 A1 | 1/2014 | Bear et al. |
| 2014/0132702 A1 | 5/2014 | Leibovich et al. |
| 2014/0215542 A1 | 7/2014 | Terpe |
| 2015/0121250 A1 | 4/2015 | Waxman et al. |
| 2015/0149930 A1 | 5/2015 | Walkin et al. |
| 2016/0080835 A1* | 3/2016 | von Sneidern .. H04N 21/44008 386/282 |
| 2017/0353695 A1 | 12/2017 | Segal et al. |
| 2018/0150985 A1 | 5/2018 | McDonald |

FOREIGN PATENT DOCUMENTS

| | | |
|---|---|---|
| WO | WO 2006/021444 | 3/2006 |
| WO | WO 2010/141939 | 12/2010 |
| WO | WO 2012/139082 | 10/2012 |
| WO | WO 2013/076478 | 5/2013 |
| WO | WO 2013/167901 | 11/2013 |

\* cited by examiner

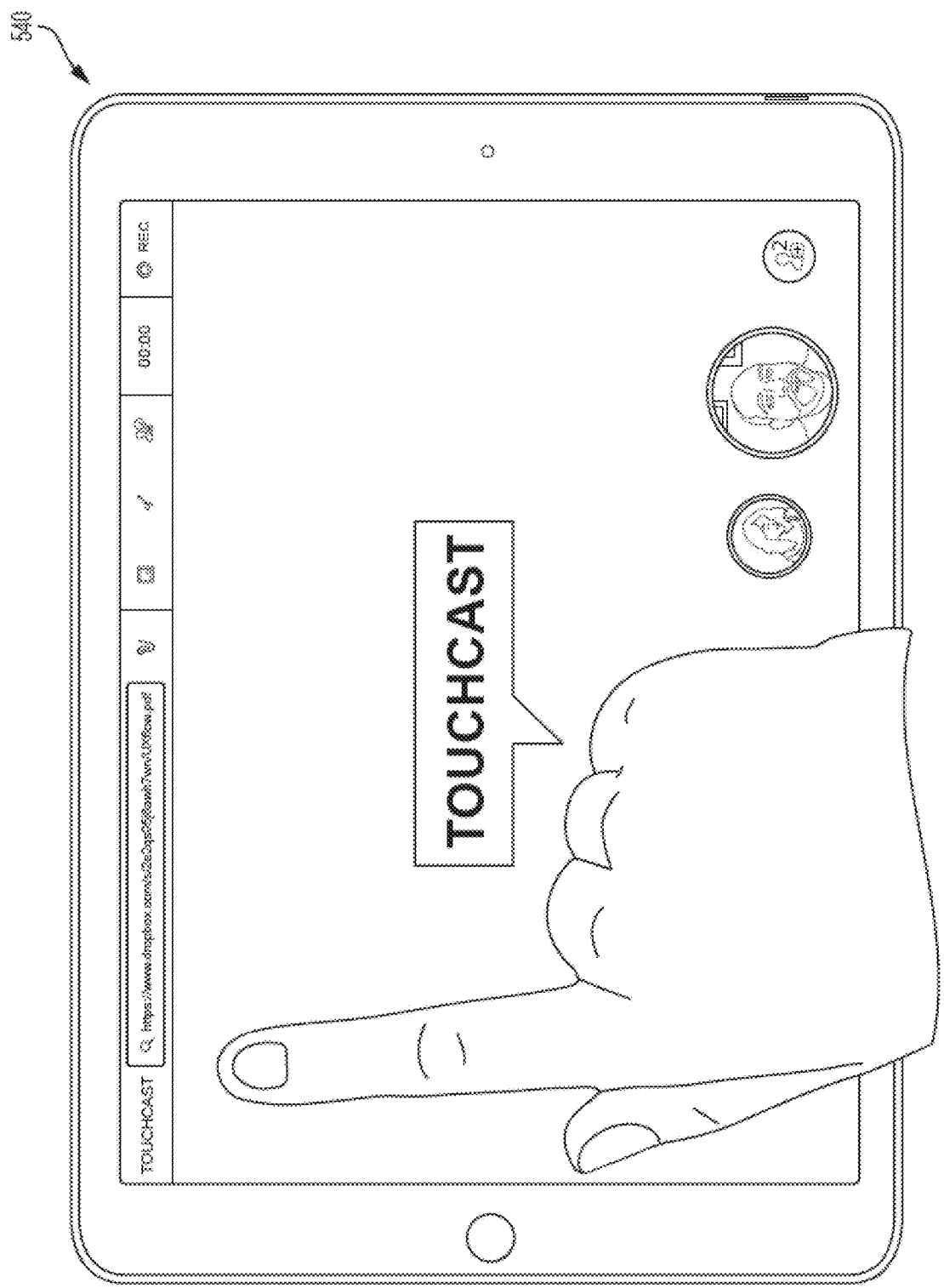

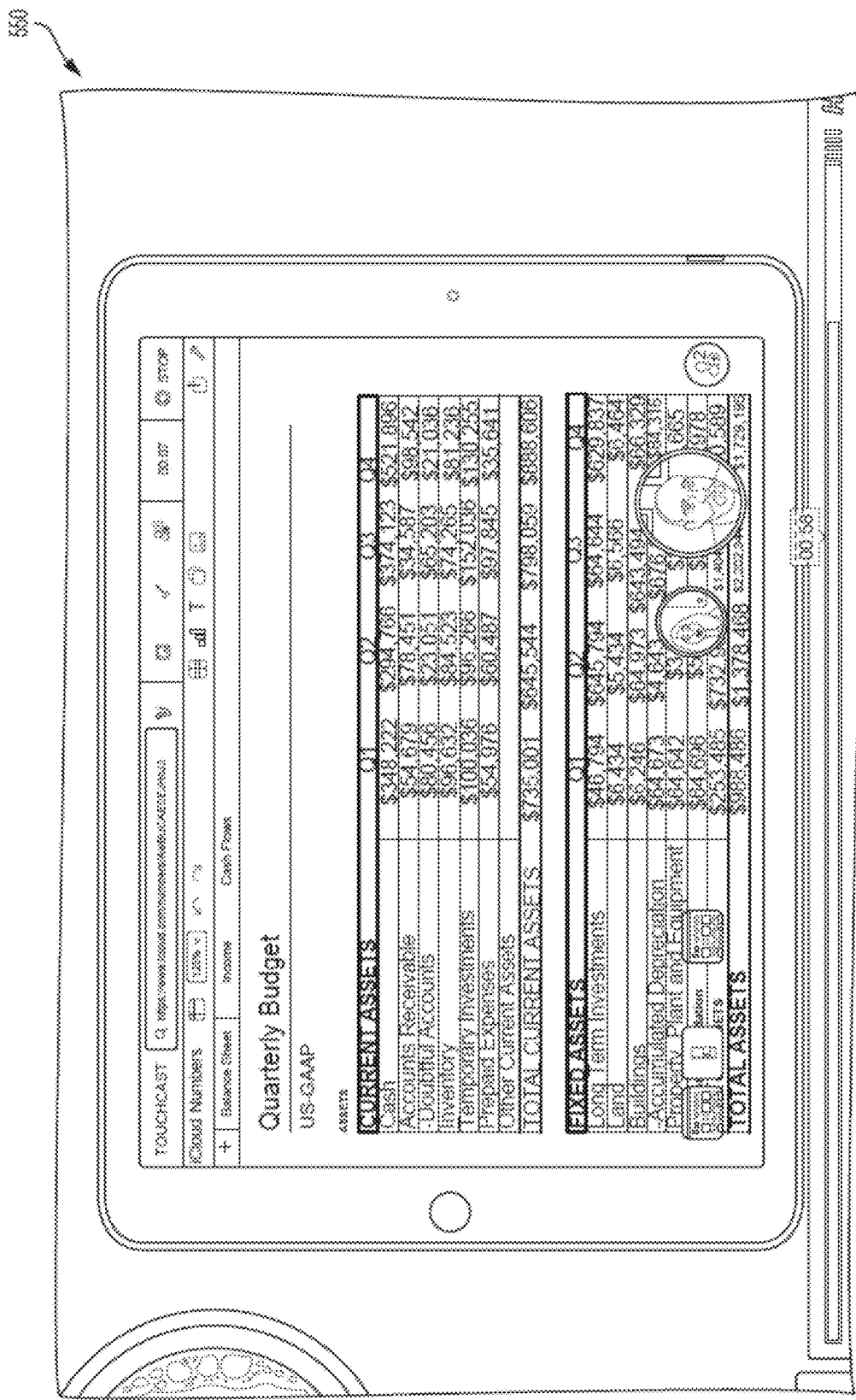

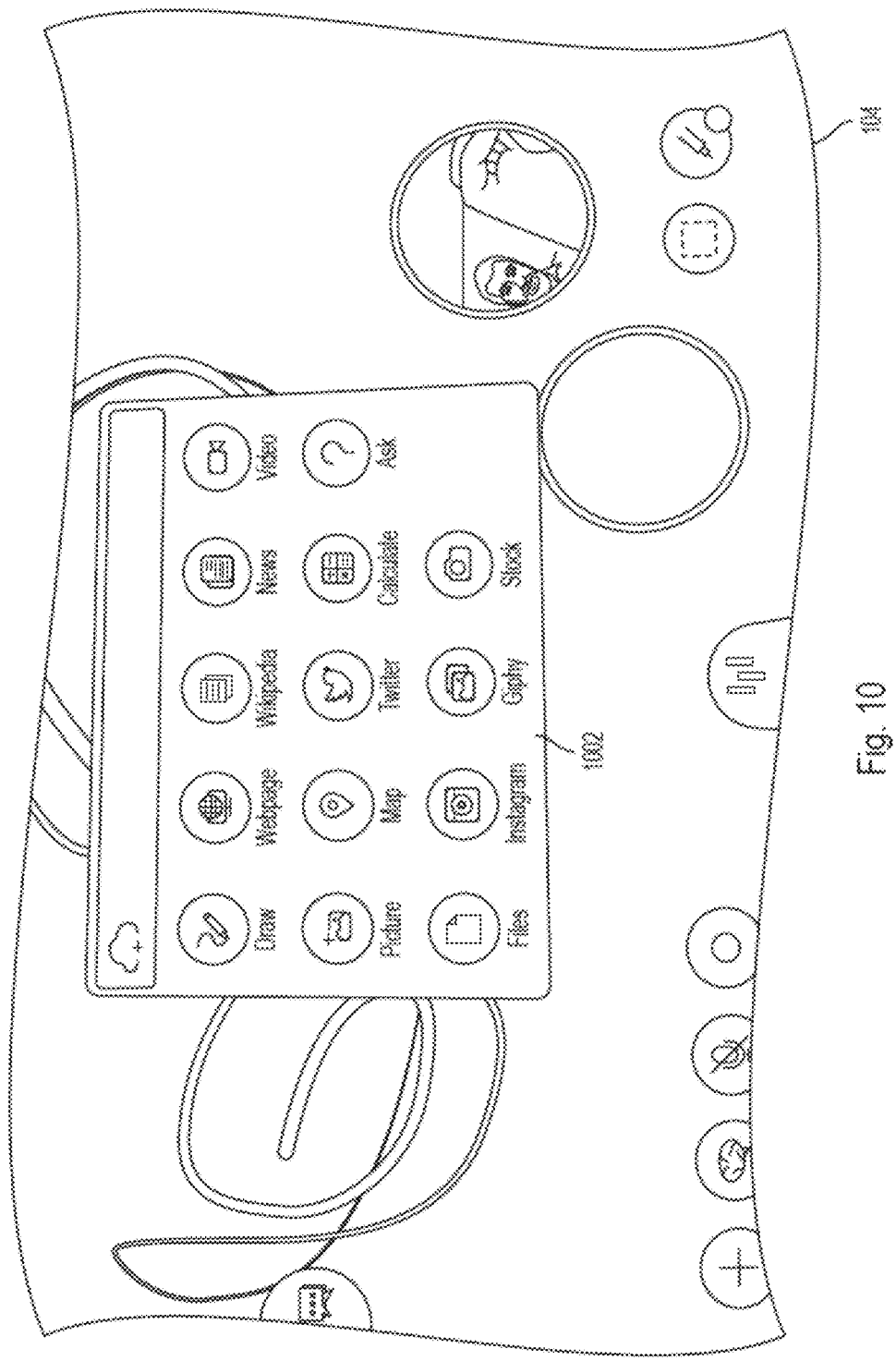

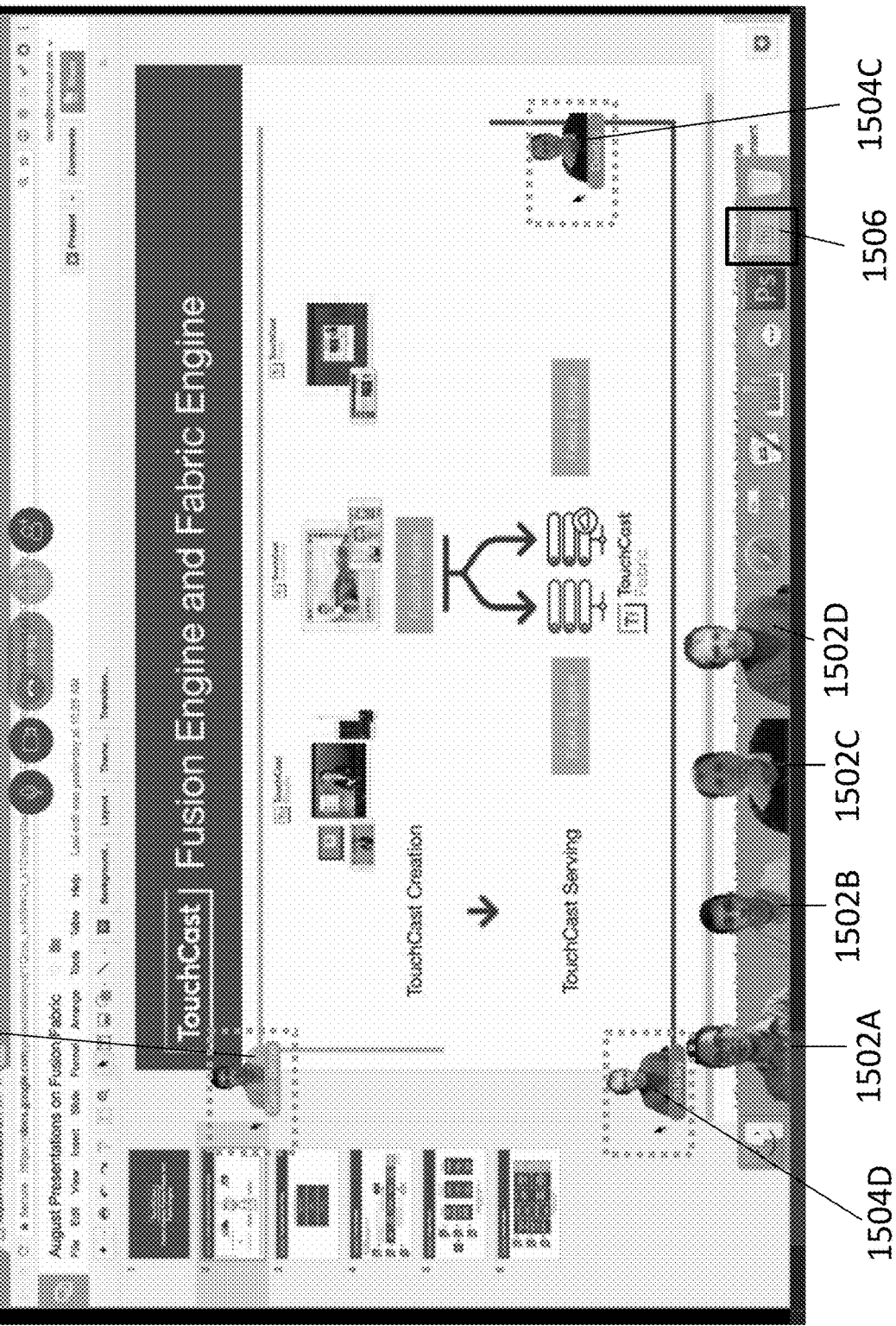

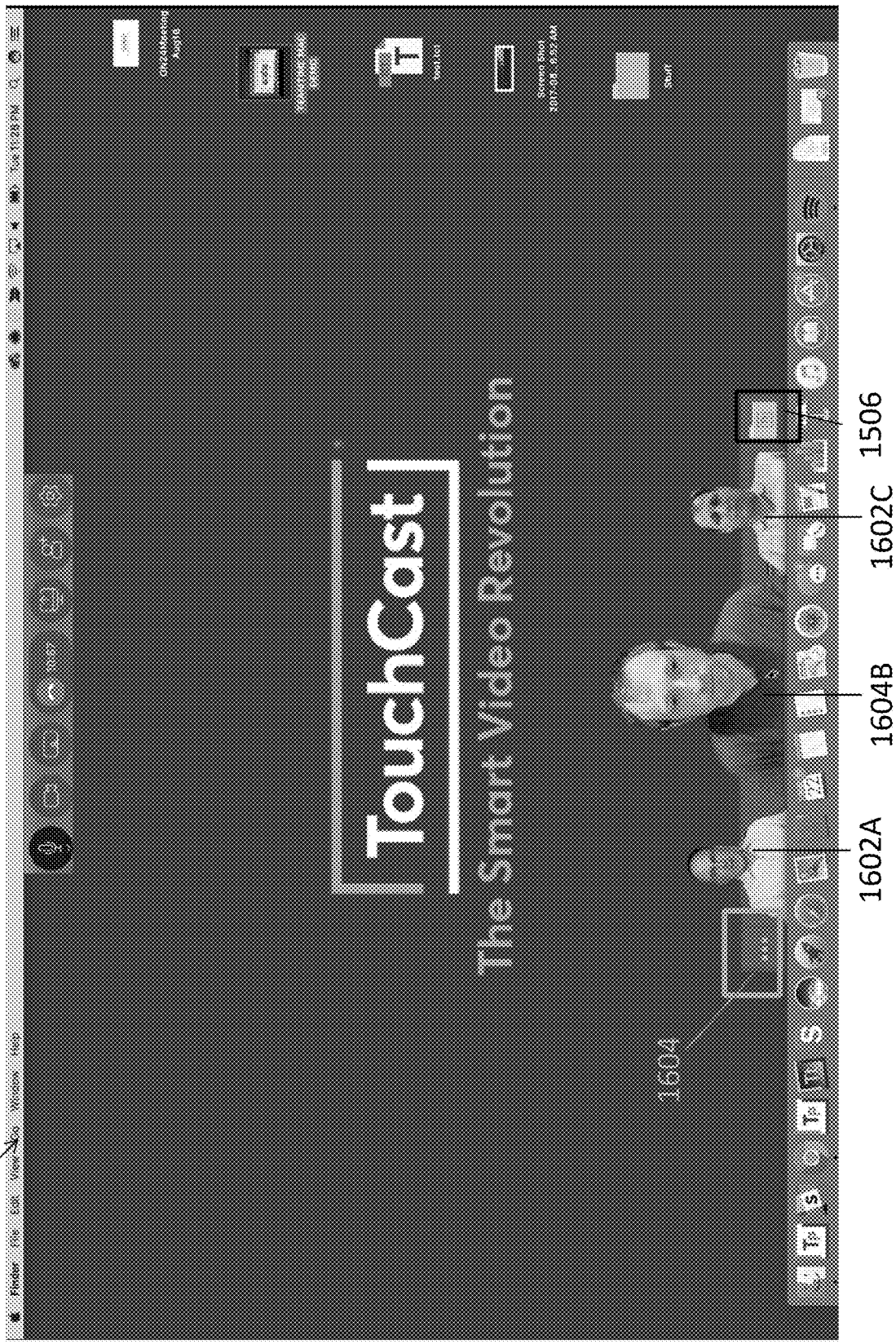

Multipoint Control Unit (MCU)

SYSTEM AND METHOD FOR INTERACTIVE VIDEO CONFERENCING

CROSS-REFERENCE TO RELATED APPLICATIONS

This application is a continuation of U.S. patent application Ser. No. 16/134,638 filed Sep. 18, 2018, now U.S. Pat. No. 10,356,363, issued Jul. 16, 2019, which is based on and claims priority to U.S. Application No. 62/559,972, filed Sep. 18, 2017 and U.S. Patent Application No. 62/565,094, filed Sep. 28, 2017. Further, U.S. patent application Ser. No. 16/134,638, from which this application is a continuation of, is a continuation-in-part of U.S. patent application Ser. No. 15/683,403, filed Aug. 22, 2017, now U.S. Pat. No. 10,033,967, issued Jul. 24, 2018, which is a continuation of U.S. patent application Ser. No. 15/247,534, filed Aug. 25, 2016, now U.S. Pat. No. 9,787,945, issued Oct. 10, 2017, which is based on and claims priority to: U.S. Provisional Patent Application No. 62/209,727, filed Aug. 25, 2015; U.S. Provisional Patent Application No. 62/242,029, filed Oct. 15, 2015; and U.S. Provisional Patent Application No. 62/329,081, filed Apr. 28, 2016. Further, U.S. patent application Ser. No. 15/247,534 is based on and is a continuation-in-part to U.S. patent application Ser. No. 14/833,984, filed Aug. 24, 2015, now U.S. Pat. No. 9,661,256, issued May 23, 2017, which is a continuation-in-part to U.S. patent application Ser. No. 14/316,536, filed Jun. 26, 2014, now U.S. Pat. No. 9,363,448, issued Jun. 7, 2016, which claims priority to U.S. Provisional Application No. 61/839,757, filed Jun. 26, 2013 and U.S. Provisional Application No. 61/845,743, filed Jul. 12, 2013, the contents of all of which are incorporated by reference in their respective entireties, as if set forth expressly herein.

FIELD

The present application relates, generally, to content presentation and, more particularly, to a system and method for providing and interacting with content via interactive communication sessions.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

One of the biggest missed opportunities of the entire category of smart TV connected devices is the absence of easy to deploy video conferencing. As millions of consumers place these devices in their living rooms, the core use case of facilitating communications via the large screen TV is missing.

BRIEF SUMMARY

In accordance with one or more implementations of the present application, a system and method provide respectively customizable interactive audio/video content to each of a plurality of computing devices during a networked communication session. At least one processor configured by executing instructions on non-transitory processor readable media provides access to the networked communication session to each of the plurality of computing devices. At least some of the computing devices respectively capture audio and video content via a microphone and camera respectively operable with each of the at least some of the computing devices. Further, the at least one processor is configured to receive, from each of the at least some of the computing devices, the respective audio and video content. The at least one processor is configured to generate a composited interactive audio/video feed including at least one of the audio and video content received from each of the at least some computing devices during the networked communication session. Moreover, the at least one processor is configured to transmit to each of the plurality of computing devices during the networked communication session the composited interactive audio/video feed.

In one or more implementations of the present application, the at least one processor is further configured to periodically receive, from each of the at least some of the computing devices, updated respective audio and video content captured by the microphone and camera respectively operable with each of the at least some of the computing devices. The at least one processor is configured to revise the composited interactive audio/video feed with at least one of the updated audio and video content received from each of the at least some computing, devices during the networked communication session. Thereafter, the at least one processor is configured to transmit to each of the plurality of computing devices during the networked communication session the revised composited interactive audio/video feed, thereby providing updated multi-camera and multi-microphone content to each of the plurality of computing devices during the network session.

It is with respect to these and other considerations that the disclosure made herein is presented. Features and advantages of the present invention will become apparent from the following description of the invention that refers to the accompanying drawings.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIGS. 5A-5H illustrate an example implementation and show display screens representing an implementation of the present application;

FIG. 10 illustrates an example set of applications and controls available via a mobile application and operating on user computing device during an interactive video conferencing session, in accordance with an example implementation of the present application;

FIGS. 15A-15G illustrate example display screens provided on a user computing device and that include graphical screen controls and content from audio/video feeds respectively received from remote computing devices participating in an interactive video conferencing session;

FIG. 16 illustrates another example display screen provided on a user computing device identifying participants and graphical screen controls in connection with an interactive video conferencing session;

DETAILED DESCRIPTION

Figure 1:
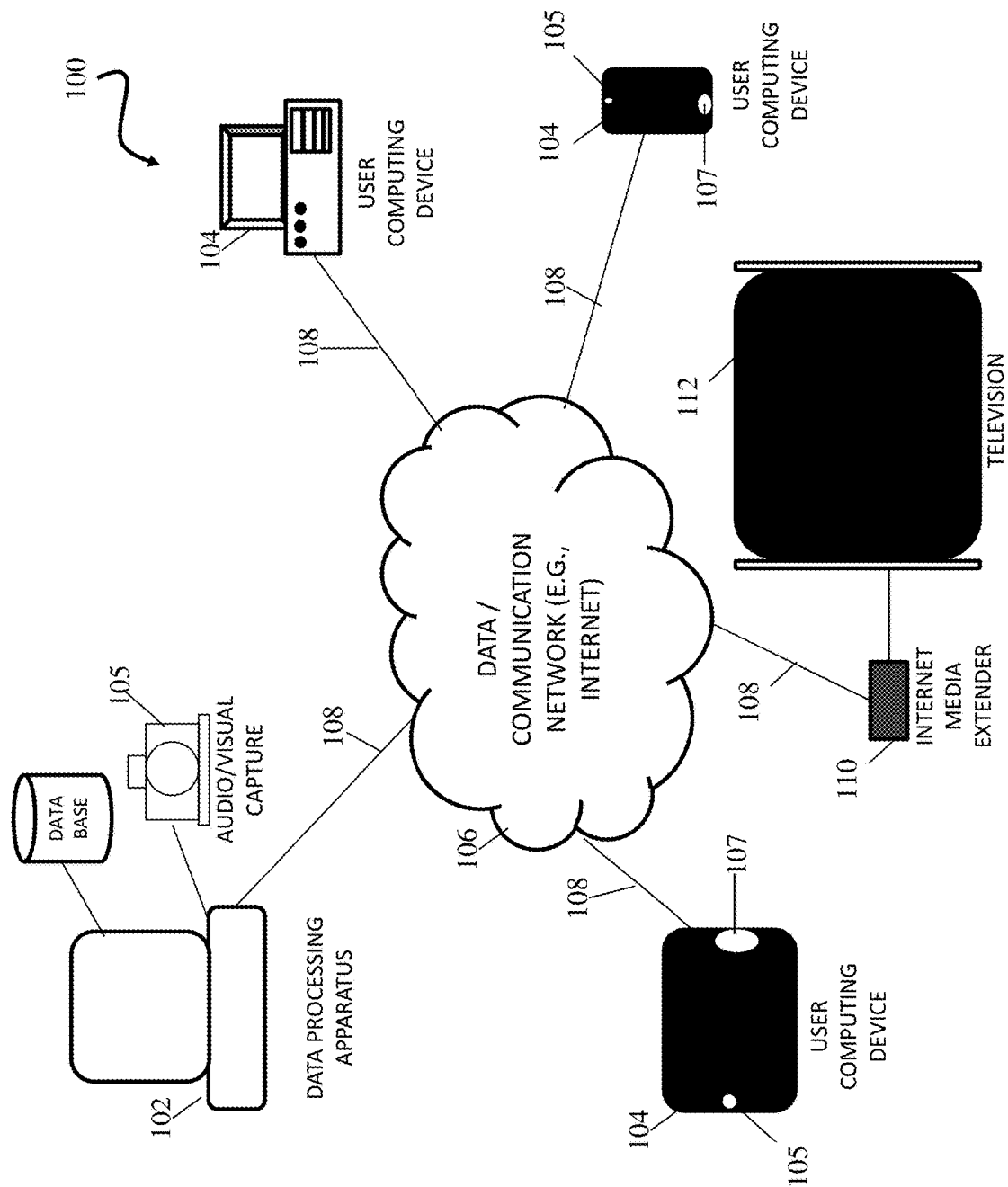
FIG. 1 is a diagram illustrating an example hardware arrangement that operates for providing the systems and methods disclosed herein.

By way of introduction and overview, in one or more implementations the present application provides systems and methods for providing interactive video conferencing over one or more data communication, networks, such as the Internet. Devices operating, for example, iOS, ANDROID, WINDOWS MOBILE, BLACKBERRY, MAC OS, WINDOWS or other operating systems are configured with one or more software applications that provide functionality, such as with an interface for developing ("authoring") distributable coordinated presentations. Such presentations can include interactive video having customizable and interactive functionality for and between devices with a plurality of end-users who receive the video. Further, the one or more software applications configure a user computing device with a viewing/interactive tool, referred to herein, generally, as a "consuming" interface for end-users who receive interactive video that are authored in accordance with the present application and usable for end-users to communicate (e.g., via interactive video conferencing functionality). Using the client interface, users may interact with each other and share interactive videos and other content as a function of touch and gestures, as well as graphical screen controls that, when selected, cause a computing device to execute one or more instructions and effect various functionality. For example, a smartphone or other mobile computing device can be configured via one or more applications in accordance with the ability to simulate a laser pointer, drawing tool, mouse, trackball, keyboard or other input device.

As noted herein and described in greater detail below, a plurality of users can interact with controls and content dynamically during an interactive video conferencing session, in accordance with the present application. For example, a user operating a computing device that is participating by an interactive video conferencing session can draw or write, such as by using an electronic passive or active stylus or other suitably configured writing device. In one or more implementations, as the user draws, writes, or otherwise interacts, one or more processors can operate to detect and capture, specific information associated with the interaction, such as that the user is drawing on his or her display with a stylus. The detected information can include the specific location where the stylus is in contact with the display, and the one or more processors can emulate the same interaction, such as by venerating output that is displayed for all connected participants to see/hear. This supports on-line brainstorming and collaboration in real-time, including to provide access to content, such as presentations, documents, data and apps (including vApps, as described herein) to a plurality of users during a single interactive data communication session.

In one or more implementations, the present application provides a graphical interface that can replace, "floats over" and/or be integrated with one or more features of a user interface provided, for example, via an application program and/or a computing device's operating system. For example, a graphical interface provided in accordance with the present application can be integrated with the WINDOWS TASKBAR, APPLE OS DOCK or other prominent feature off graphical user interface. In accordance with one or more implementations, the graphical interface includes audio/video content received from respective computing devices during an interactive video conferencing session. For example, audio still image/video feed from a microphone and/or camera configure with a user computing device operated by a user participating in the video conferencing session includes content that is received and formatted to be included in the graphical interface. In one or more implementations, graphical representations of the content can be provided that are configured as icons, images, video, avatars, or other format (collectively referred to herein, generally and without intending to limit the present application to any one respective implementation, as "icons"). Such icons can be provided within the graphical interface and formatted to include at least some of the audio/video content respectively received from the computing devices operated by participants during an interactive video conferencing session. For example, icons are provided that include at least some live video content from each of plurality of participants, in which each of the respective participants are actively displayed and viewable by all other participants during the interactive video conferencing session. Thus, for example, one participant can be sharing content (e.g., showing a business presentation), and a dynamically formatted icon displays "live" audio/video content from the presenter's camera and/or microphone configured with the participant's computing device. Thus, the participant presenting the content can be seen by participants, substantially in real-time, as the participant speaks.

In addition, the present application includes one or more modules that configure one or more processors by executing code to dynamically adjust a size, position, color and/or other features of one or more icons that provide audio/video content received from a respective computing device. In one or more implementations, the one or more icons are dynamically adjusted in response to a participant's behavior. For example, as a user speaks (e.g., above a predetermined volume threshold), the respective icon associated with that participant expands, moves, changes color, and/or adopts some change. Similarly, icons providing audio/video content from the other participants are formatted to have a similar (e.g., same) size, color, position or other feature such that the icon associated with the speaking participant stands out from the others. As another participant is detected for speaking, or taking some other action that represents a focus of the respective video conferencing session at a given time, one or more instructions can be executed by a processor to cause the respective icon associated with that participant to change, such as to grow larger, change color, get brighter, or the like, while at least one of the other icons are respectively formatted to appear alike in size, color, brightness, and/or other characteristic, such as smaller.

Thus, in one or more implementations, for example, icons of participants who are not actively speaking or participating during a video conferencing session in other ways are formatted to be sized to be 15 pixels wide by 15 pixels high. As a respective one of the participants speaks, the icon associated with the respective participant expands to be 25 pixels wide by 25 pixels high. In one or more implementations, after the participant finishes speaking or when another participant begins speaking, or some other detected activity occurs during the video conferencing session, the participant's icon is formatted back to 15 pixels wide by 15 pixels high. Accordingly, in one or more implementations, respective icons are sized to be particular sizes, colors, brightness, or virtually other distinct appearance (e.g., to appear raised or flat, to have borders appear and disappear, or the like), as a function of participant activity.

As shown and described herein, the present application provides interactive video conferencing sessions that are provided on each respective computing device operated by each respective participant of the video conferencing session. In one more implementations, such changes in icon appearance can occur as a function of user activity, such as by hovering a pointer (e.g., a mouse pointer) over one of the icons associated with a respective participant. In such case, for, example, an adjusted respective size or other appearance of an icon appears only on one participant's respective computing device of operated by a respective participant, in which the hovering (or other predetermined computing action) occurs, in this way, individual participants can enjoy custom views of content without affecting the display of icons (or other content) of other participants, and on other computing devices operated by the other participants.

In or more implementations of the present application, as a participant operating a respective computing device moves the pointer (e.g., via mouse, trackpad, track ball, touchscreen or other selection devices) around, coordinate information representing the location of the pointer is processed. For example, information representing X/Y screen coordinates of the pointer can be transmitted to one or more computing devices, along with information representing the respective computing device and/or participant. The receiving device can process the received information to generate a graphical representation of the respective computing device's pointer and display the graphical representation for all of the participants to see. Still further, information representing X/Y screen coordinates and respective computing devices and/or participants can be received frequently from a plurality of computing devices during an interactive video conferencing session, and updated respective, graphical representations of the pointers can be displayed as the pointers move about the display screen during the interactive video conferencing session. In this way, all of the other participants can see pointer movement as each participant moves his/her pointer around the screen.

In addition to representing pointers, the present application can include content, such as active audio and video content, including formatted as icons of participants shown and described herein. The content can be provided a predetermined distance from each respective pointer represented in the interactive video conferencing session.

In addition to providing graphical representations of pointers, selectors and/or navigation icons associated with respective participants, the present application can include one or more modules that, when executed by one or more processors, enable participants to control items in the display of an interactive video conferencing session. For example, X/Y screen coordinate and user computing device information can be received from a respective computing device as well as information representing that a click, tap or other selection was made. Such information can be processed to open an application, a document, image, sound file, or other object for participants to see and/or experience. For example, a participant, using his/her local computing device, can tap on an icon associated with a digital whiteboard that is displayed during an interactive video conferencing session. The whiteboard icon (and corresponding application, file and/or other object) may be available only on a computing device operated by a host (as described herein) of the interactive video conferencing session, but can be made available for one or more participants of the interactive video conferencing session as a function of the technological features and advancements set forth herein.

In one or more implementations, such technology can include a software development kit ("SDK"), one or more application programming interfaces ("APIs") and client software applications that support creation and implementations of applications for specific software packages and frameworks, including via one or more development platforms. The platform(s) may be accessible over one or more remote devices, such as in a website hosted on a web server provided via a proprietor of the present application.

The present invention supports file sharing and management, such as for documents, images, sound files, video, or other data and objects. Such files are often subject of interest in collaborative sessions, and the present application provides technology for participants to be provided with current versions of such files substantially in real time. In one or more implementations, an icon is provided within the display screen of an interactive video conferencing session that links to a mechanism for file access and sharing. For example, the icon is formatted to appear as a folder, and is selectable to appear to operate as virtually any other folder on a participant's local computing device. For example, a user can work in a document, save the document, and then drag the document to the icon appearing as a folder. Unlike local computing device storage, such as a hard drive, however, a tile that is dragged into the icon appearing as the folder causes one or more instructions to be executed by one or more processors that cause transmission of the file to each respective devices of participants, effectively maintaining files in sync for each of the participants.

In accordance with the teachings herein, implementations of the present application provide a simple to use, informing and entertaining communications experience that incorporates content from a plurality of computing devices, e.g., smartphones, tablets, laptops and desktops, and enables live sharing in a real-time and conferencing capability therefore. In one or more implementations, one or more televisions can be used for respective audio/visual display devices, and can provide feed from cameras and/or microphones configured with various local and/or remotely located computing; devices that are communicating over data communication networks such as the Internet. A television can be implemented in the present application in various ways, such as via an Internet media extender provided by APPLE TV, ROKU, AMAZON FIRE TV or GOOGLY CHROMECAST. As used herein, an Internet media extender refers, generally, to a category of devices that provide for content to be streamed to a television, surround sound devices, and the like. Unlike functionality provided by known Internet media extenders, however, the present application facilitates integrating audio/video input capabilities of computing devices (e.g., microphones, cameras and software that drive and enhance audio/visual captures) into video-conferencing capabilities. The present application facilitates one or more of: one-to-one (1:1) video conferencing; group video conferencing; sharing and or viewing of content provided on a plurality of computing devices, and interactive computing activities.

In one or more implementations, the present application provides meeting facilitation such as conference calling or video conferencing, that goes past "one-click" operation, such that no user-input (e.g., selecting a hyperlink) is required to join a meeting. Instructions are executed by one or more devices that enable devices to automatically join ("auto-join") a meeting by virtue of always running in the background on the users' computers. The background process can run, for example, upon startup of a computing device and continues to run until the device is turned off, the process is terminated, or other similar event. As shown and described herein, access to databases, such as a calendar database, are supported thereby enabling functionality associated with one or more calendars. In one or more implementations, an interactive video conference session is assigned a unique event identifier (a "UEI"), and any computing device having that UEI in an entry, such as a calendar entry, can be automatically joined to the session (e.g., automatically placed in the virtual conference room). In this way and in one or more implementations, a user does not have to take any active steps to join a conference, as his/her device is specially configured to automatically join the virtual conference.

In one more implementations, a software application starts a service that runs in the background, and can be represented as an icon, such as displayed in an APPLE DOCK, WINDOWS TASK BAR or other suitable operating system component. Such background process(es) operate in an always-on state, and effectively weave a feature-rich collaboration environment into a computing device's operating system. In this respect, the present application can include instructions that, when executed by one or more processors, results in operations that are distinct from a diem-based application which provides a user interface, such as an FTP client application, in which users drag and drop files. Instead (or in addition thereto), the present application supports functionality that mimics enhancements and/or changes to a device's operating system.

For example, the present application includes one or more processes that run in the background, and effect a predictive intelligence that determines and implements the intent of a user, such as in terms of the user's historical corroboration and collaboration in meetings with other individuals. Such predictive intelligence can be by virtue of metadata that cart be accessed by one or more processes. The metadata can be driven by various inputs, such as by calendar-based inputs, and as a function of an event's UEI. Metadata associated with a recurring event having a respective UEI, for example, can be accessed and various selections and actions can be taken automatically as a function thereof.

In one or more implementations, when the same UEI is stored on two people's calendars, a determination can be made that both of the people are scheduled to attend the same interactive video conference that corresponds to the UEI. Respective computing devices that are configured in accordance with the teachings herein can, thereafter, operate to join the interactive video conference automatically, without further input from the users, at a predetermined period of time prior to the start of the session, e.g., 2 minutes. For example, instructions executed on two respective devices operate to cause the devices to respectively join a budget conference (also referred to herein, generally, as a "meeting") automatically, and to display the participants of the meeting, as well as a particular budget spreadsheet and a whiteboard, all without user input. This is an example how metadata can be used to drive predictive intelligence.

In another example implementation of the present application, physical conference, meeting or other rooms (referred to herein, generally, as "resources) are equipped with beacon technology, as known in the art, such that when an event is scheduled to occur in a particular resource, the software can detect that a user is present and cause the user's computing device to connect automatically to the meeting. If, for example, a user enters a room that (s)he is not invited to, the system knows that the resource is reserved for a respective meeting and the user can be prompted to join the meeting. Moreover, the person who created the meeting (e.g., the host of the respective conference) can prompted on his/her computing device that the uninvited user has been invited and needs to be approved.

It is to be apparent to one of ordinary skill, therefore, that the context by which people are attempting to communicate and collaborate can drive many of the processes and features shown and described herein. This can be provided, at least in part, as a traction of instructions that run in the background on respective computing devices and that configure the devices to operate in specialized ways. For example and as noted herein, one or more background processes run that access a database associated with a calendar and/or other productivity software applications. A respective UEI is identified and used to cause the computing device to auto join the interactive video conference session associated with the respective UEI. Other information, such as metadata, can be identified and used to cause additional actions, such as to cause specific device behavior and to access various information.

In one or more implementations, various heuristics are provided that support management of devices and data communication sessions in connection with, for example, video conferencing. For example, a single user may operate a desktop computer and one or more mobile computing devices (e.g., a smartphone, tablet, or other mobile device, e.g., a wearable device). Information associated with the respective devices, such as location of the devices and whether background process(es) associated with the present application are running can be used to determine how to activate a session. For example, a priority can be assumed to a mobile computing device when that device is in a particular location. A different priority can be assigned to a desktop computer if the mobile computing device is not in the particular location. Different rules can be implemented to determine on which device to initiate an interactive video conference session.

Moreover and in one or more implementations, when a device auto joins a video conference session, the device's microphone is muted and the device's camera is not activated. A form of a preview and/or live feed of the video conference session can be displayed, showing other participants who have joined and/or are planning to join the session, for example, to the extent cameras associated with devices of those participants are active. Moreover, the present application can include instructions that enable a plurality of video conferencing sessions to be active on a respective user's computing device, although simultaneous interactivity for the plurality of sessions is preferably not enabled. For example, a user is actively engaged in a video conference session and is scheduled, to join a second, different video conference session. At the time the second session is to begin, the user's device auto-joins the second session even though the first video conference session is active and the device is connected to the first video conference session. In one or more implementations, depending upon a specific status (e.g., actively in the first session), the participants assembled for the second video conference session may be viewable, but sound associated with the second video conference session is muted. Upon termination from the first video conferencing session, such as by actively logging out of the first video conference session or the first video conference session being terminated by the host or other user, then sound associated with the second video conference session is un-muted and the user can hear the participants in the second video conference session.

Figure 19:
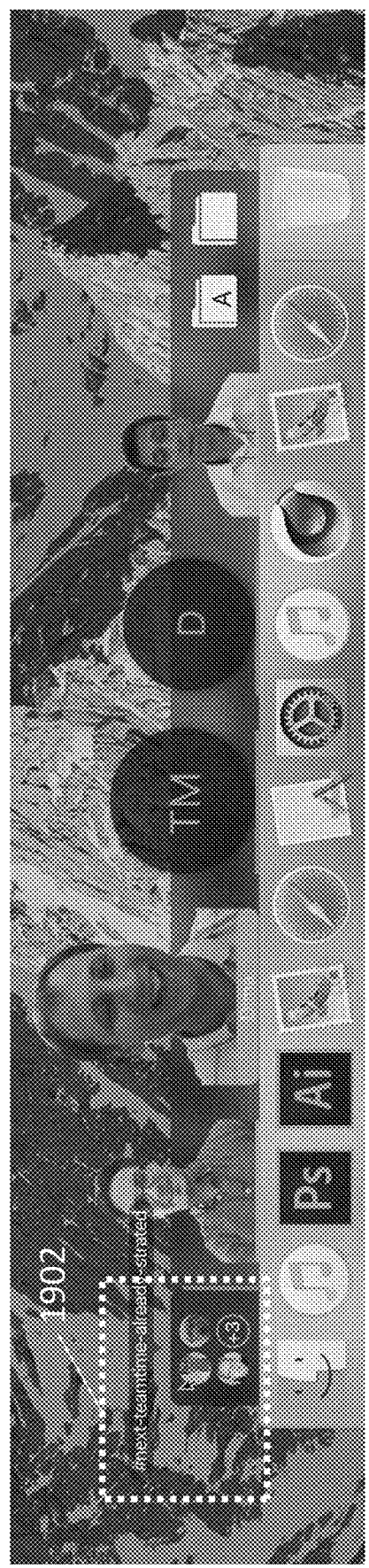
FIG. 19 illustrates an example data entry display screen including a user interface that is provided in, accordance with an implementation of the present application.

The effect can be likened to sitting in a conference meeting room having a glass door, and at the start time of a new conference, people outside the glass door can be seen waiting to enter the room to start a new meeting. FIG. 19 illustrates an example display screen 1900 having an interface that includes region 1902 that shows individuals waiting for a separate conference session to begin, in accordance with an example implementation of the present application.

In one or more implementations, content, which can be formatted as and/or include images, audio/video content, website content, computer programs and/or content provided in various formats collectively referred to herein, generally, as "vApps"), can be implemented vis-à-vis one or more mobile software applications. vApp icons can be provided that represent vApps that are included with the conferencing sessions. In accordance with one or more implementations, after a respective icon is selected, by a user, the user can interact with the respective vApp. Functionality, information and/or content can be associated with the vApp and provided in a shared conferencing session, which is made available to user computing devices connected thereto.

Thus, in one or more implementations, the present application provides for interactive video conferencing that integrates audio/video input and output from individual mobile computing devices (e.g., smartphones and tablet computers) with Internet media extender devices (e.g., APPLE TV). By leveraging technology configured with mobile computing devices, e.g., cameras and microphones, the present application provides a new form of live and interactive functionality that can make a person's living room or other residential viewing area into a high-end video conferencing suite. Non-residential implementations are supported, as well, as shown and described in greater detail herein.

In accordance with the present application, online collaborative services are provided, for example, including for webinars, webcasts, and meetings. In one or more implementations, Internet technologies such as TCP/IP connectivity support web conferencing services, including sharing of audio, video, textual and various forms of multi-media content.

Referring to FIG. 1, a diagram is provided that shows an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high quality and interactive multimedia content, and supporting interactive video conferencing.

With continued reference to FIG. 1, data processing apparatus 102 can be configured to access one or more databases for the present application, including image files, video content, documents, audio/video recordings, metadata and other information. However, it is contemplated that data processing apparatus 102 can access any required databases via communication network 106 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public interact, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In addition, system 100 can include Internet media extender 110 that is communicatively coupled to television 112, such as via a high-definition multimedia interface ("HDMI") or other connection.

According to an embodiment of the present application, user computing device 104 provides user access to data processing apparatus 102 for the purpose of receiving and providing information. The specific functionality provided by system 100, and in particular data processing apparatuses 102 is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., unswitched data connection 108. Permanent connectivity ensures that access to data processing apparatuses 102 is always available.

Figure 2:
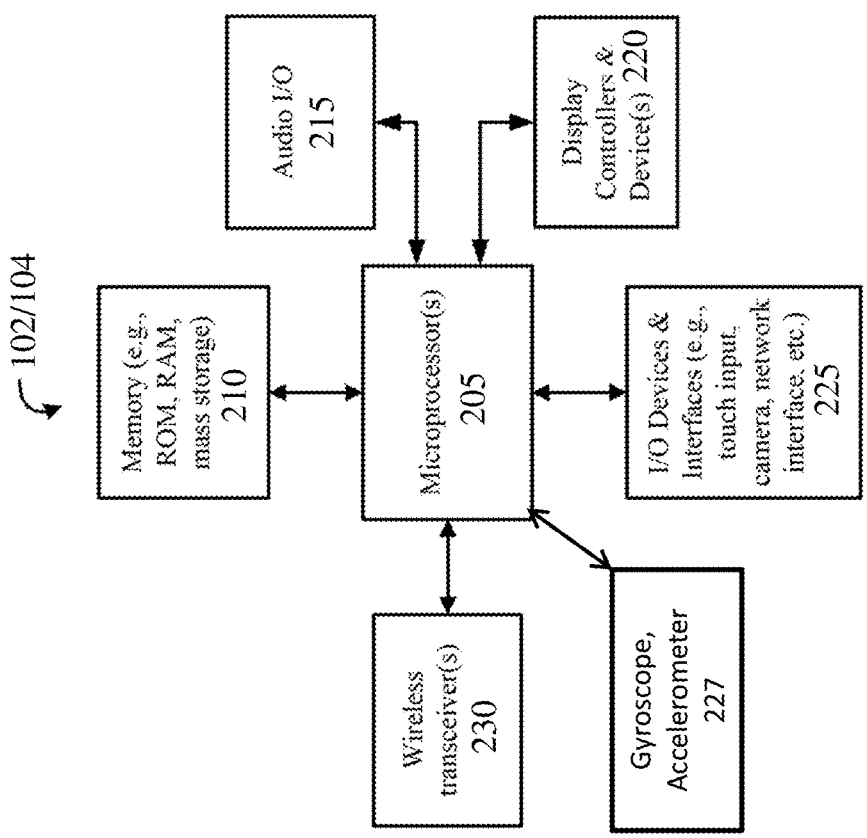
FIG. 2 is a block diagram that illustrates functional elements of a computing device in accordance with an embodiment.

FIG. 2 illustrates, in block diagram form, an exemplary data processing apparatus 102 and/or user computing device 104 that can provide various functionality, as shown and described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type. The data processing apparatus 102 and/or user computing device 104 also includes an audio input/output subsystem 215 which may include one or more microphones and/or speakers.

A display controller and display device 220 provides a visual user interface for the user, this user interface may include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network. Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

Additional components, not shown, can also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present application provides improved processing techniques to prevent packet loss, to improve handling interruptions m communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present application, at least in part, for establishing and controlling media sessions between various end points, including user computing devise 104, Internet media extender 110 and data processing apparatus 102.

In addition to RTSP, one or more implementations of the present application can be configured to use Web Real-Time Communication ("WebRTC") to support browser-to-browser applications, including in connection with voice, video chat, and peer-to-peer ("P2P") file sharing. Thus, the present application avoids a need for either internal or external plugins to connect endpoints, including for voice/video or other communication sharing. In one or more implementations, the present application implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conferencing at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present application can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD") video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high definition stream (e.g., 1280×720 or higher resolution), and output to each of at least some of the respective user computing devices 104.

Figure 3:
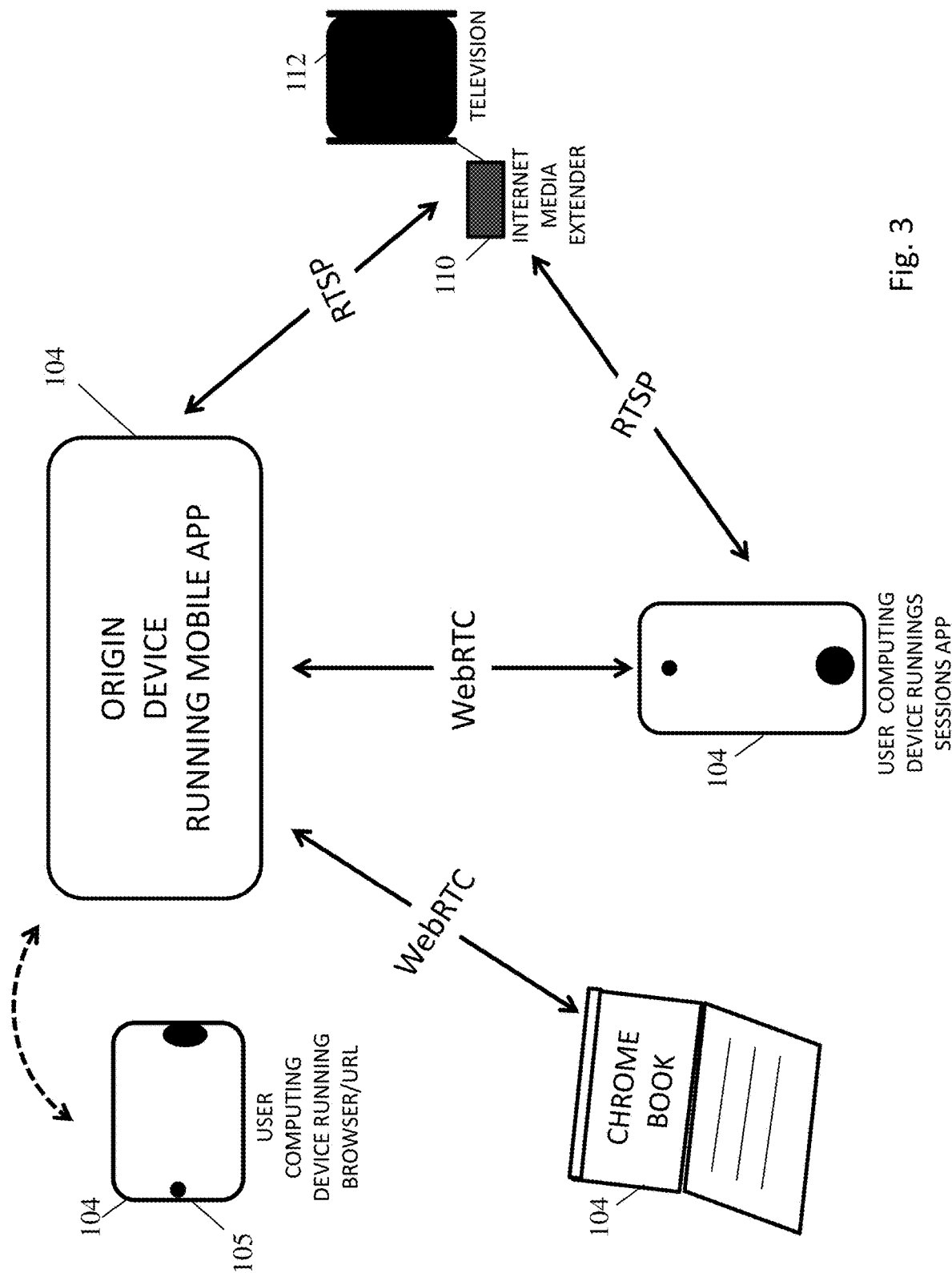
FIG. 3 is an example high-level diagram that illustrates interactivity between various ones of the devices illustrated in FIG. 1.

FIG. 3 is an example high-level diagram that illustrates interactivity between various ones of the devices illustrated in FIG. 1 and identifies example communication protocols in one or more implementations of the present application. The implementation illustrated in FIG. 3 is usable as a consumer (e.g., a residential) implementation, as well as an enterprise implementation. As illustrated in FIG. 3, WebRTC is shown with regard to communications between user computing devices 104 (shown as a CHROME BOOK and mobile computing device, e.g., a smart phone) and supporting browser-to-browser applications and P2P functionality. In addition, RTSP is utilized in connection with user computing devices 104 and Internet media extender 110, thereby enabling presentation of audio/video content from devices 104 on television 112.

In one or more implementations, HTTP Live Streaming ("HLS") is utilized for HTTP-based media streaming. In addition or in the alternative, adaptive bit rate HLS is utilized, thereby enabling a portion of the stream is available in a plurality of encoding sizes and resolutions for effective receipt regardless of device or bandwidth. As known in the art, HLS is a usable to parse a stream into a sequence of small HTTP-based file downloads, each download comprising a portion of the stream. As the stream plays, a client device can select from a number of different alternate streams containing the same material encoded at a variety of data rates, allowing the streaming session to adapt to an available data rate. A M3U playlist containing the metadata for the various sub-streams which are available for download is also provided and downloaded.

In the example illustrated in FIG. 3, a respective computing device 104 is illustrated as the origin or host (also referred to herein, generally, as a "presenter" device) that is executing the MOBILE APP and defining a session for respective other devices to use for, for example, interactive video conferencing. In one or more implementations, the origin or host device 104 establishes an initial session and options are provided to invite other users (e.g., user computing devices 104 that are configured with the MOBILE APP) to join the conferencing session. Users who are invited to join the session can further invite other users, for example, when permission for extending invitations to other users has been made available (e.g., enabled) by the origin or host device. Accordingly, the MOBILE APP can include instructions for, enabling a processor associated with each respective user computing device 104 to generate and transmit invitations for users to join a respective conferencing session. In accordance with the present application, video sharing, video conferencing, sharing of multimedia content, data, documents and various files is supported, as shown and described in greater detail herein.

In one or more implementations, a plurality of interactive communication sessions can be defined by an origin or host device. Each of the respective sessions can be defined and identified using a specific title or label. For example, "#APPDEV" can be used to define and identify an interactive communication session having a topic dedicated to software application development. The origin or host device can, thereafter, transmit invitations to computing devices 104 associated with software engineers and other relevant parties to join the #APPDEV session. Videoconferencing technology in accordance with the present application is, thereafter, available for the software engineers and other relevant parties and the user of the origin or host device 104, such as to confer over topics associated with software application development. Similarly, the same respective origin or host device 104 can define another respective session with a different topical focus, e.g., sales and entitled #SALES. Invitations to the #SALES session can be transmitted by the origin or host device to computing devices 104 associated with individuals in a sales and marketing department. Videoconferencing technology in accordance with the present application is, thereafter, available for those one or more individuals to confer about topics associated with sales. In one or more implementations, at least part of the respective groups of users is mutually exclusive, in that members of the "#APPDEV" session cannot participate in the #SALES session, and at least some of the members of the #SALES session cannot participate in the #APPDEV session.

In operation, and in accordance with one or more implementations, after an invitation is sent to a it of a computing device 104 for joining a session defined by a respective topic (e.g., #TOPIC), the user affirmatively accepts the invitation and is, thereafter, authorized to join the session. Thereafter, the user can select, via the MOBILE APP, an identifier representing the respect session (e.g., #TOPIC) provided, which causes the user computing, device 104 to execute one or more instructions that enable the device 104 to connect to and/or join the session, and access materials associated therewith. Moreover, in one or more implementations rules can be defined and/or enforced that restrict access to sessions and/or content to respective users. For example, a session defined as #TOPIC may be shared by seven users, however rules can be defined by a user of the origin or host computing device 104 and implemented that restricts all but three of the users from real-time video conferencing via the #TOPIC session. Content associated with the #TOPIC session, however, can be made available to all seven of the users. Materials associated with a respective session can be stored (e.g., backed up) remotely, e.g., in the "cloud" and be available for access, archived and/or made available for users in the future. Such control can, be restricted from future access, as well.

It will be appreciated by one of ordinary skill that countless sessions cart be defined for topics of all sorts and usable for respective groups of users. Demarcating individual sessions in accordance with the present application is usable in the consumer and enterprise markets alike, and solves a long felt need associated with controlled communication sessions including interactive video among respective individuals and parties.

In certain implementations, a plurality of parties can connect to a respective videoconferencing session in accordance with the present application. In such instances, a client/server model can be effective for handling the respective devices and management of data and communications thereof. In other certain implementations, one or a few individuals connect to a respective videoconferencing session in accordance with the present application. In such cases, a P2P framework can be effective in an implementation.

Figure 4:
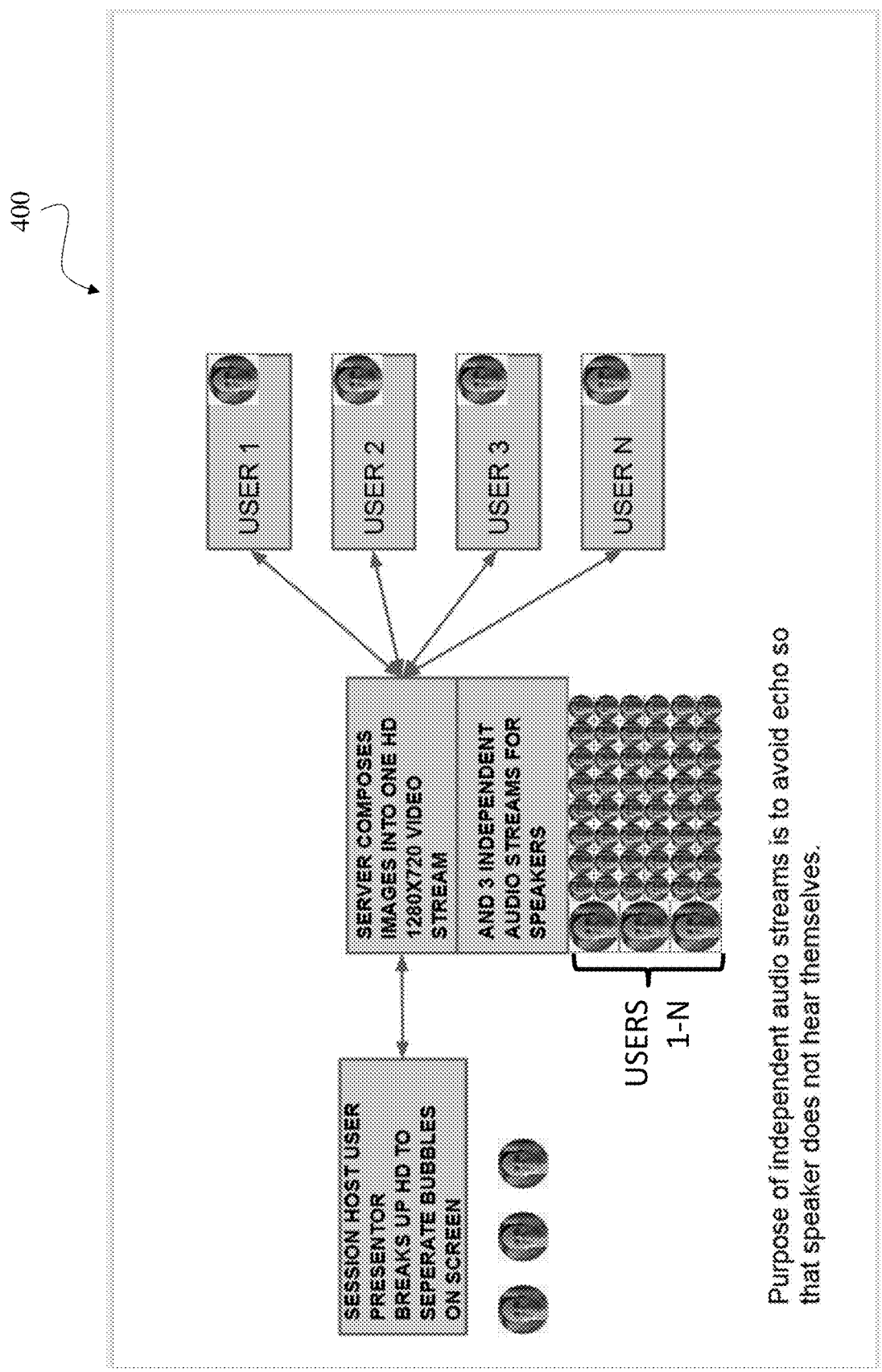
FIG. 4 illustrates an example implantation of an alternate arrangement.

FIG. 4 illustrates an example implementation showing an alternative arrangement 400 in which a plurality of users (1-n) operating user computing devices 104 are connected to the server (data processing apparatus 102) and sending individual video feeds and receiving back the composite video feed illustrating users 1-n.

In one or more imlementations, the composed HD video stream that comprises the users' video streams can be disassembled by each of the respective user computing devices 104 that receive the composed video stream into individual elements, for example, each representing a respective user participating in the video conferencing. Other individual elements representing various users can be disassembled, as well. Thus, the received video from the data processing apparatus 102 can be received by each respective client device 104, and then dissembled into independent portions. For example, a video matrix of 50 users is transmitted to each of the 50 client devices 104, and each device 104 dissembles the matrix into 50 individual and portions that can be manipulated, such as dragged around the display of the client device, resized, closed, or the like. Each respective user can enjoy a custom and individualized layout of each of the respective feeds from the respective devices, as the disassembled portions can be remapped, such as on a user-defined or pre-defined grid. The data processing apparatus 102, for example, receives 51 streams of video, composes the streams into a canvas and outputs one frame (e.g., HD) at that moment of time.

In one or more implementations, when a participant speaks or otherwise provides audio content in the conference, that user's device 104 may experience an echo, when that user's device 104 plays the audio. In order to combat cacophony, echo or other undesirable noise interference, which may occur, the present application may be configured such that the client devices 104 are muted. Further, a limited number of participants may be permitted to contribute audio (e.g., speak) at a time. For example, three devices 104 of fifty devices 104 are configured to enable audio input, while the rest of the devices 104 are muted. Further, each speaking user's device 104 may be configured to silence the audio output originating from that user's device 104 to eliminate any echo.

Furthermore, the present application supports a form of audio session management. For example, if three devices 104 out of 50 devices 104 are configured for enabling audio input, and then a 4th device 104 inputs audio that is distributed with the composited video provided by the server 102, one of the other three devices 104 is "bounced" and audio input for that device may be removed. Various forms of audio moderation and/or control options are supported for the client devices 104. For example, a first-in-first-out arrangement is supported, such that as one device 104 is added for speech, the device 104 having the currently longest speech capability is removed. In an alternative implementation, auto-detect functionality is supported in which audio capability for devices 104 is automatically turned on and off as vocal input is detected. In yet another implementation, a moderator assigns rights to the various devices for speech input.

FIGS. 5A-5G illustrate an example implementation and show display screens 500, 510, 520, 530, 540, 550 and 560, representing an implementation of the present application in which a host user presenter is selecting content for recording interactive video content and providing an interactive conference in accordance with an example implementation. As can be seen in the example implementation(s) shown in FIGS. 4-10, a user can establish a video conferencing, record video content, share the content and interact with the users during the video conferencing.

Figure 5A:
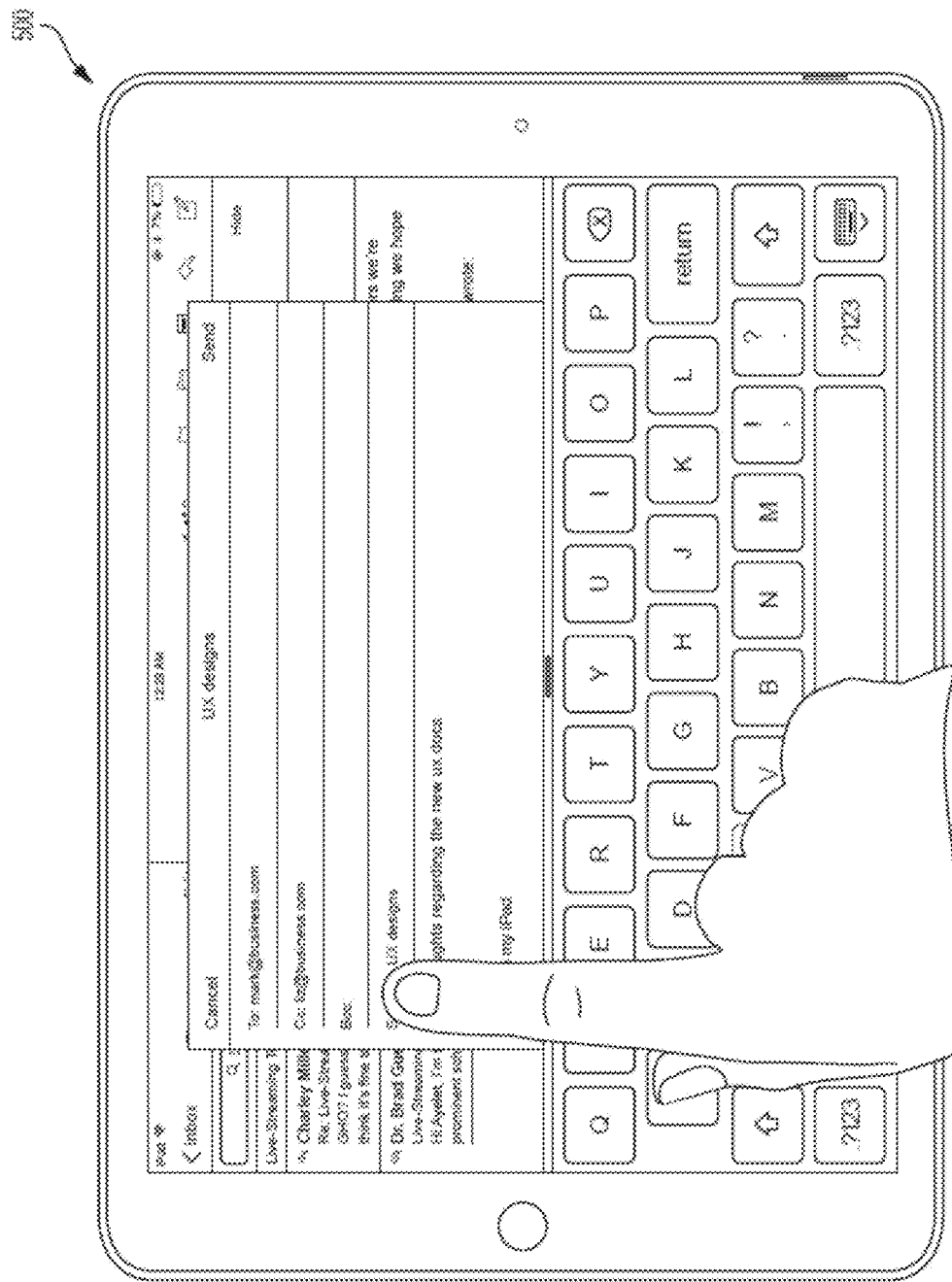
Figure 5B:
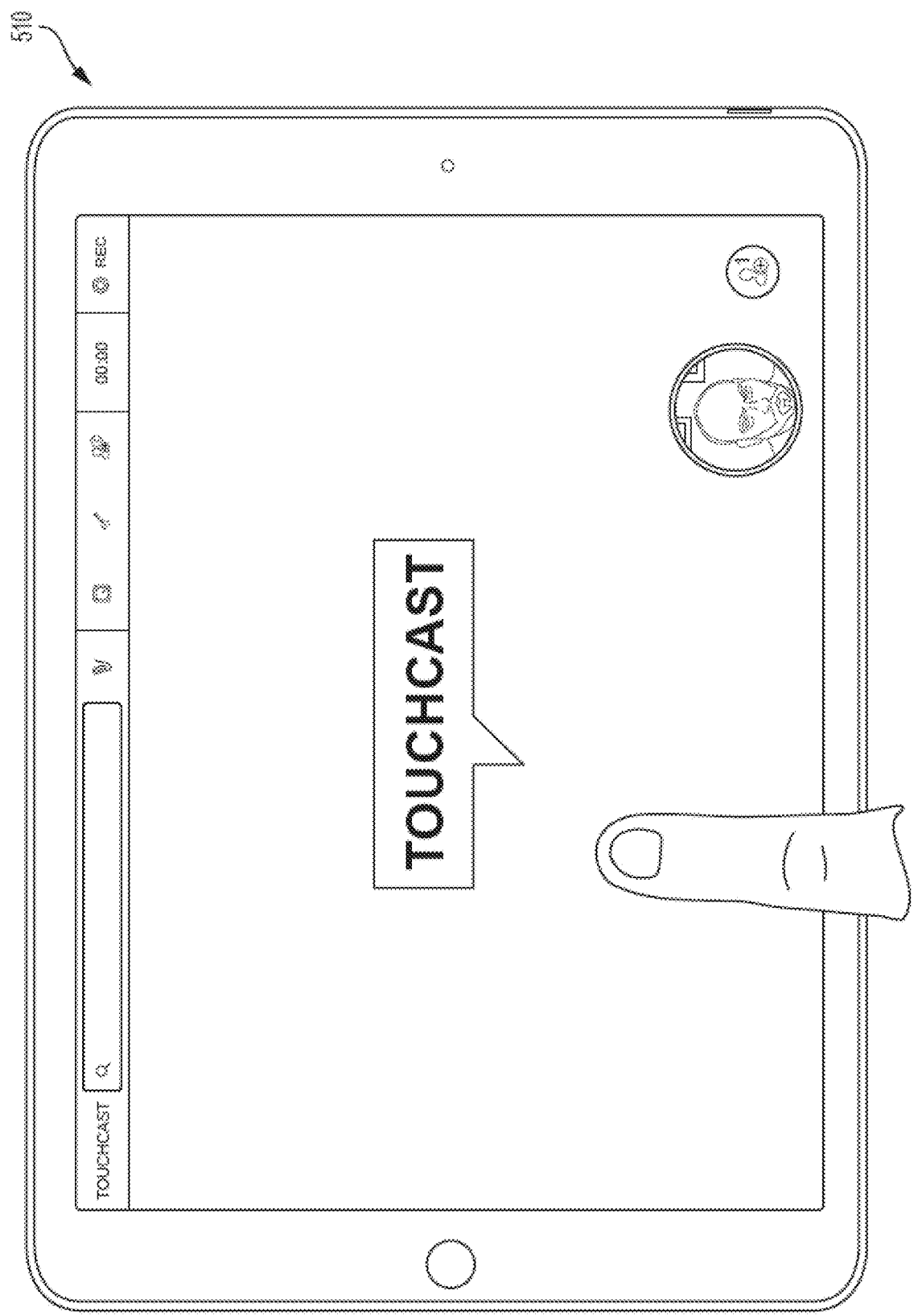
Figure 5C:
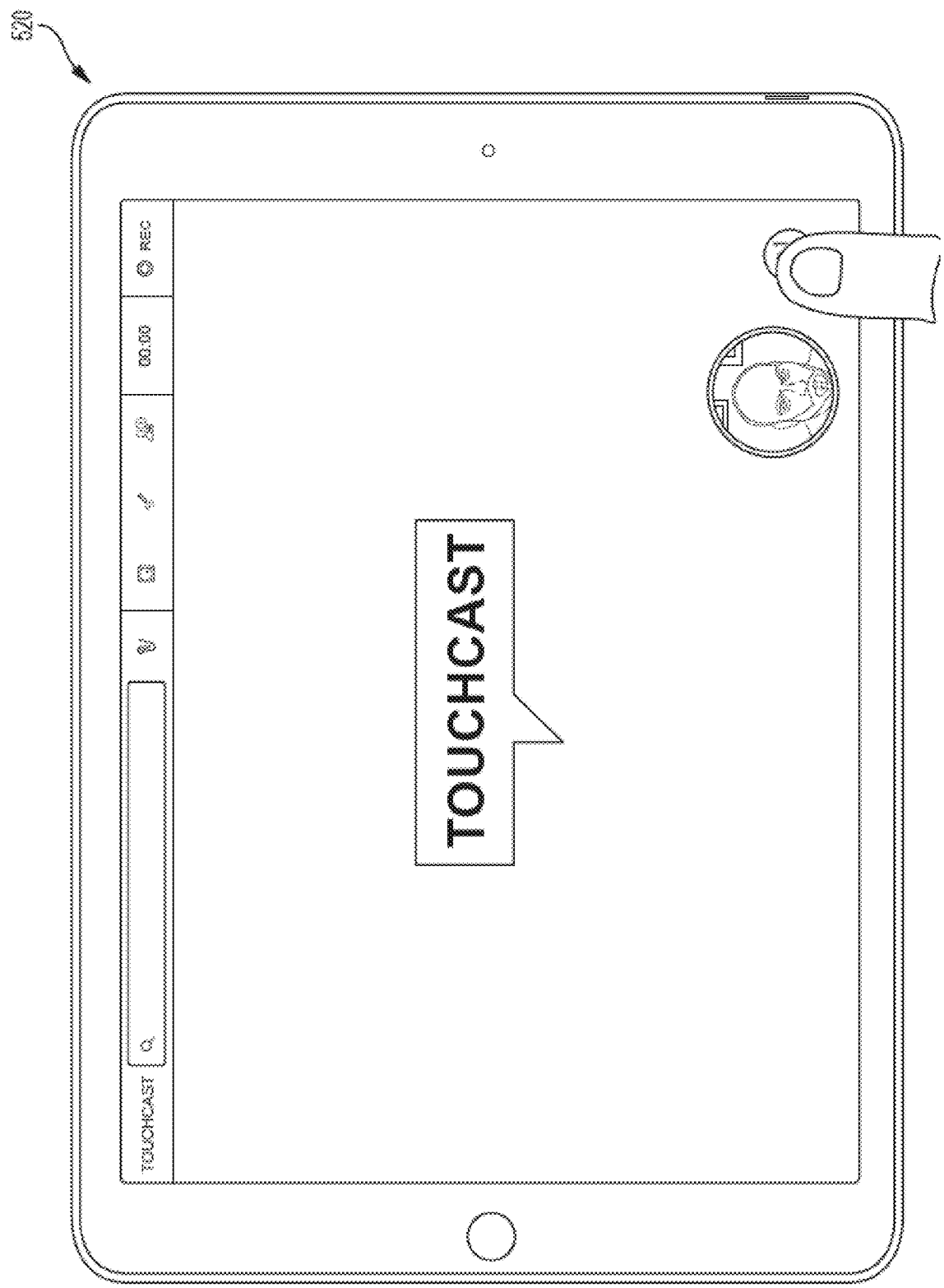
Figure 5D:
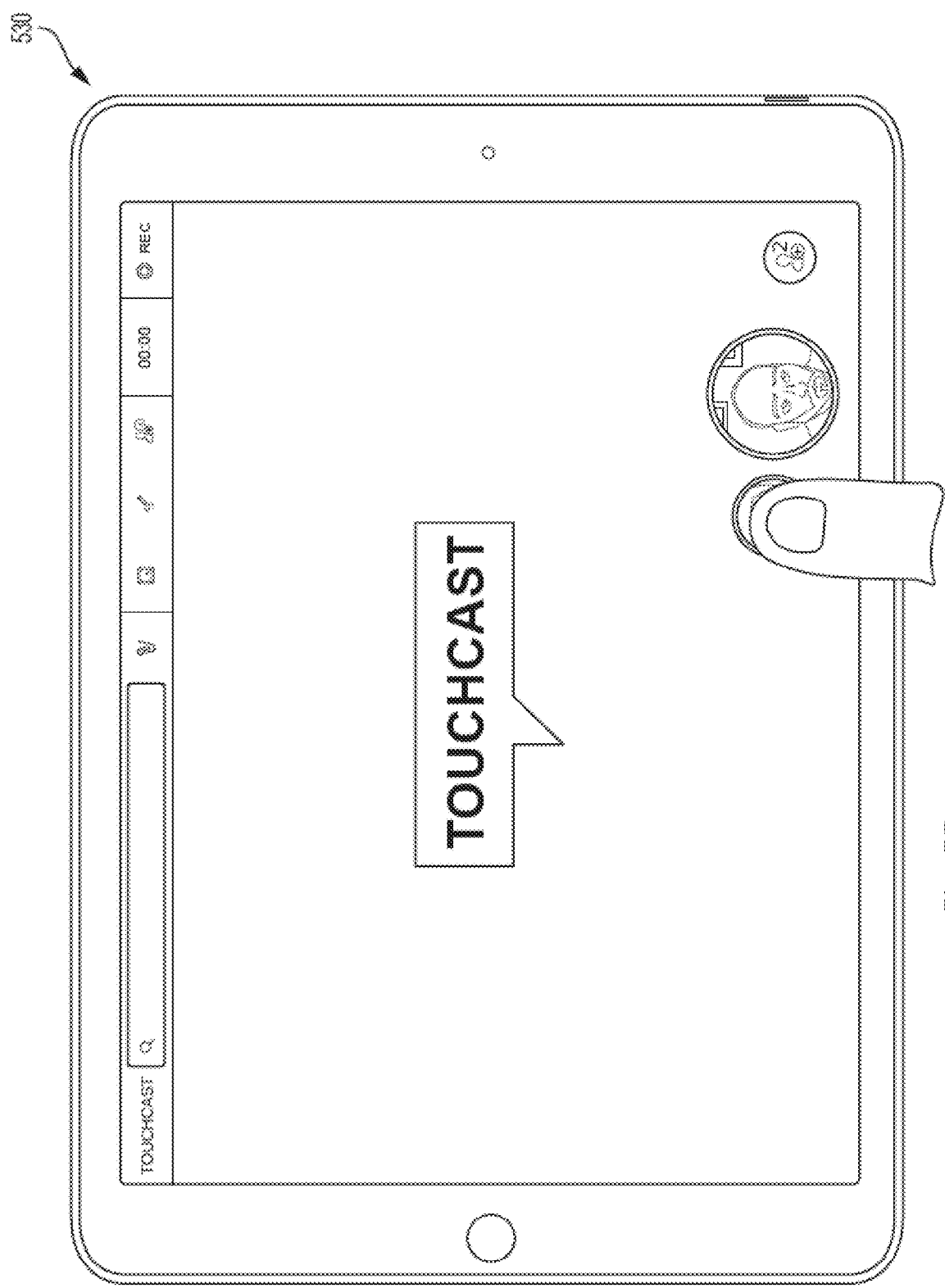
Figure 5G:
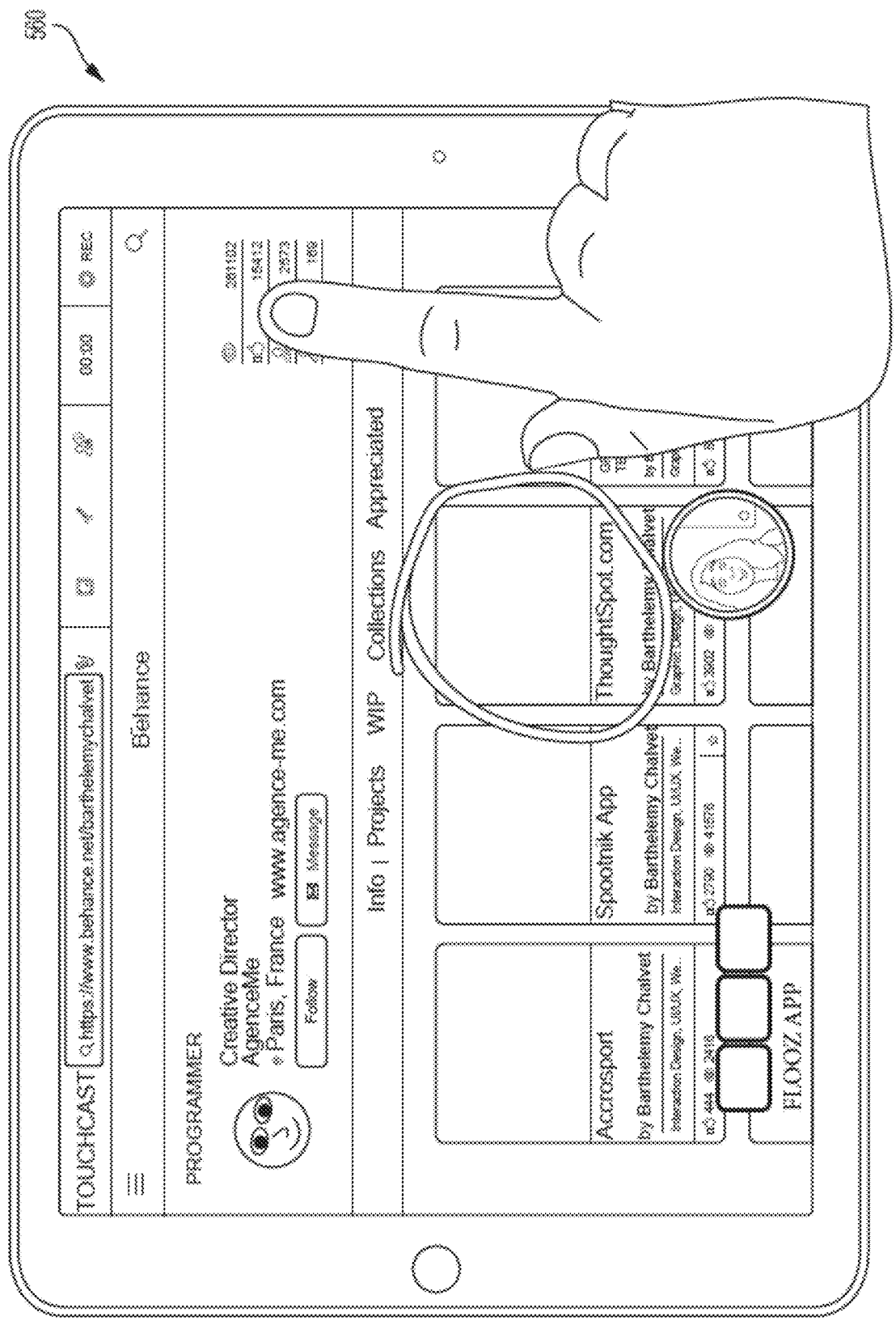
Figure 5H:
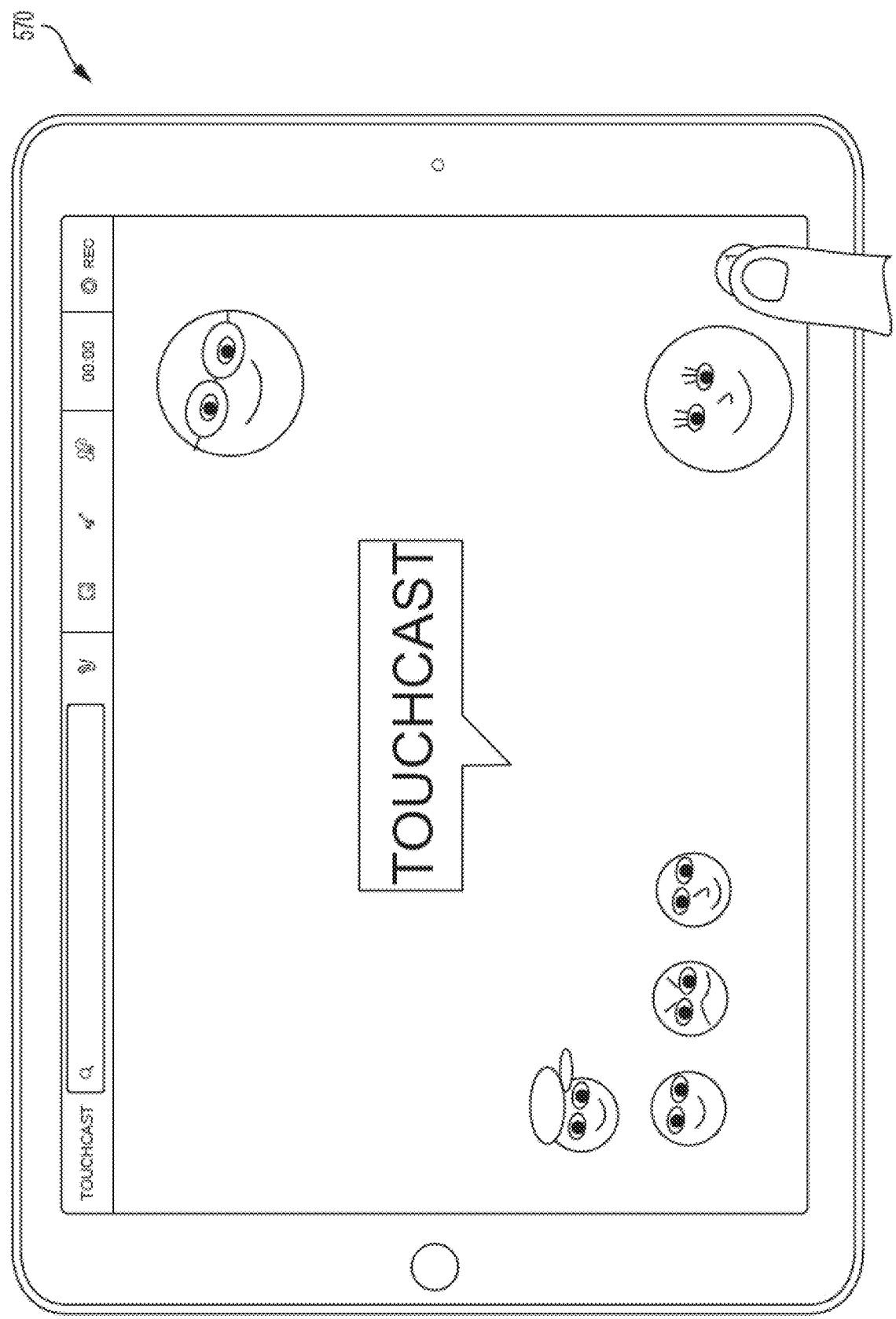

FIG. 5H illustrates an example display screen 570 of a video conferencing provided on a client device 104 in accordance with an example implementation. As illustrated, the video composed by the server 102 comprising the plurality of video feeds from the respective client devices 104 has been disassembled by the respective client device 102, and the various video feeds of the participants has been arranged according to the user's preference. In one or more implementations, the relative positions and formats of the disassembled users' video feeds can be predefined by the user or in other default configuration, and/or can be manipulated for a particular video conferencing session. The respective manipulations can be saved and used in future video conferencing sessions to position/format the respective feeds in accordance with a previous session.

Figure 6:
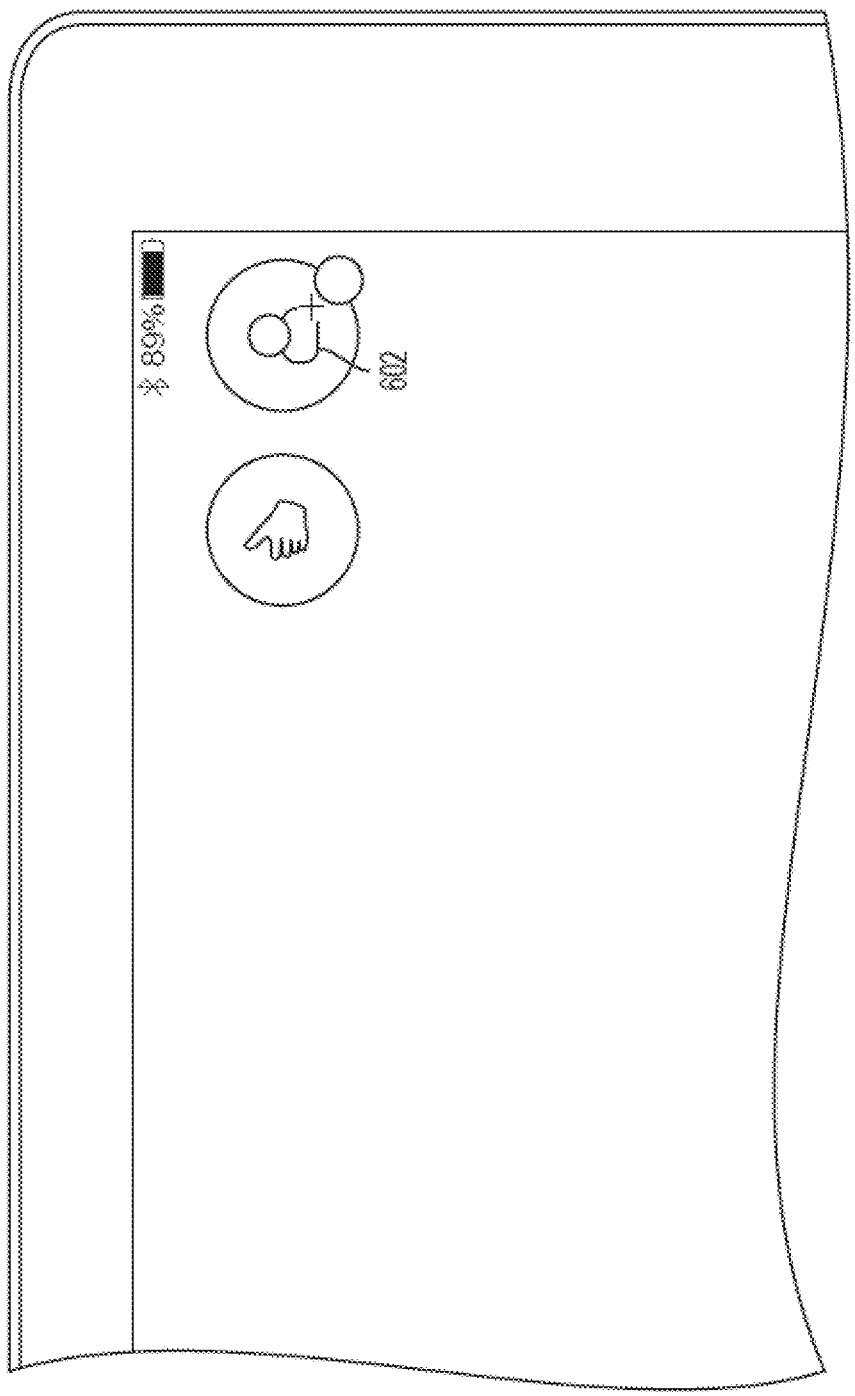
FIG. 6 illustrates a portion of a display screen that includes a graphical screen control that is selectable for transmitting an invitation to one or more user(s) to join an interactive conferencing session in accordance with an example implementation of the present application.

In one or more implementations, the MOBILE APP can configure a user computing device 104 to provide graphical screen controls that, when selected by a user, result in one or more instructions being executed by a processor associated with a user computing device 104 to generate and send an invitation to one or more other user(s). An example interface including a graphical screen control 602 that is selectable for transmitting such an invitation to one or more second user computing devices 104 is illustrated in FIG. 6. The invitation may be via the Internet media extender 110 (e.g., APPLE TV), user computing device 104 or other device, depending upon a respective implementation and/or context of use. For example, a user engaged in an interactive conference via the Internet media extender 110 and television 112, may use a remote control device in connection with making selections and issuing instructions, in one or more implementations. An example virtual pointing device is shown and described in commonly assigned U.S. provisional patent application 62/105,682, filed Jan. 20, 2015, the entire contents of which are incorporated by reference as if set forth in its entirety, herein.

An invitation provided in accordance with the present application can include a hyperlink to a uniform resource locator ("URL") and can be sent via SMS, email, provided in the MOBILE APP, copied in memory, such as to a computing device "clipboard" or provided on an Internet web page, or distributed in other suitable ways. Thereafter, at least one other user selects the hyperlink, such as via a mobile user computing device 104 (e.g., a smartphone, tablet or other computing device) that is configured by executing the MOBILE APP, and the user(s) is automatically connected via the communication session defined by the origin or host computing device 104. In case the MOBILE APP has not been installed on a respective user computing device 104 that received the invitation, then a prompt to install the MOBILE APP on the device 104 can be provided. In one or more implementations, the user computing device 104 can be routed to a site (e.g., APP STORE or ANDROID MARKET) to download/install the MOBILE APP. Moreover, once the MOBILE APP is installed and the user computing device 104 is configured, the user can use the link or otherwise connect to the origin or host device's session.

Alternatively, if the user is operating a mobile user computing device 104 that is not configured by executing the MOBILE APP, for example, when the user computing device 104 is a laptop computer, a desktop computer, or a network-based computer (e.g., a CHROMEBOOK), then the user can be prompted to launch a web browser software application (e.g., CHROME or SAFARI) and the user computing device 104 can connect to the session, for example via a hyperlink.

In one or more implementations, hyperlinks to respective sessions can be persistent, and accordingly be repeatedly used for connection. As noted herein, one or more names can be used to define and refer to a session, and shared in such ways that users can simply select the same link, select the hyperlink as provided in the web browser's history or in some other consistent manner to reconnect to a session and/or access content/information associated with a respective session.

Figure 7:
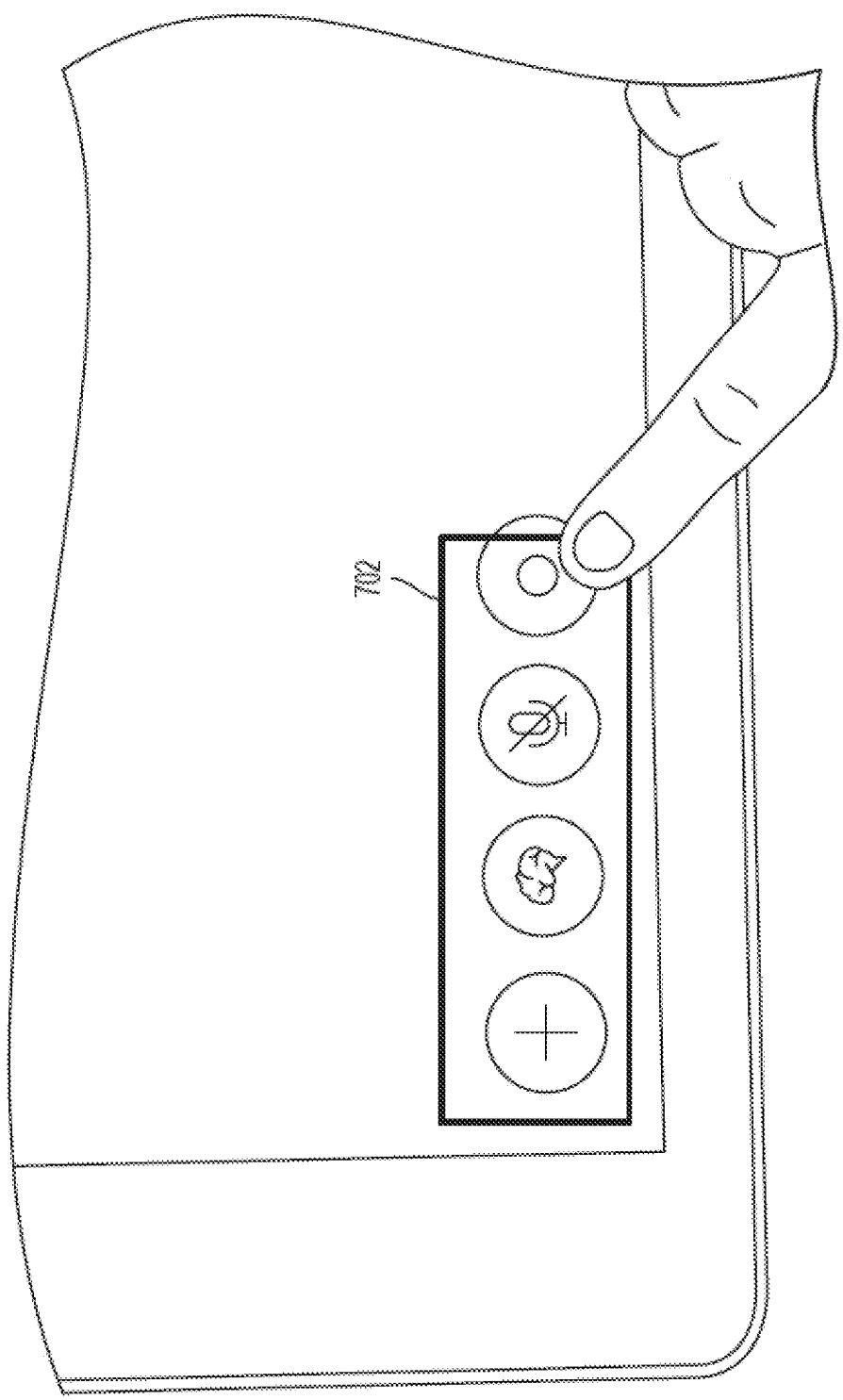
FIG. 7 illustrates a portion of a display screen that includes graphical screen controls for adding sharable content, muting a microphone and recording a session in accordance with an example implementation of the present application.

In addition to graphical screen controls that are provided for inviting users to a respective session, various other graphical screen controls can be provided to perform various options. For example, and as illustrated in FIG. 7, graphical screen controls section 702 is provided that includes controls for adding sharable content, muting a microphone and recording a session. It is to be appreciated that section 702 and the corresponding controls therein are exemplary and that many other options can be provided in section 702 (see, for example, controls 1002 in FIG. 10).

Figure 8:
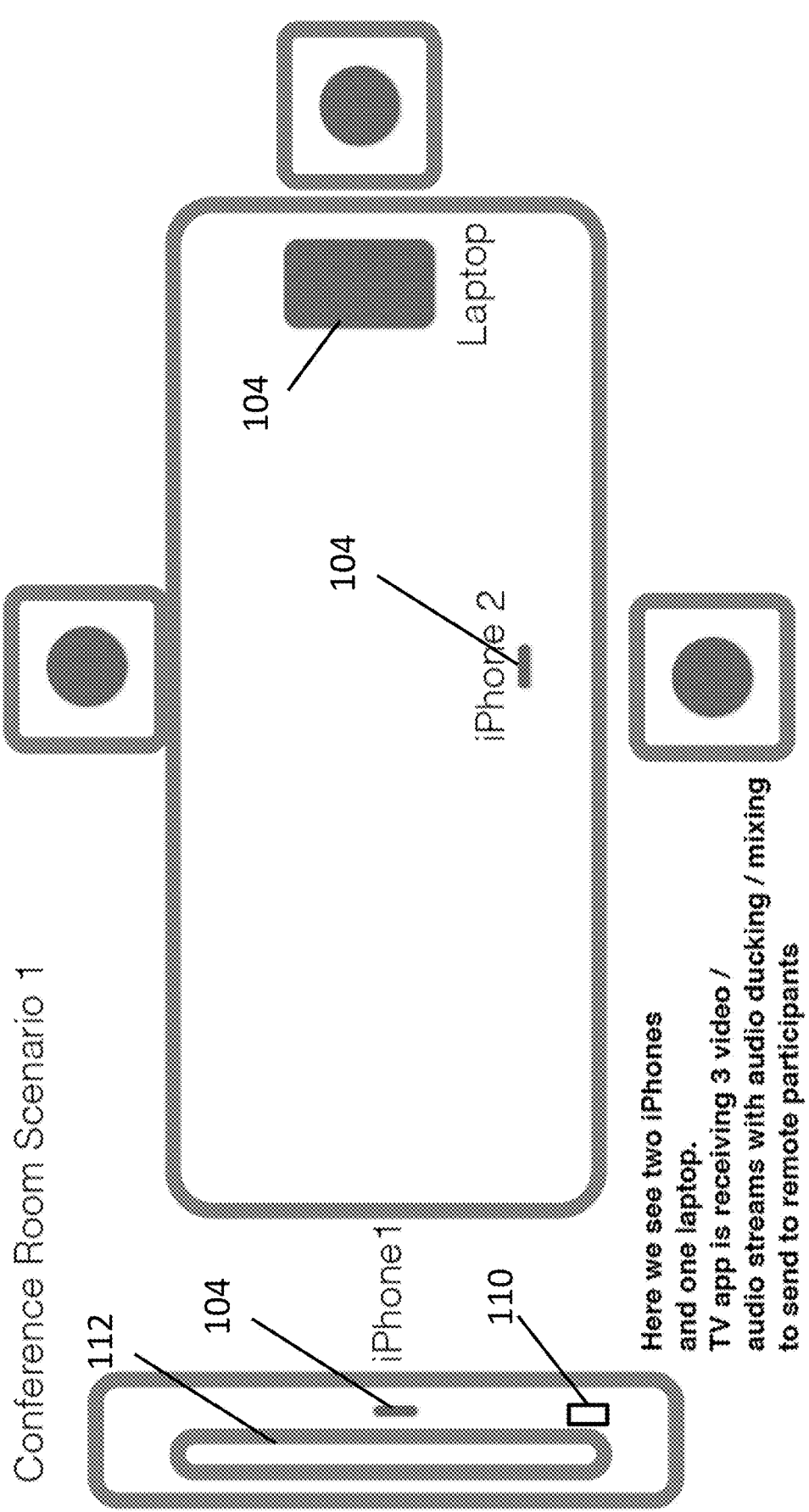
FIG. 8 illustrates an example high-level diagram of an enterprise implementation, including a plurality of user computing devices, an Internet media extender and a television.

In addition to a consumer or residential implementation of the present application, the teachings herein support enterprise use. For example, a business and/or enterprise implementation can integrate an Internet media extender and television to provide a video conferencing and/or data collaboration solution. A block diagram illustrating an example conference room in an enterprise implementation, including a plurality of user computing devices 104, Internet media extender 110 and television 112, is illustrated in FIG. 8.

The following is an example of an enterprise use implementation of the present application. A group of people wish to start a data and video conferencing collaboration session. Some of the people are located in a conference room that includes a TV and a connected Internet media extender (e.g., APPLE TV. Others of the people are in various remote geographic locations, with some using mobile computing devices (e.g., smart hones or tablet computers) and some using desktop/laptop computers. A user associated with the origin or host device starts the session via the Internet media extender via the TV APP and/or a mobile computing device 104 and via the MOBILE APP, which have been downloaded and installed on at least some of the respective devices 104 and 110 in the conference room and operated by the participants. After an initial configuration, which may occur the first time the MOBILE APP and/or TV APP is launched, audio/video content from one or more of the computing devices 104 is provided instantly on the television 112 via the Internet media extender 110.

Continuing with the present enterprise use example, thereafter an invitation can be transmitted, e.g., via the Internet media extender or mobile computing device 104, to one or more other users' computing devices 104. The invitation can include a hyperlink to a URL that can be sent via SMS, email, provided in the MOBILE APP or on an Internet web page. Users of computing devices 104 select the link, which configures the user computing device(s) 104 to launch the MOBILE APP and join the session automatically.

The present application supports integration of multiple cameras and microphones that can be connected remotely to an Internet media extender, such as APPLE TV. For example, a plurality of mobile computing devices 104 (e.g., iPhone/iPad/laptop) connect to a respective session and each provides audio/video feed to the Internet media extender 110 and television 112. This is similar, in practice, to a "Touch-Cast" studio multi-camera setup, which allows multiple cameras to feed into an authoring tool. A description of such an authoring tool is shown and described in greater detail in commonly assigned U.S. Pat. No. 9,363,448, issued Jun. 7, 2016. Supporting, live audio/video feed by multiple cameras provides an advantage and technological benefit for multiple people located in the same room and/or remotely located to utilize their respective mobile devices. In one or more implementations, audio detection mechanisms can be employed such that when a user speaks, feed from the microphone and/or camera on that user's respective device is provided on audio output (e.g., speakers) associated with the television 112 (via, for example, the Internet media extender 114 as well as on connected computing devices 104 operated by people remotely located (i.e., not in the local setting). This provides a different and much improved solution to a conference room "bowling-alley-view") of a single camera located at the head of a table, which tries to capture everyone in the conference room. In one or more implementations, cameras associated with the connected computing devices 104 can be "cut to" via one of several ways. In one case, for example, the host user can make selections to switch input from various cameras/devices. In another example case, for example, the MOBILE APP configures the respective computing devices 104 with automatic speaker detection, which operates to detect when a user is speaking and input from that user's respective camera/microphone can be presented to the other user computing devices 104 in the session. In yet another case, for example, a user proactively takes control to have audio/video feed from his or her user computing device 104, which can be effected by simply tapping on the screen of the user's computing device 104, to make that user's device 104 provide the primary feed, and can be presented to the other user computing devices 104 in the session.

In one or more implementations, the present application supports video compositing on the TV APP and/or the MOBILE APP, which can include sharing of content between a plurality of devices. The present application supports multiple configurations in which multiple users are presented during the same session. For example, a primary presenter is viewable on all the devices, and everyone else connected to the session views the primary presenter and/or content the primary presenter shares. In another configuration, co-viewing is supported, in which a plurality (e.g., all) members of the session are visible on the screen at the same time in such a setting, live co-viewing of content viewed by participants is preferably synchronized. For example, content can include YouTube videos, and a group of viewers watch videos together and are in sync as they do so, allowing participants to control the playlist of upcoming content, effectively collaboratively creating a playlist. Another example can include video streams that are live from an external feed. Other examples include viewing a website, and reviewing images and videos from the users' mobile devices 104 (via same stream from device 104 to the Internet media extender 110).

In yet another configuration, a hybrid mode is supported in which participants can be presented, and one or more instructions executing on a computing device 104/data processing apparatus 102 implement an algorithm that governs which respective user computing device 104 is featured, making some device(s) more prominent as a function of current activity (e.g., someone speaking). In yet another implementation, multi-camera coverage is supported for a location (e.g., a conference room) which is configured by a primary camera positioned at or with the television 112 that is coupled to the Internet media extender 110, and that includes participants' user computing devices 104. In operation, content can cut between the fall view of the room and the individual participants when they speak.

Figure 9A:
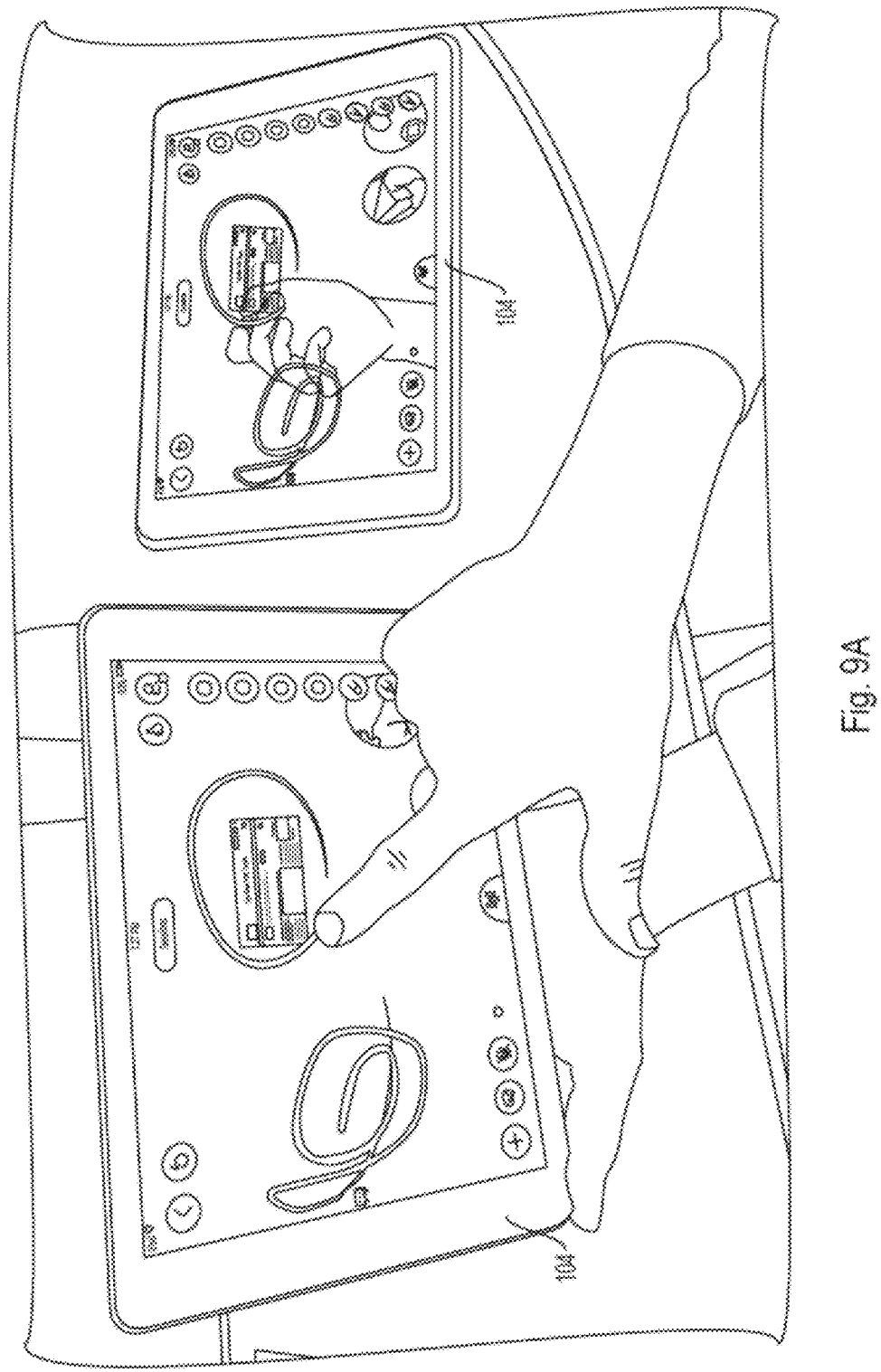
FIGS. 9A-9D illustrate examples of sharing content between devices, in accordance with an example implementation of the present application.
Figure 9B:
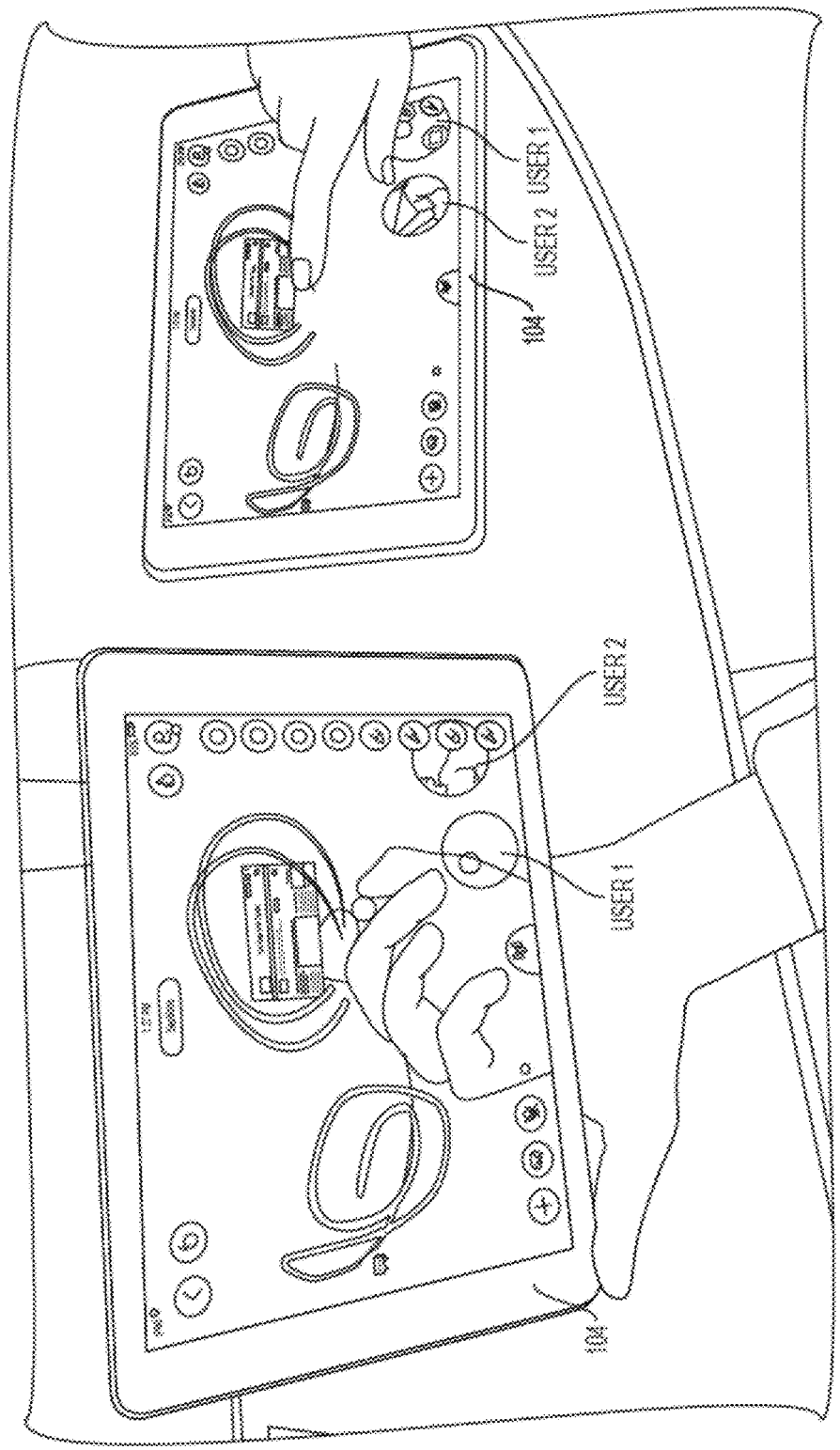
Figure 9C:
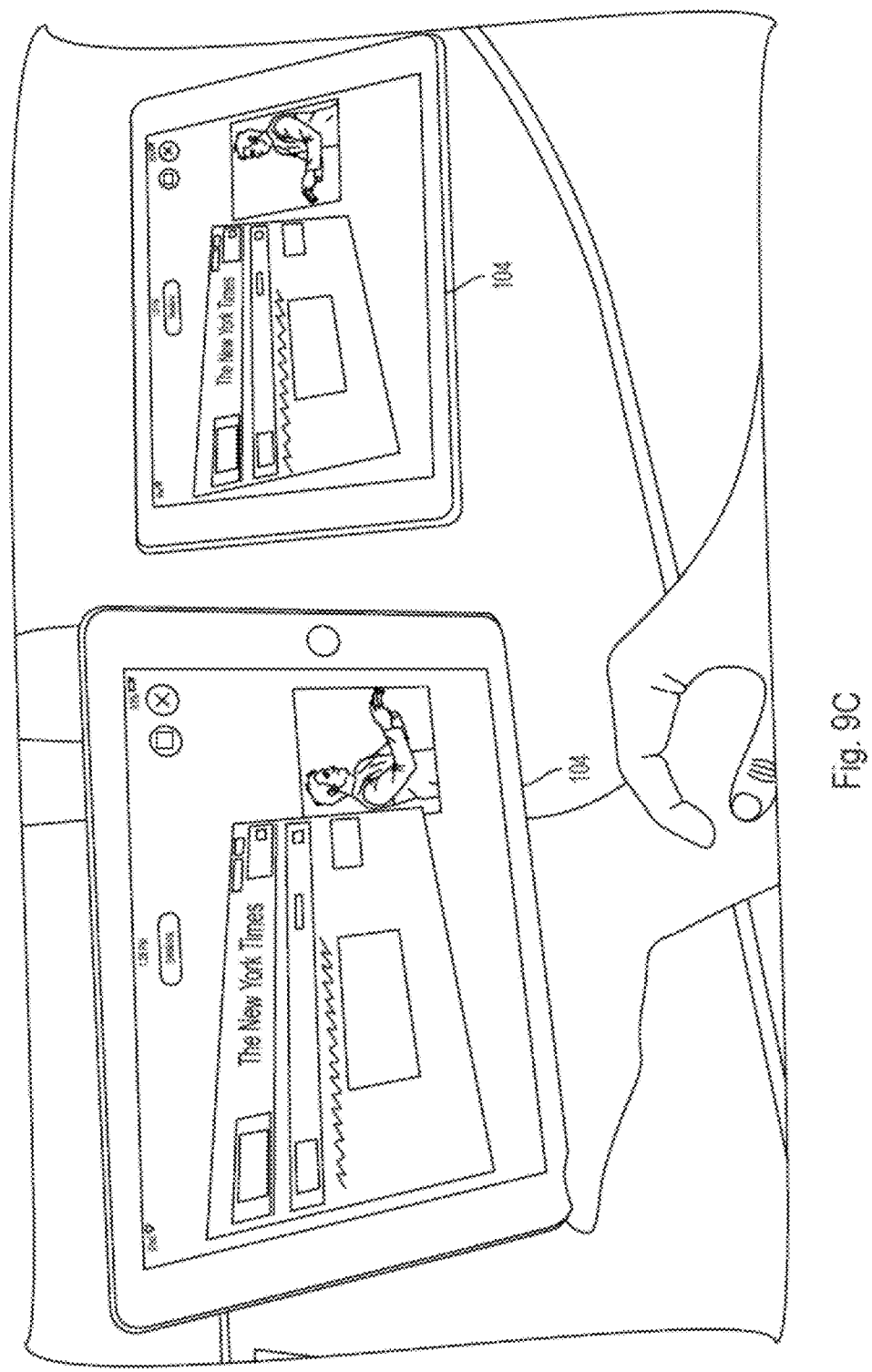
Figure 9D:
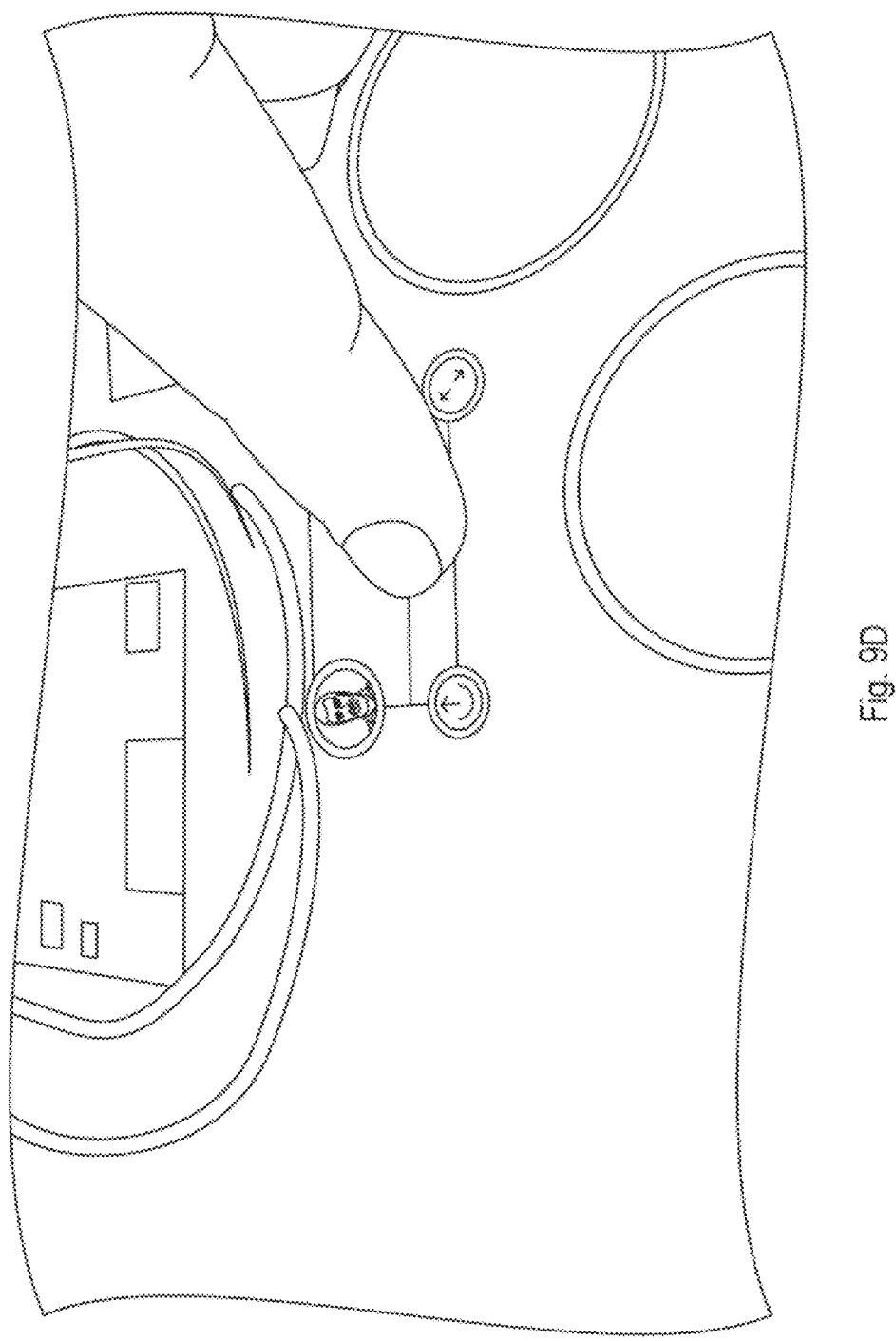

FIGS. 9A-9D illustrate examples of sharing content between devices 104, in accordance with an example implementation of the present application. Examples in FIGS. 9A-9D identify respective control over portions of content of interactive display screens of user computing devices 104, including as used to provide content on a plurality of devices 104, as well as for individual control over a respective user computing device 104. For example, and as illustrated in FIG. 9D, individual portions can be sized, moved, or otherwise transformed in a respective user's user computing device 104, without affecting other devices 104. Each of a plurality of users (e.g., USER 1 and USER 2) can be represented in each of the respective computing devices 104, such as shown and represented in FIG. 9B. In one or more implementations, the users are represented in video that is captured by cameras configured with the respective users' computing devices, and that is displayed substantially in real-time.

FIG. 10 illustrates an example set of applications and controls 1002 available via the MOBILE APP and operating on user computing device 104 during an interactive video conferencing session, in accordance with the present application. As shown in controls 1002, options for drawing, and providing content from online sources (e.g., webpages, Wikipedia, news sources, maps, Twitter or the like), as well as controls for drawing tools, apps (e.g., calculator, image editing/controls and audio/video feed). Other activities can be integrated, such set forth in vApps, and in the context of communications. For example, games such as Tic/Tac/Toe, Chess, Backgammon, puzzle games, draw together, trivia, cards and table game. Other games can include action games, such as first person shooter games. In addition to games, virtual adventure and exploration is supported, such as GOOGLE MAPS and 360 views, and photo galleries (e.g., FLICKR, GOOGLE IMAGES), shopping galleries, planning tools (e.g., for travel, entertaining, ordering food, etc.), and various professional consultation is supported, such as telemedicine and other professional consultations.

In addition, workplace collaboration tools are supported, and members of a given session can collaborate to create something together. Examples of collaboration and collaborative tools include a collaborative whiteboard, document creation and editing, mood board collaboration, general brainstorming, reviewing comps, training and instruction (with real-time assessment), focus group input, and can include real-time voting, sharing, collective web site and/or web application use that includes (but is not limited to) documents, spreadsheets, content management, project management, calendar planning or the like.

Thus, as shown and described herein, in one or more implementations the present application provides systems and methods for participating video conferencing and sharing that can be layered with interactive content, including content that is available over one or more data communication networks, such as the Internet. Further, one or more software applications provide a viewing/interactive tool for end-users who receive videos that are authored in accordance with the present application, including in an on-line interactive conference. Using a client interface (which may be configured in a MOBILE APP, or provided via a standard web browser application or other suitable platform), users may interact with videos as a function of touch and gestures, as well as other suitable interfaces, such as provided via an application that configures a smartphone or other mobile computing device to simulate a laser pointer, drawing tool, mouse, trackball, keyboard or other input device.

In one or more implementations of the present patent application, a processor configured with code processes information representing a selection event that occurred in the display unit. For example, a user makes a selection in a remote control software application operating on his or her mobile computing device (e.g., iPhone) in a portion of the display unit while the interactive media content in the display unit is provided therein. The processing that occurs can be to determine at least a relative time and location of the selection event that occurred in the second portion of the display. The information representing the selection event can be stored in one or more databases that are accessible to at least one computing device. The selection of an item can be processed to enable the interaction with at least a portion of the interactive media content at one of the remote devices associated with the selection event. This enables results of a respective interaction associated with the selection event to be viewable or otherwise provided at one particular remote device, but not viewable or otherwise provided at other of the remote devices.

Other functionality includes drawing and selection features, which is effective for explaining and highlighting features within a coordinated presentation, including during an interactive video conferencing session. Further, in one or more implementations, the present application supports providing virtual representations of respective users that are interfacing via a respective video conferencing session in accordance with the teachings herein. For example, one or more modules can be implemented to simulate the viewpoint for each of the respective users that one particular user is located "behind" the display screen configured with, or otherwise accessible by, user computing device 104.

Figure 11A:
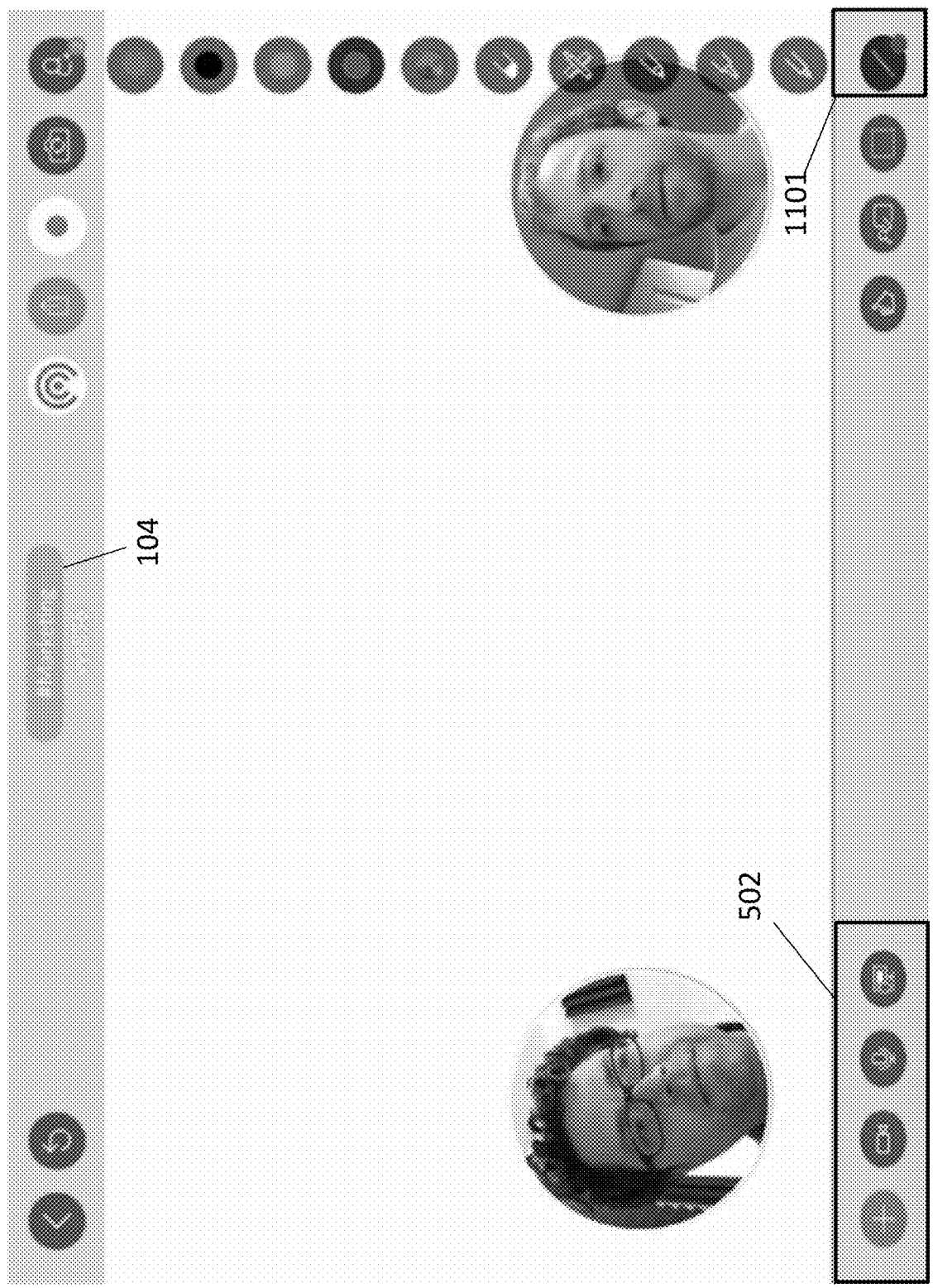
FIGS. 11A-11E illustrate examples of sharing content between devices, in accordance with an example implementation of the present application.

In addition to simulating a respective user in the display screen being at a particular location (e.g., "behind" the screen), a partial representation of a person, such as a person's hand or other part, can similarly be represented and displayed in dynamic ways to represent movement, such as in the context of an interactive video conferencing session. Such functionality can be provided in a particularly configured vAPP. An example is set forth in FIGS. 11A-11E. FIG. 11A illustrates an example video conferencing session displayed on a user computing device 104, in which the session is between two users (USER 1 and USER 2). As shown in FIG. 11A, writing virtual control (e.g., icon) 1101 is included that, when selected, causes computing device 104 and/or data processing apparatus 102 to execute one or more instructions to enable a unique interactive environment which simulates the appearance of users.

Figure 11B:
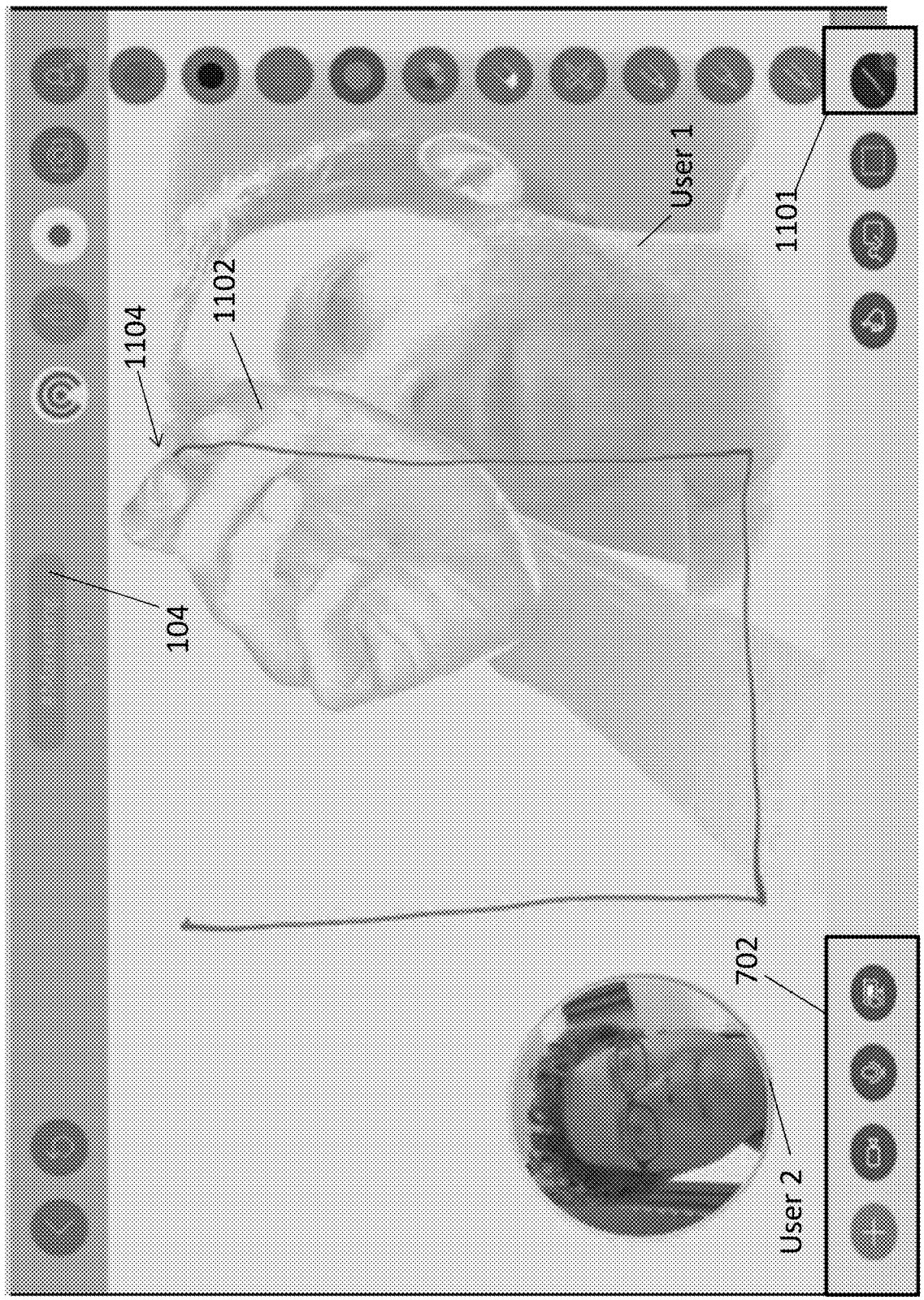

Continuing with reference to FIG. 11A, after control 1101 has been selected, the simulation effect can occur dynamically as a user interacts with user computing device 104, such as by drawing or writing on the screen, using his or her finger, an electronic passive or active stylus or other suitably configured writing device. Upon a determination by computing device 104 that a user is interacting accordingly, one or more processes can operate to detect and capture specific information associated with the interaction, such as that a user is drawing on his or her display with a stylus and the specific location where the stylus is in contact with the display. Further, the computing device 104 and/or 102 can alter the video representation of an interacting user (e.g., USER 1) on one or more of the computing devices operated by the respective other users during the interactive video conferencing session. An example is shown in FIG. 11B, in a display of a computing device operated by USER 2 is shown, and in which the video representation of USER 1 has been enlarged and shaded as a function of one or more filter effects (e.g., shading and size). In addition to altering the video representation of USER 1 on the computing device of USER 2, a graphical representation of a human hand 1102 has been overlaid on the display of user computing device 104. The hand 1102 is represented to be holding a writing instrument, such as a stylus (e.g., APPLE PENCIL). Furthermore, the writing instrument is configured to appear to be making contact with the surface of the display at the specific point 1104 at which USER 1 is interacting. In one or more implementations, the altered representation of USER 1 can be provided on all of the computing devices of the interactive video conferencing session, including the computing device operated by USER 1. Alternatively, the computing device operated by USER 1 is not affected while USER 1 interacts, such as by drawing on his or her display screen.

Figure 11C:
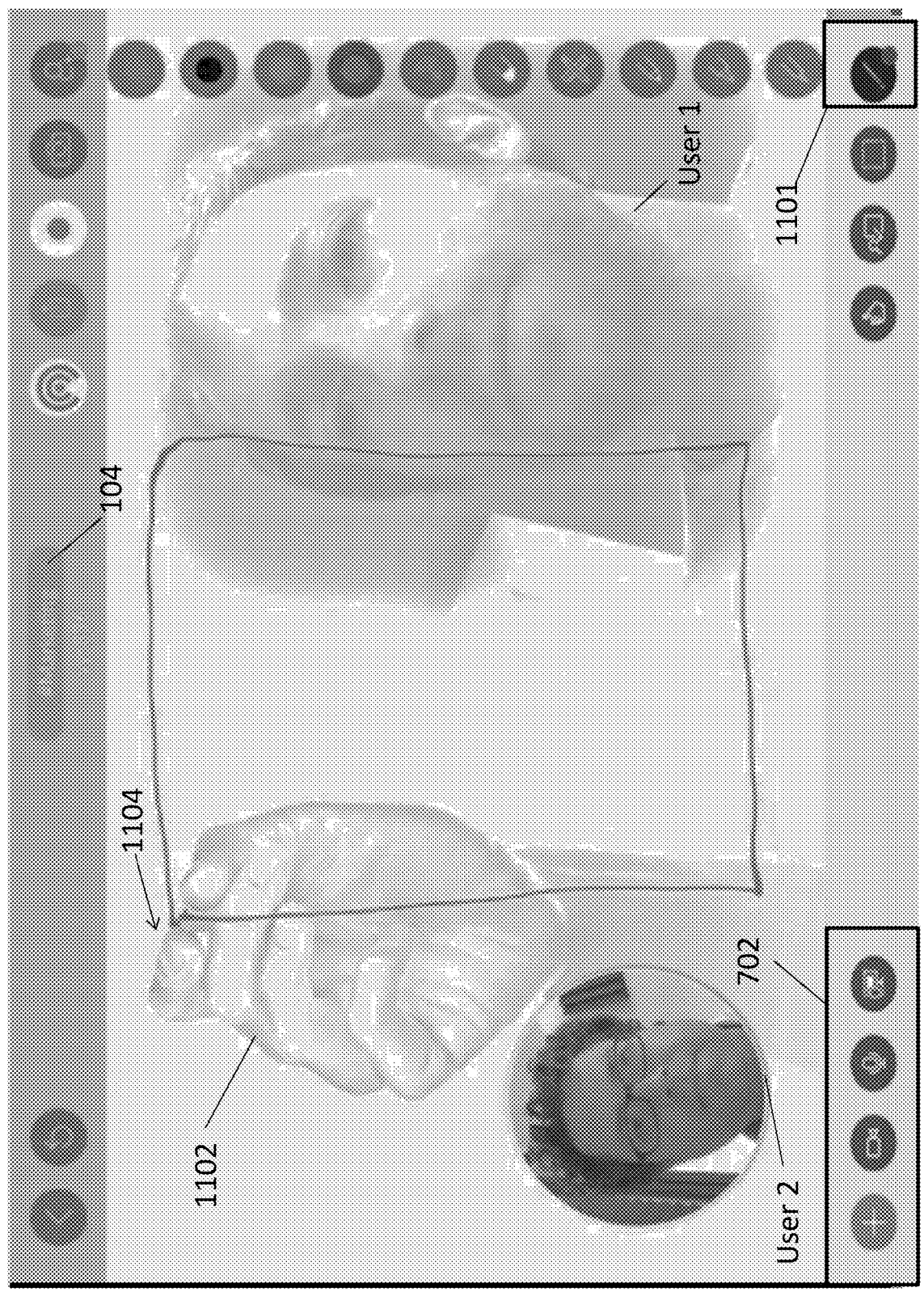
Figure 11D:
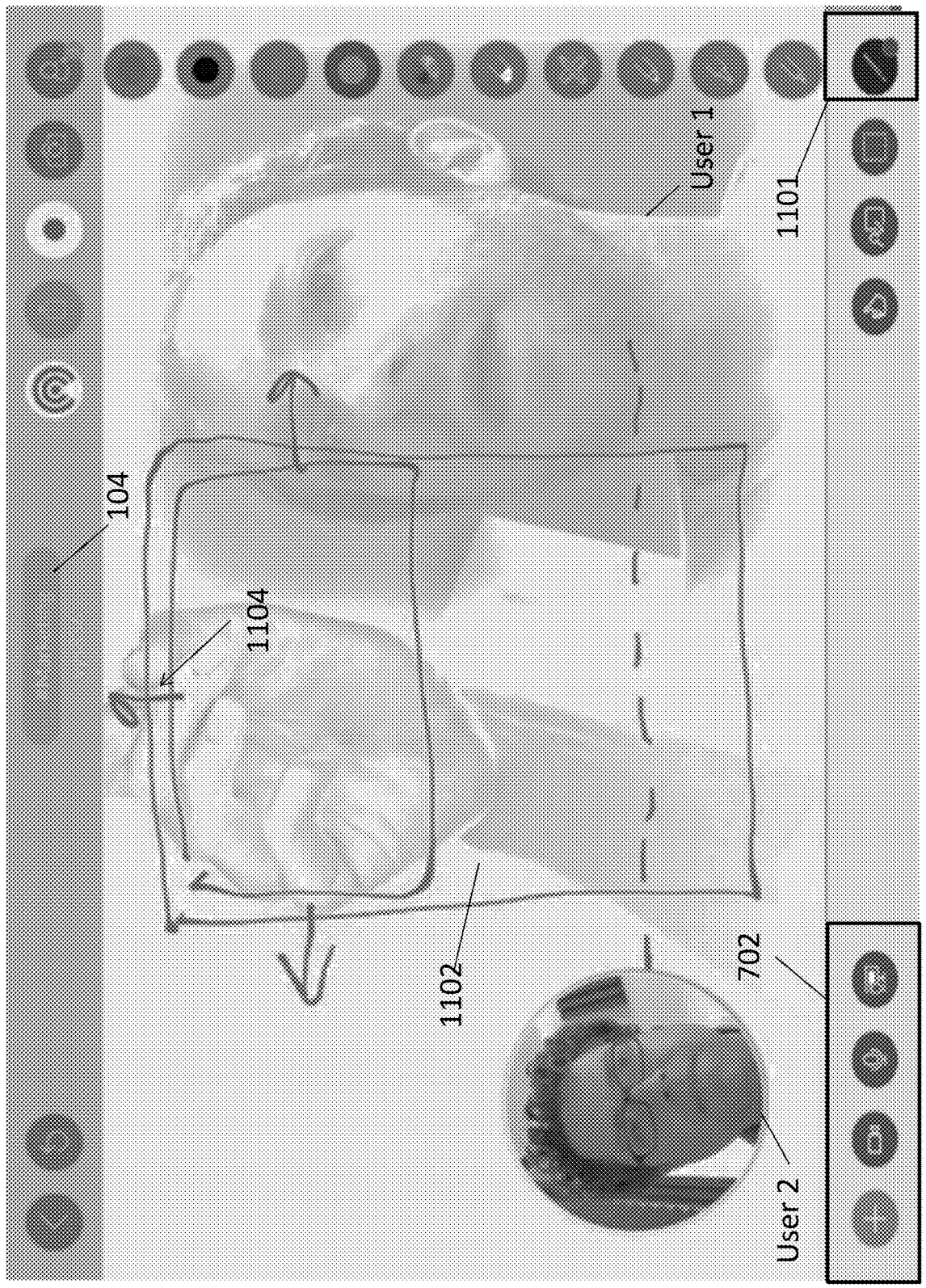
Figure 11E:
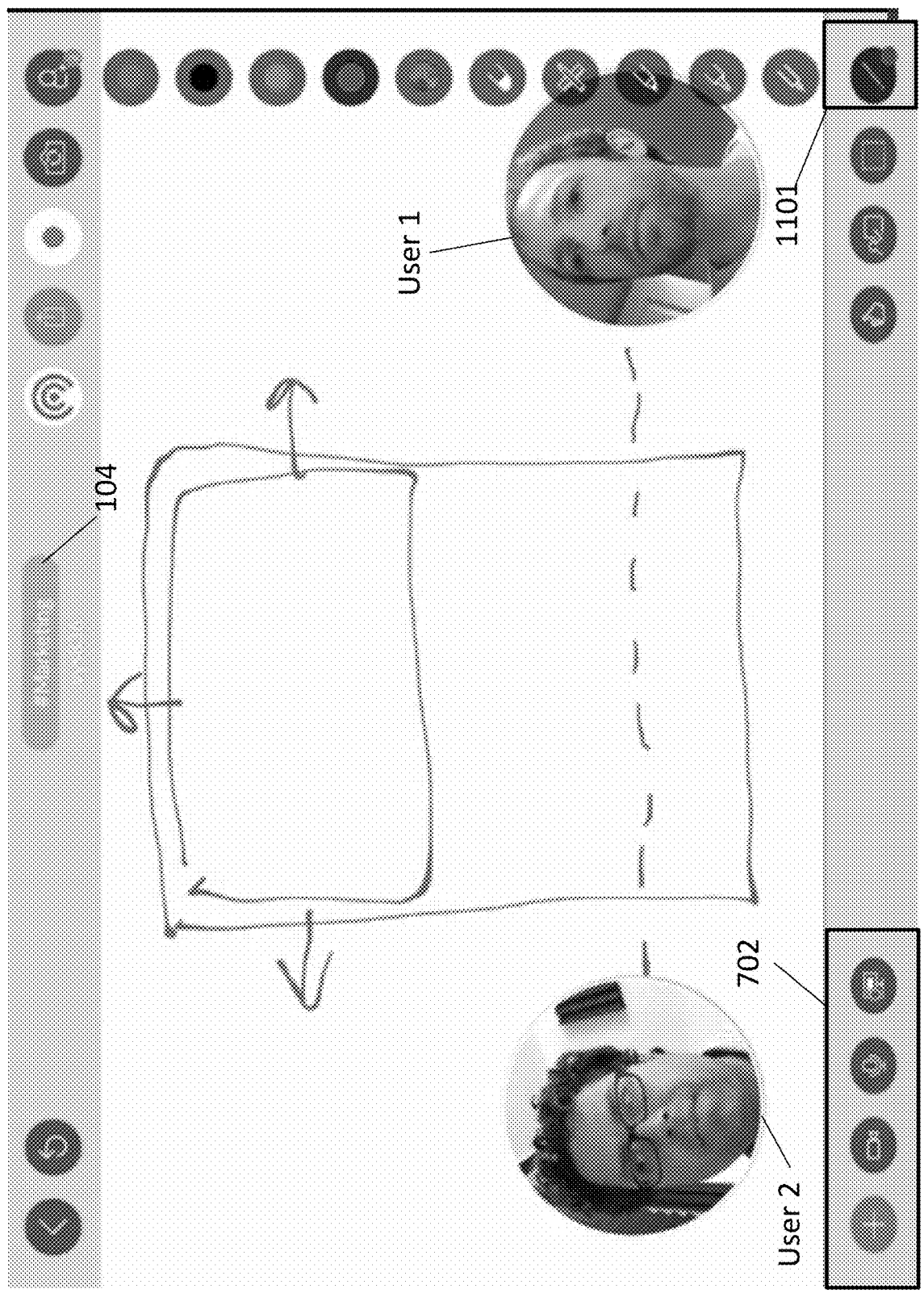

Thus, for example as shown in FIGS. 11A-11E, by shading and enlarging the size of the video representation, USER 1 appears to be positioned on the other side or within the computing device 104 operated by another user e.g., USER 2). This can be implemented using one or more image and/or video editing techniques. For example, adjustments can be made to the video content to implement transparency, shading, size or other suitable effects, and one or more layer masks can be used to selectively apply the adjustment. In addition or in the alternative, a video composite can be generated that dynamically changes (e.g., moves or changes positions) in accordance with respective user interaction and or activity. Moreover, one or more overlays can be added or removed during an interactive video conferencing session in accordance with specific user activity. For example, FIGS. 11B-11D illustrate video content showing USER 1 in an enlarged and shaded format, which occurs as a function of USER 1 interacting by writing on the display screen of his user computing device 104. Upon lifting his writing instrument away from the display screen, thereby ending his respective edits, the video showing USER 1 returns to its previous format (FIG. 11E). In one or more implementations, when the user ceases to interact, such as by writing on his or her display, the user's writing or drawing can remain displayed on each of the other users' computing devices. Thus, the illusion of a user drawing from the other side of the display can end, yet the artwork, writings or the like remains. In this way, a dynamic representation of a user interacting with his or her user computing device 104 is provided in accordance with the teachings herein.

By altering the respective appearance of video representing a user (e.g., USER 1) and adding one or more dynamic components (e.g., hand 1102), the present application provides for a realistic and interactive experience for users of an interactive video conferencing session. In one or more implementations, as a user (e.g., USER 1) interacts by writing on his or her display, computing device 104 and/or 102 detects and monitors the activity substantially in real-time. Moreover, a portion of the display can be mapped as a series of coordinates and/or pixels, and the respective location of each interaction can be determined and used for setting a corresponding location on each user's computing device during an interactive video conferencing session. For example, as a user (e.g., USER 1) draws at specific coordinates on his or her computing device, a virtual hand 1102 can be generated and displayed on each of the other users' computing devices, with the specific point 1104 of the stylus represented as being held by the virtual hand 1102 positioned at the same coordinates. Continuing with this example, as USER 1 draws (or writes as the case may be) at different locations, the virtual hand 1102 moves and the specific point 1104 of the stylus moves to the same location(s). In one or more implementations, the hand 1102 can be configured to turn and rotate, such as particular locations within the display screen, in order to provide a more realistic and accurate representation of someone writing or drawing. In one or more implementations Non-Uniform Rational Basis Splines ("NURBs"), as known in the art, can be used to represent geometric models (e.g., hands) accurately.

Figure 12A:
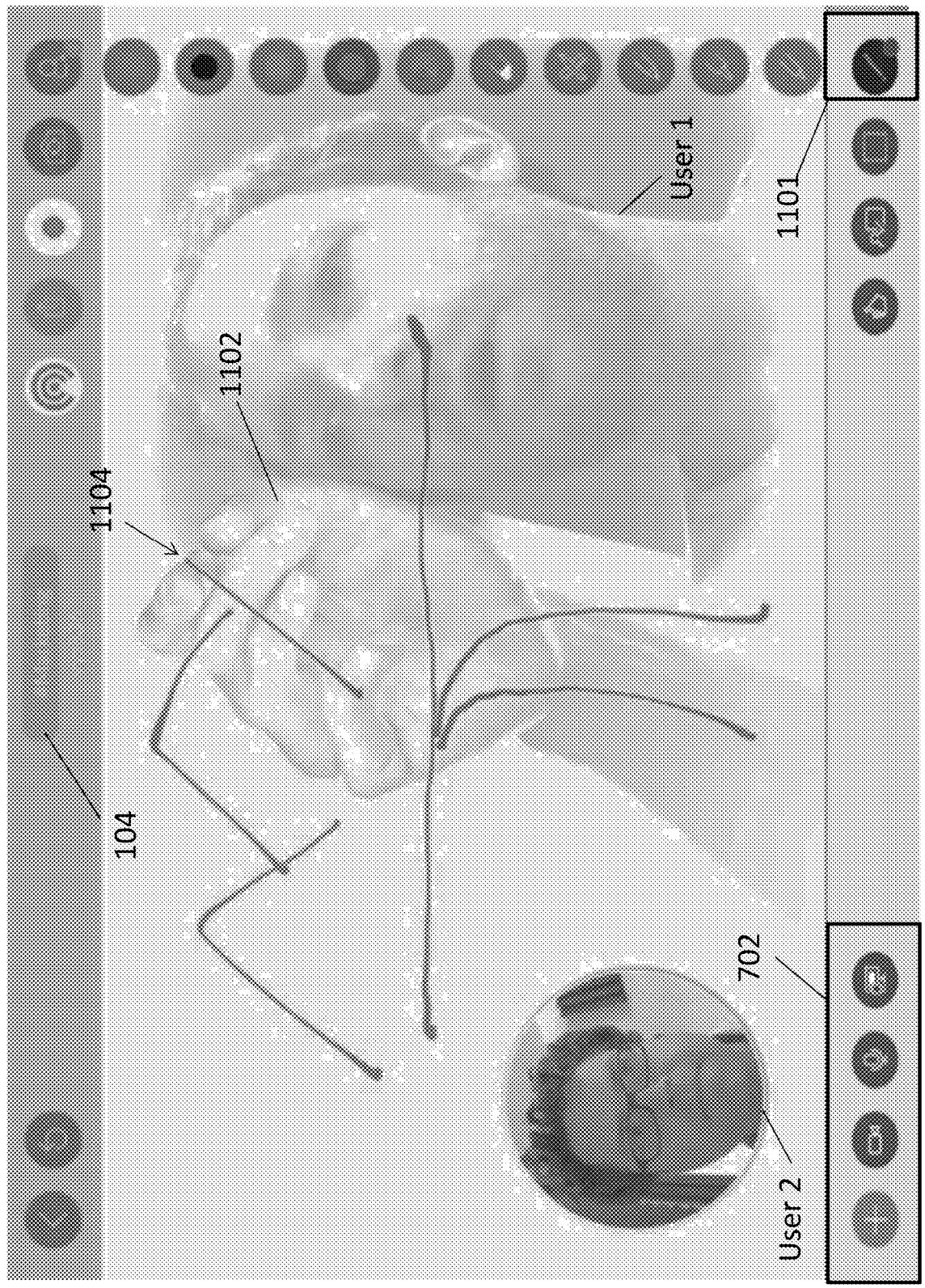
FIGS. 12A-12B illustrate examples of sharing content between devices, in accordance with an example implementation of the present application.
Figure 12B:
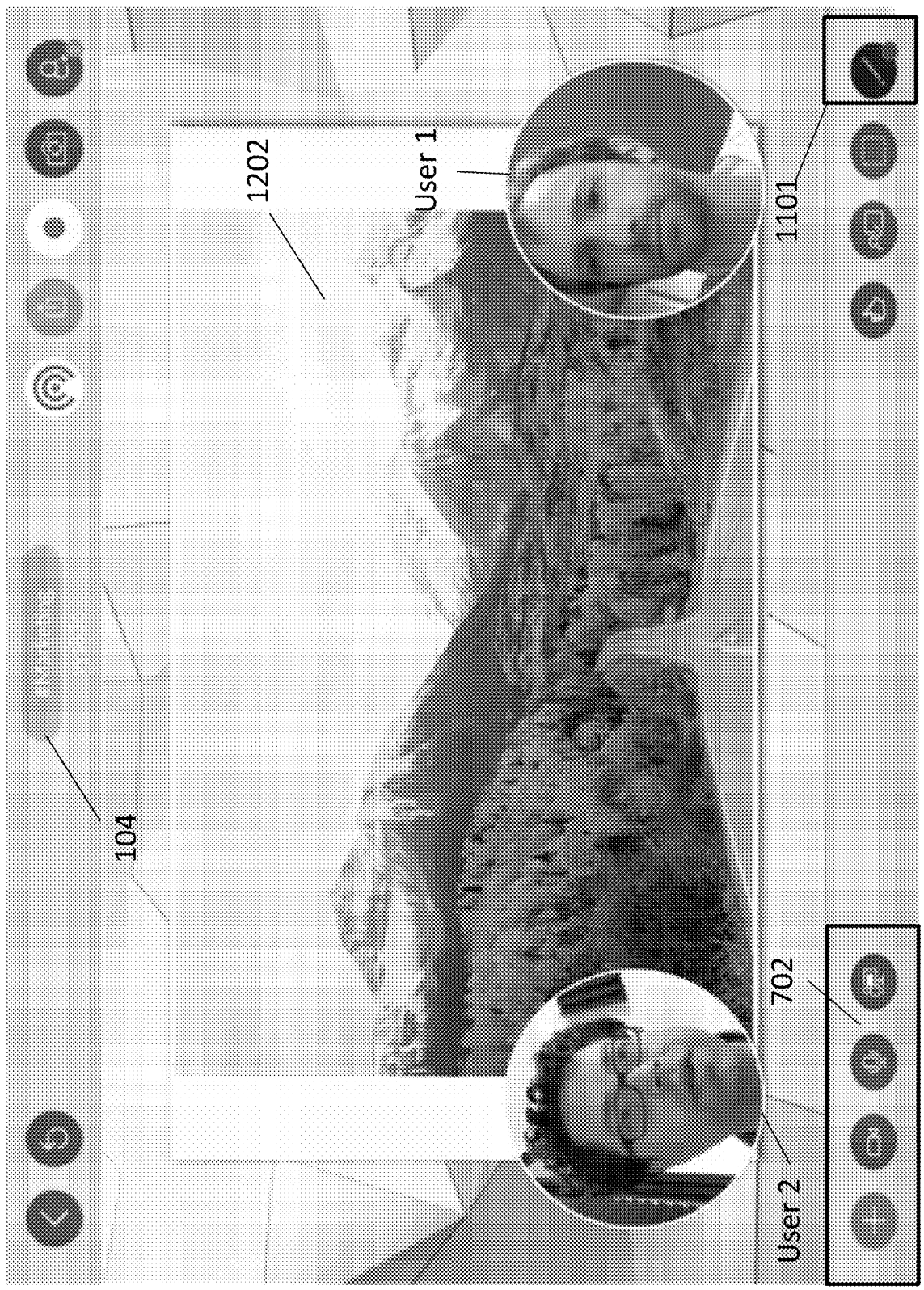

By providing a virtual and dynamic representation of a user interacting as shown and described herein, the present application provides for a significantly improved collaborative tool. FIG. 12A, for example, illustrates a display screen of a computing device operated by USER 2, and shows USER 1 drawing a landscape that includes mountains and a road. USER 1 is drawing the landscape to show USER 2 a type of photographic image that USER 1 would like to use for commercial purposes. After seeing the simple drawing, USER 2 selects an icon to browse for specific content, such as images that are stored on the computing device operated by USER 2. After locating a suitable image that is locally stored and USER's 2 computing device, the image is inserted and shown to USER 1 (FIG. 12B).

Figure 13A:
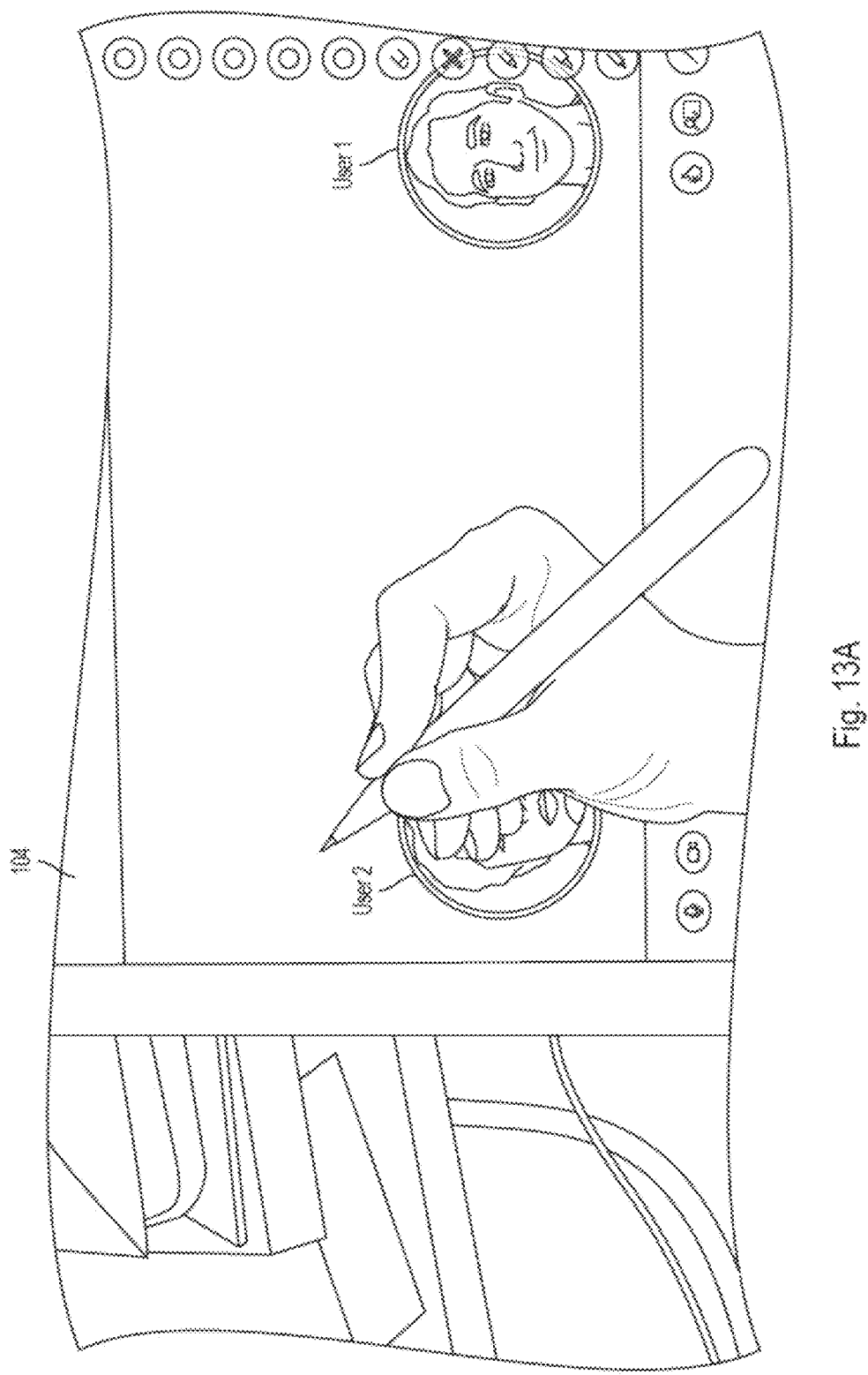
FIGS. 13A-13B illustrate an example user computing device configured and operational in accordance with the present application.
Figure 13B:
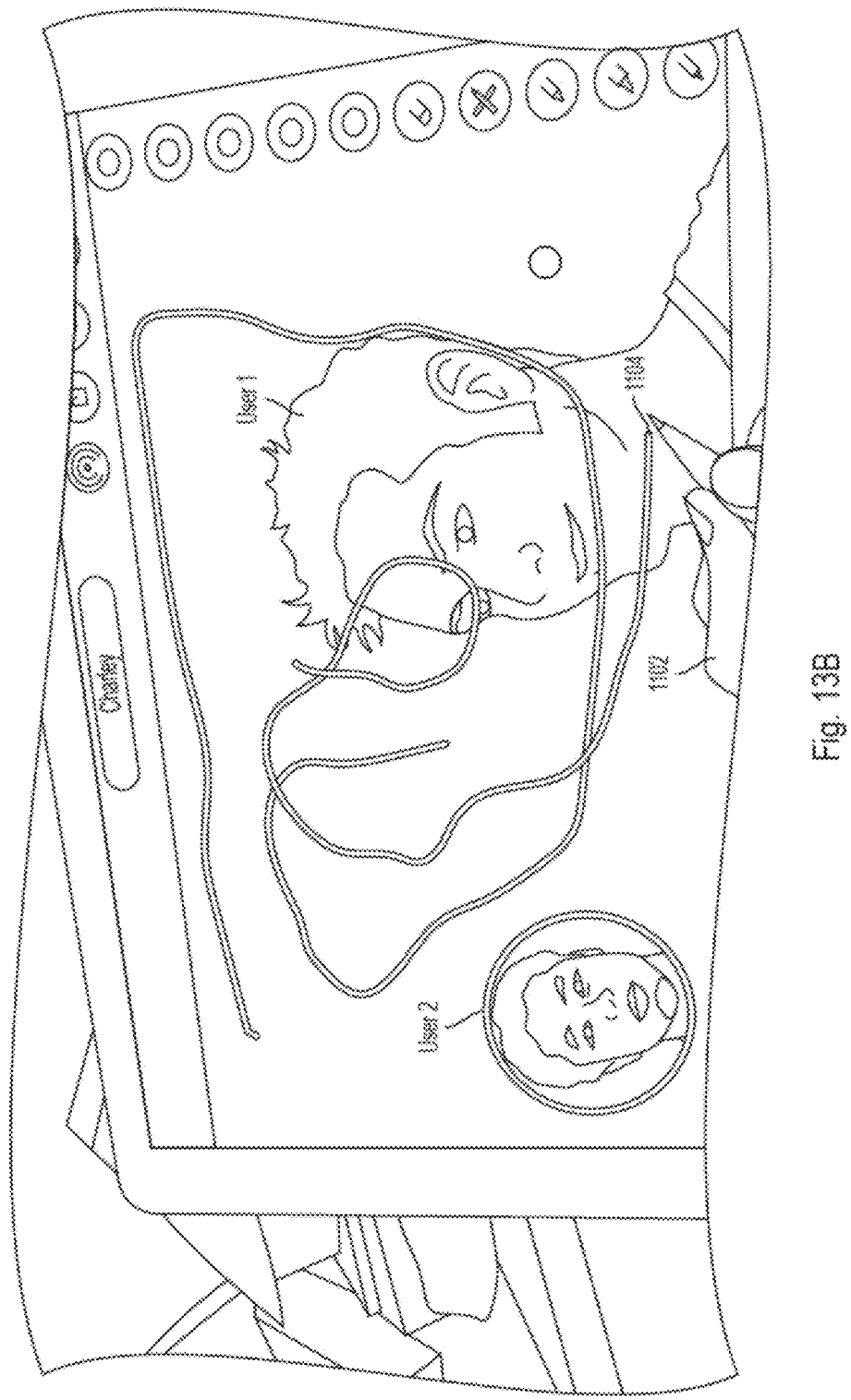

FIGS. 13A-13B illustrate example implementations of the present application from the perspective of a user (USER 1) drawing on a display. In the example shown in FIG. 13A, USER 1 is preparing to draw on his display using a stylus, but has not yet made contact with the display. In FIG. 13B, USER 1 has caused his stylus to make contact with the display and is drawing. In the example shown in FIG. 13B, the enlarged and shaded representation of USER 1 is displayed on the computing device operated by USER 1.

With the exemplary computing system environment being generally shown and discussed above, the method and system of the invention in accordance with illustrated embodiments will now be discussed. It is to be appreciated that the method described herein has been indicated in connection with a flow diagram for facilitating a description of the principal processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

Figure 14:
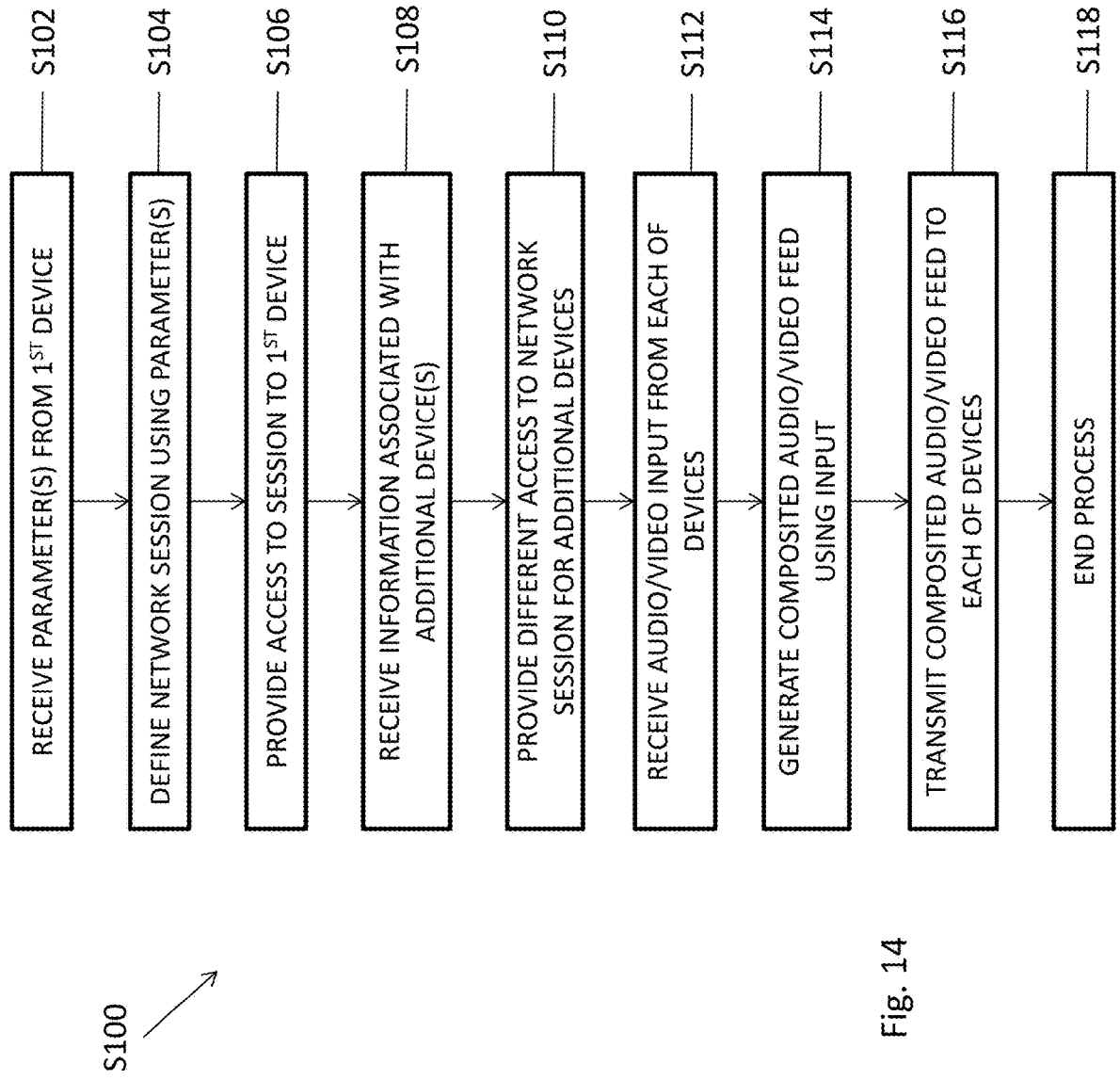
FIG. 14 is an example flow diagram illustrating example steps associated with an implementation of the present application.

FIG. 14 illustrates a flow diagram of steps S100 in connection with one example implementation of the present application. At step S102, one or more parameters are received from a first user computing device 104 that represent a session (e.g., #SALES) (step S102). Using the parameter(s), a network session is defined (step S104). Thereafter, access is provided to the first user computing device 104 (step S106). The network session access can include, for example, functionality that is provided for presenter or origin or host devices, which can include additional rights than provided to participant or non-presenter devices. From the first user computing device 104, information associated with additional computing device(s) 104 is received (step S108). Using the information received in step S110, different access to the network session is provided for the additional computing device(s) (step 110).

Continuing with reference to the flow diagram shown in FIG. 14, at step S112 audio and/or video ("audio/video") input is received from each of the respective devices 104. For example, feed from a camera and/or microphone that is operatively connected to each computing device 104 is received by data processing apparatus 102. Thereafter, a composited audio/video feed is generated using the audio/video input (step S114), and the composited audio/video feed is transmitted to each of the devices 104 (step S116). Each of the first user computing device 104 and the additional user computing devices 104 is configured via a gesture-based user interface to enable user-based selection and respective manipulation of at least a portion of the composited audio/video feed that results in a customized representation of the composited audio-video feed at a particular one of the at least one additional user computing device that is not represented at a particular other of the at least one additional user computing device. Thereafter, the process ends (step S118).

FIGS. 15A-15G illustrate an example implementation and show display screens 1500, 1510, 1520, 1530, 1540, 1550 and 1560, and include sequence in an implementation of the present application in which four (4) participants participate in an interactive conferencing session in accordance with an example implementation. During the session, the participants are represented (1502A, 1502B, 1502C, and 1502D) at the bottom portion of the display, such as in the APPLE dock or WINDOWS taskbar. Representations 1502A-1502D comprise audio/video of the participants, such as live feed, that is received from each of the respective participants' computing devices during the interactive video conferencing session. For example, audio/video input is captured from the users' local devices' microphones and cameras. In one or more implementations, one or more software applications are installed on the participants' local computing devices and usable to transmit the content (e.g., by packaging the content with other information, such as representing to identify the users and/or their respective computing devices). The content is received and displayed during interactive video conferencing sessions, such as represented in display screens 1500-1560.

Figure 15A:
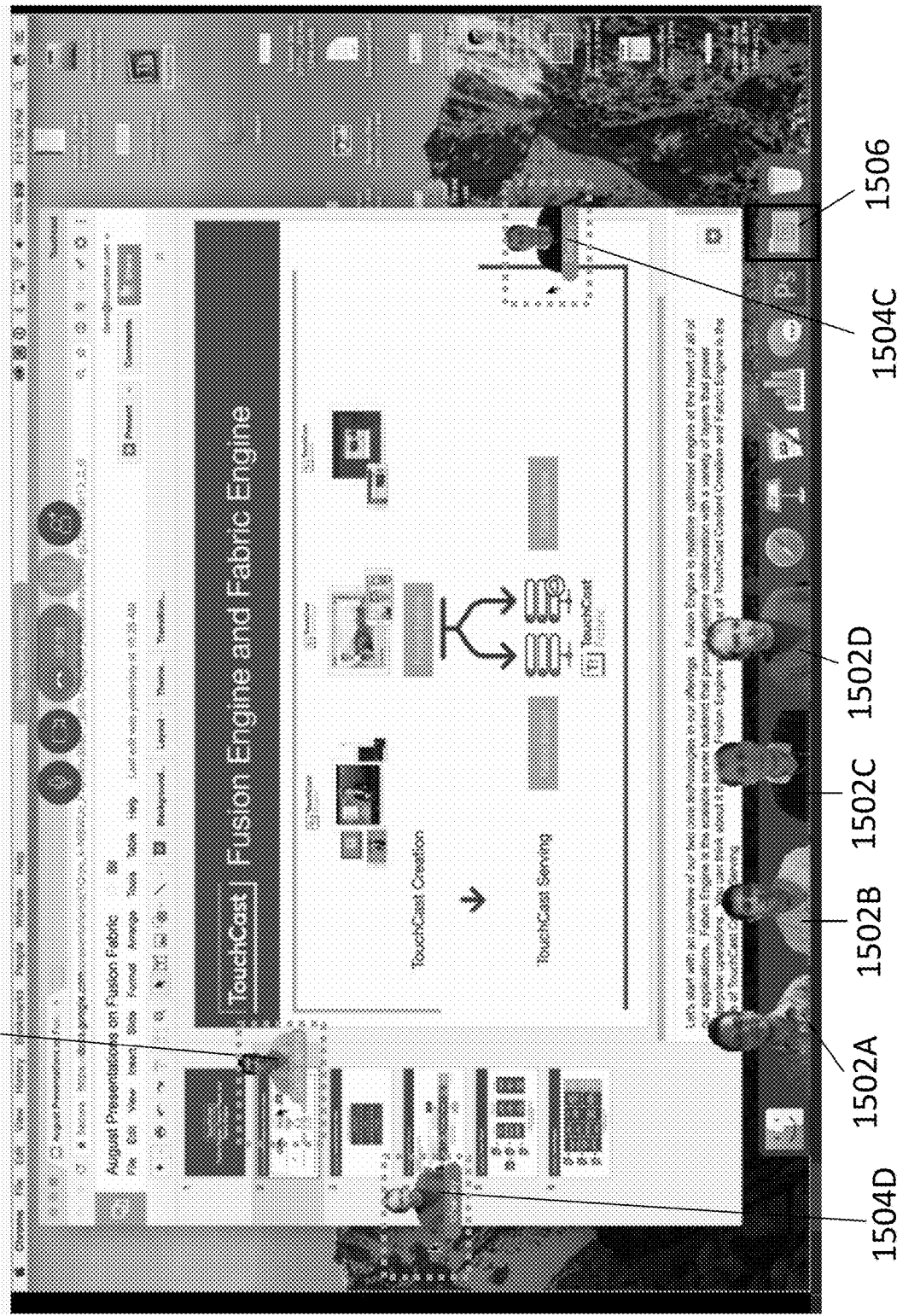
Figure 15B:
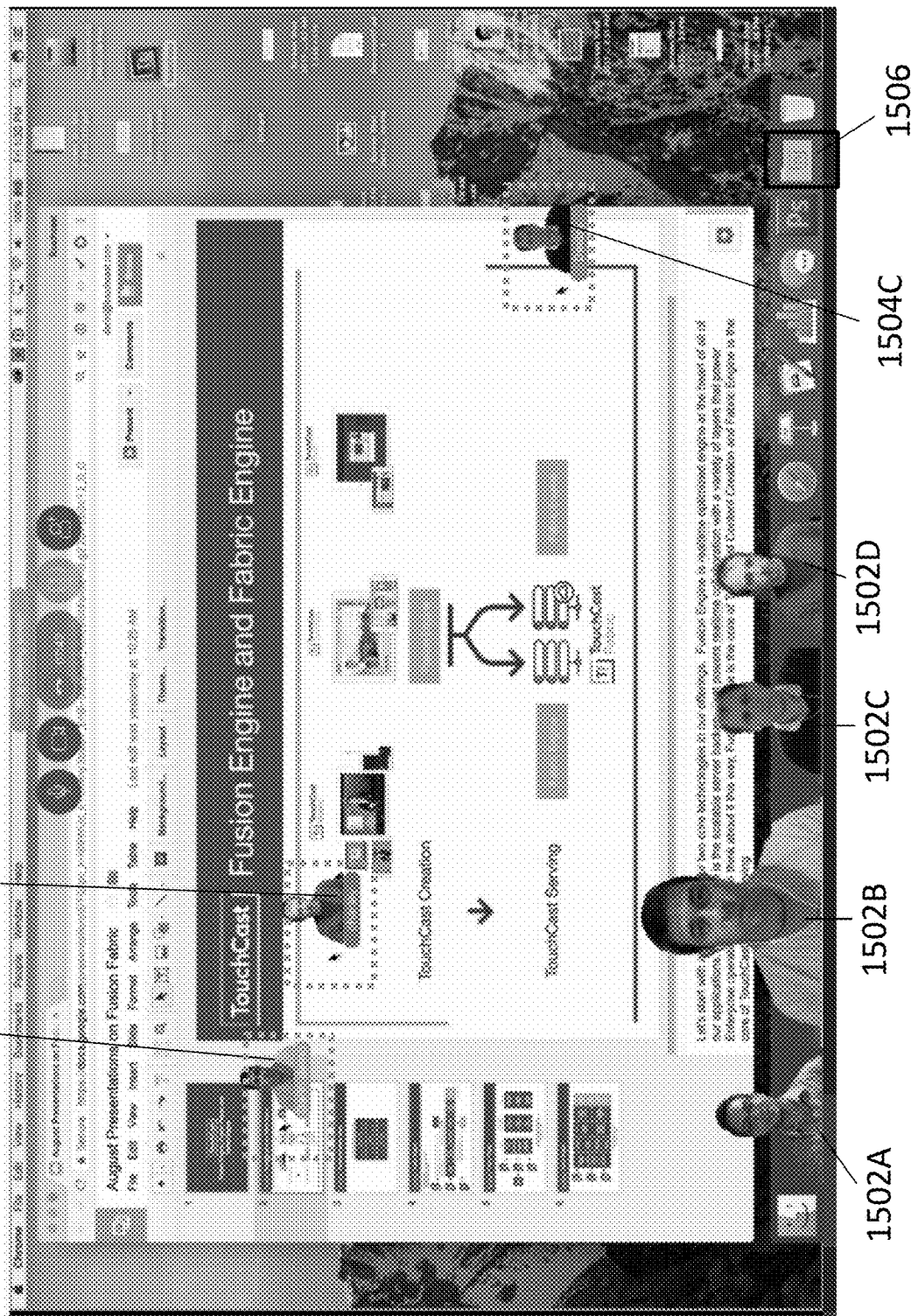
Figure 15D:
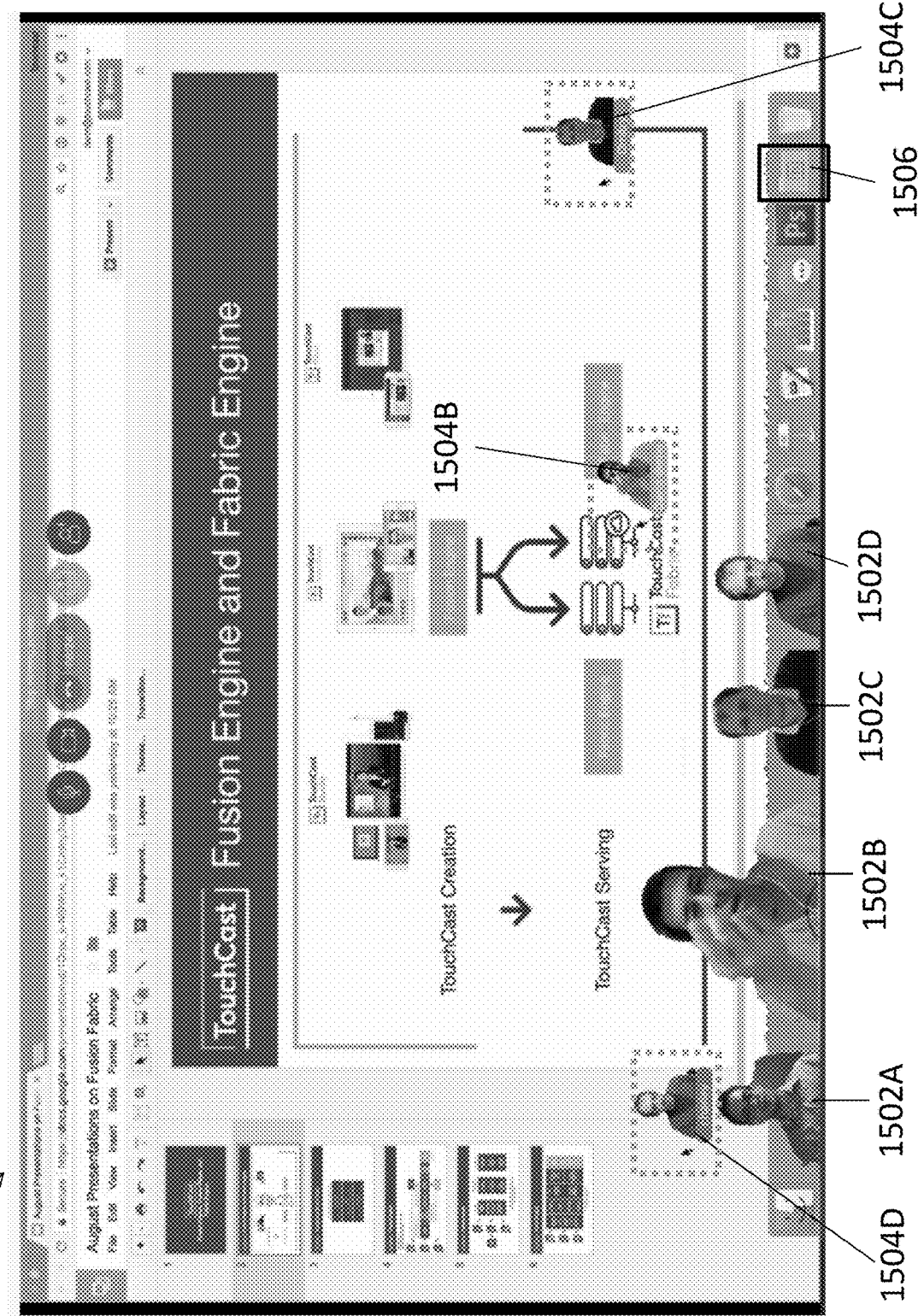
Figure 15E:
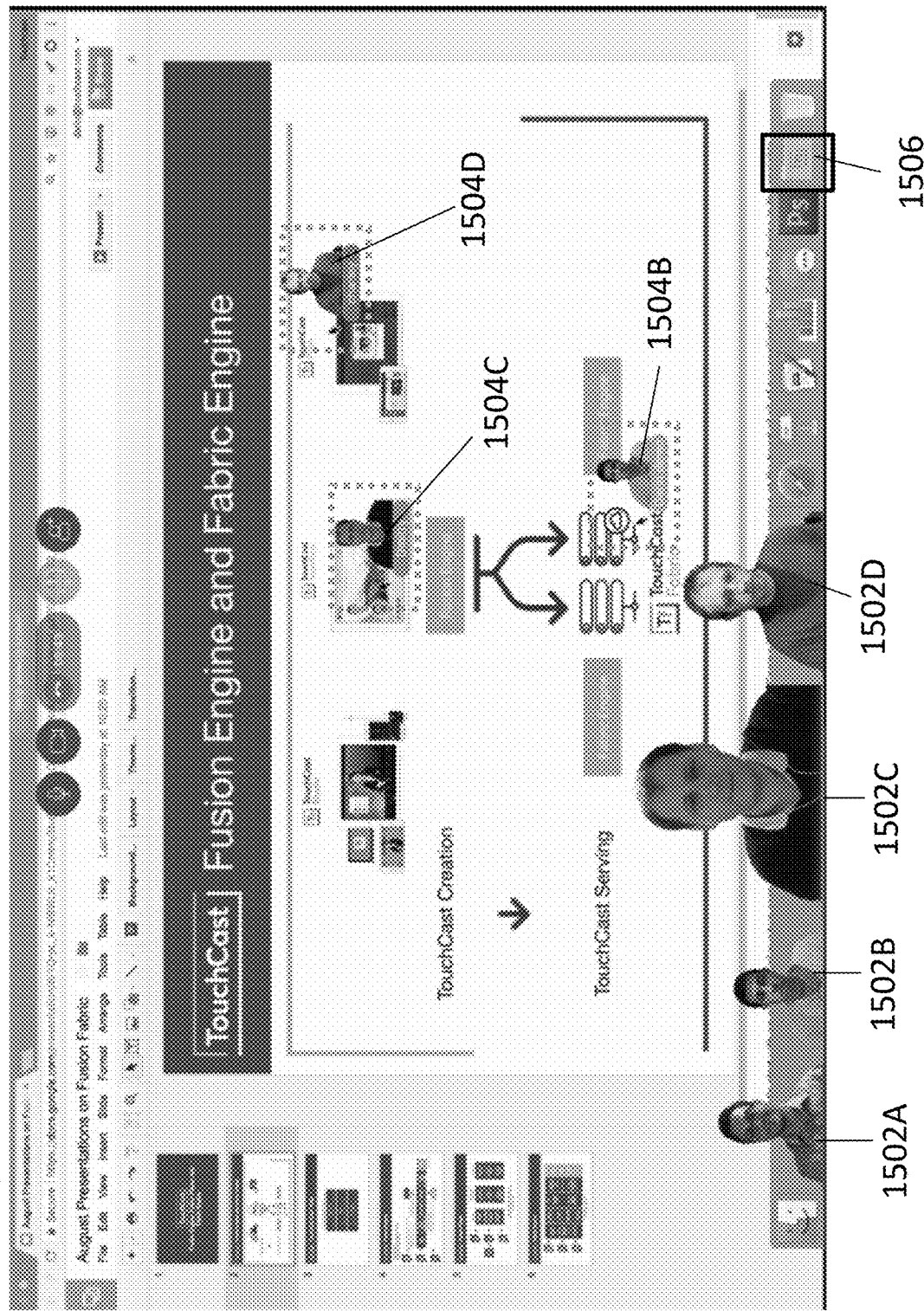
Figure 15F:
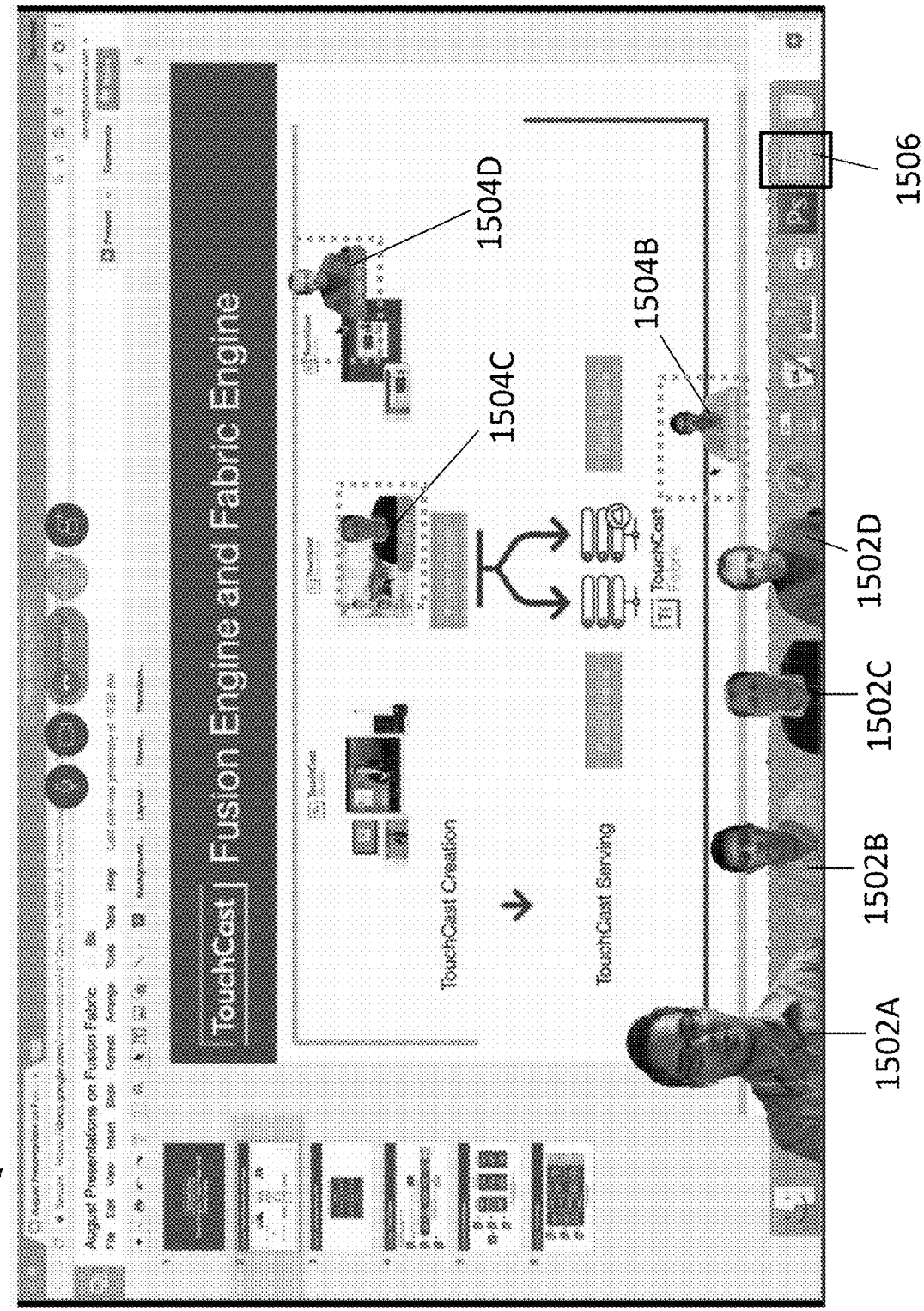
Figure 15G:
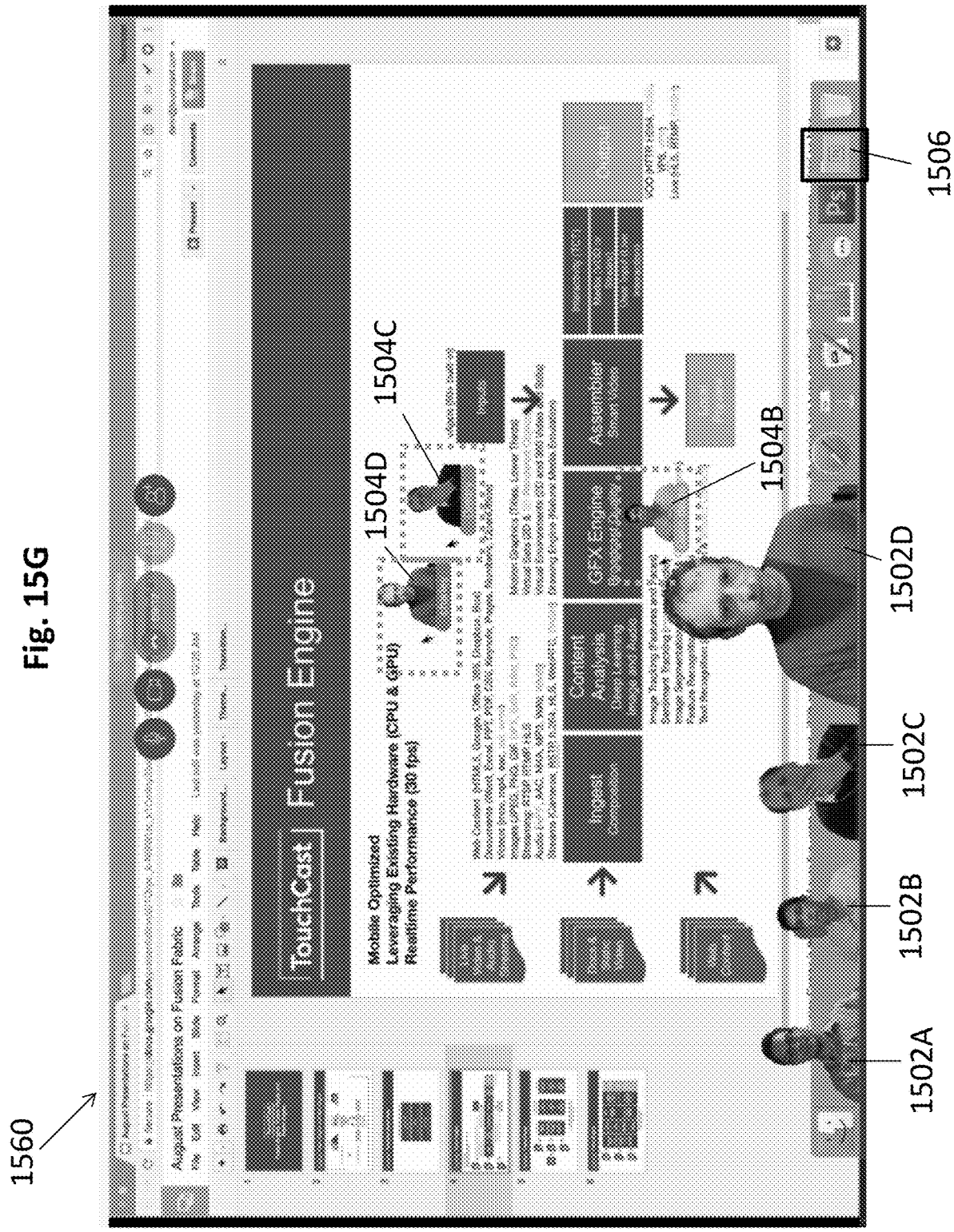

In one or more implementations, as a participant contributes in an interactive video conferencing session, such as by speaking, instructions are executed that cause the representation of the participant to be altered, such as in size, color, border, or other distinctive feature. In FIG. 15A, the respective representations 1502A, 1502B, 150C and 150D are similarly sized and positioned. In FIG. 15B, the participant associated with 1502B speaks and the respective representation is expanded in size to clearly identify that the participant associated with 1502B is speaking. In FIG. 15C, the four participants are not speaking, and all representations 1502A-1502D are similarly sized. In FIG. 15D, the participant associated with 1502B speaks again, and the respective representation is expanded in size to clearly identify that the participant associated with 1502B is speaking. In FIG. 15E, the participant associated with 1502C speaks and the respective representation is expanded in size to clearly identify that the participant associated with 1502C is speaking. In FIG. 15F, the participant associated with 1502A speaks and the respective representation is expanded in size to clearly identify that the participant associated with 1502A is speaking. In FIG. 15G, the participant associated with 1502D speaks and the respective representation is expanded in size to clearly identify that the participant associated with 1502D is speaking. Thus, the sequence shown in FIGS. 15A-15G illustrates how technology provided in accordance with the present application conveniently enables users to detect which participant is speaking at any given time.

Moreover, images 1504B, 1504C, and 1504D respectively correspond to representations 1502B, 1502C, and 1502D, and are positioned near or with corresponding pointers respectively controlled by each of the respective participants. As illustrated in FIGS. 15A-15G, the images 1504B, 1504C, and 1504D, are displayed at respective screen positions that correspond to locations where the users' selection pointers are located at each of the respective users' local devices. For example, as "Dmitry" (represented in 1502C) moves his selector device (e.g., mouse) around the screen of his local computing device during the interactive video conferencing session, corresponding content (e.g., audio/video content represented in 1502C) is provided at 1504C and substantially at the location corresponding to the user's selection pointer on his local computing device. As Dmitry moves, his pointer and corresponding content move as well. Moreover, as Dmitry speaks, for example, video content including moving images and audio is provided at 1502C and 1504C.

Thus, as illustrated in FIGS. 15A-15G, each of the respective users' pointers move about the display screen and each is correspondingly represented as a function of one or more images of the respective users at a predetermined distance from an arrow or other selection icon. As noted herein, in one or more implementations, representations of the respective users 1504B, 1504C, and 1504D is provided near or adjacent to their respective pointers, and can be "live" video feed that corresponds to the content provided at 1502B, 1502C, and 1502D. Movement of the respective pointers and content of 1504B, 1504C, and 1504D is shown in the sequence of drawings 15A-15G.

In addition, FIGS. 15A-15G include folder icon 1506 for file sharing and management, such as for documents, images, sound files, video, or other data and objects. As, noted herein, such files are often subject of interest in collaborative sessions, and the present application provides technology for participants to be provided with current versions of such files substantially in real time. As illustrated in FIGS. 15A-15G, folder icon 1506 is provided within the display screen of an interactive video conferencing session and provides a link to a mechanism for file access and sharing. For example, folder icon 1506 is formatted to appear as a folder, and is selectable to appear to operate as virtually any other folder on a participant's local computing device. For example, a user can work in a document, save the document, and then drag the document to the folder icon 1506. Unlike local computing device storage, such as a hard drive, however, a file that is dragged into the icon appearing as the folder causes one or more instructions to be executed by one or more processors that cause transmission of the file to each respective devices of participants, effectively maintaining files in sync for each of the participants.

FIG. 16 illustrates an alternative implementation, and shows display screen 1600 that includes three participants 1602A, 1602B, and 1602C. Unlike the implementation shown in FIGS. 15A-15G, the implementation shown in FIG. 16 does not include the representations 1602A, 1602B, and 1602C within the APPLE dock or WINDOWS taskbar. Instead, the representations are provided above and adjacent thereto. Moreover, ellipsis 1604 is illustrated that includes functionality for displaying, for example, other participants not currently displayed. By selecting ellipsis 1604, a list or other representation of participants (e.g., a thumbnail grid view or other view) is provided for selection. This is particularly useful, for example, for large interactive video conferencing sessions in which display of all participants is not practical. In one or more implementations, only a few participants, such as three participants, are displayed at a time. As a participant contributes, such as by speaking, then that participant replaces one of the participants being displayed. The order and selection of such participants can change dynamically, such as in response to a degree of contribution, whether a participant is a host of an interactive video conferencing session, or other criteria.

Figure 17A:
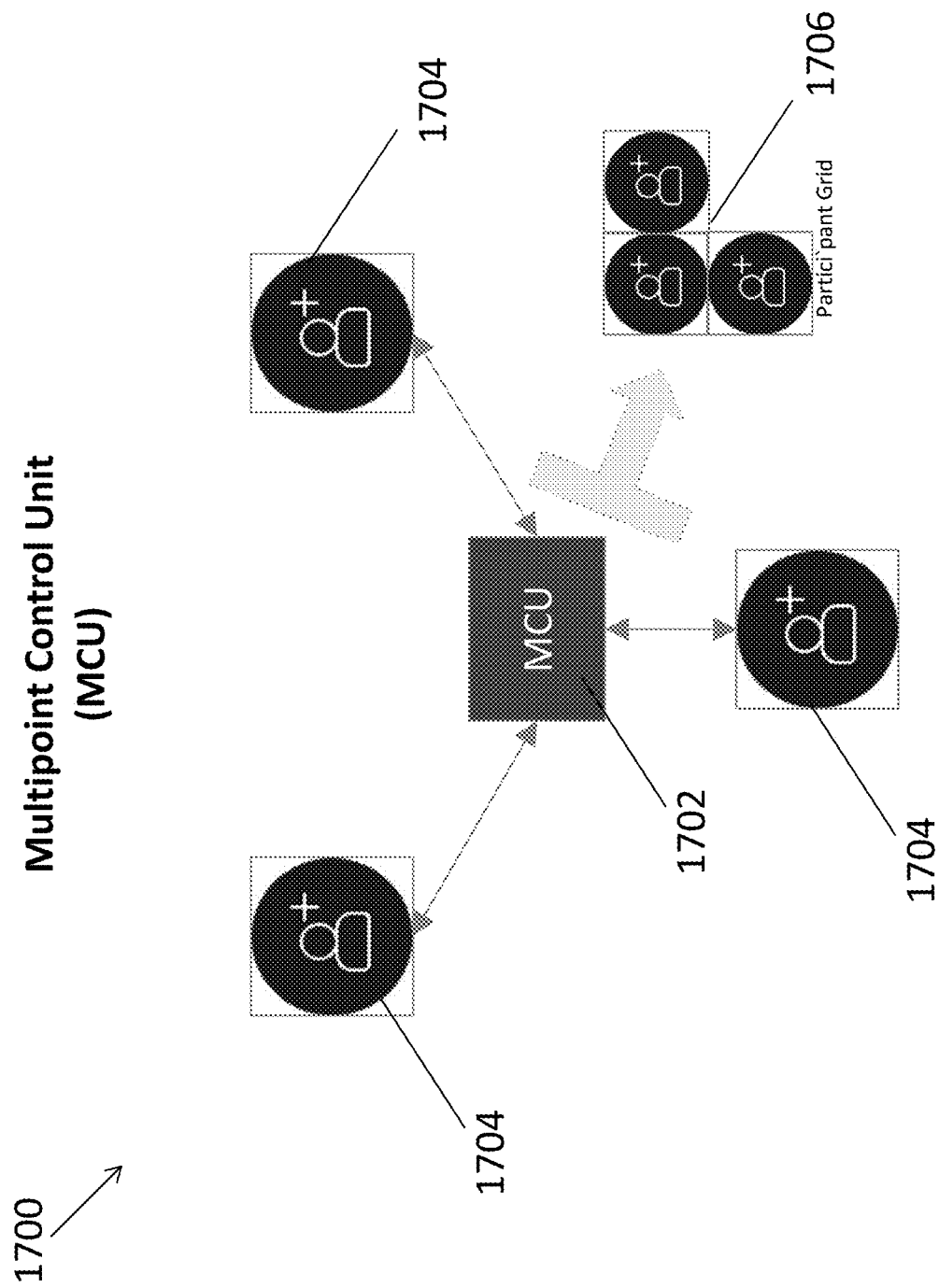
FIGS. 17A-17C are high-level block diagrams identifying respective collaboration approaches in accordance with implementations of the present application.

Thus, as shown and described herein, various representations of users of computing devices 104 that are connected by an interactive video conferencing session can be provided dynamically and intuitively to improve collaboration and communication, more generally. In accordance with the represent application, at least two architectures for collaboration are envisioned. Referring now to FIG. 17A, a block diagram 1700 illustrates an arrangement including a multipoint control unit ("MCU") 1702, which achieves an efficient network of transport with many participants by utilizing a central process intensive server. For example, each participant 1704 sends only one video stream to the central MCU 1702. Thereafter, the MCU 1702 creates a single composition of all participants and transmits a stream to all participants, such as in grid 1706. This architecture is particularly useful for large web conferences.

Figure 17B:
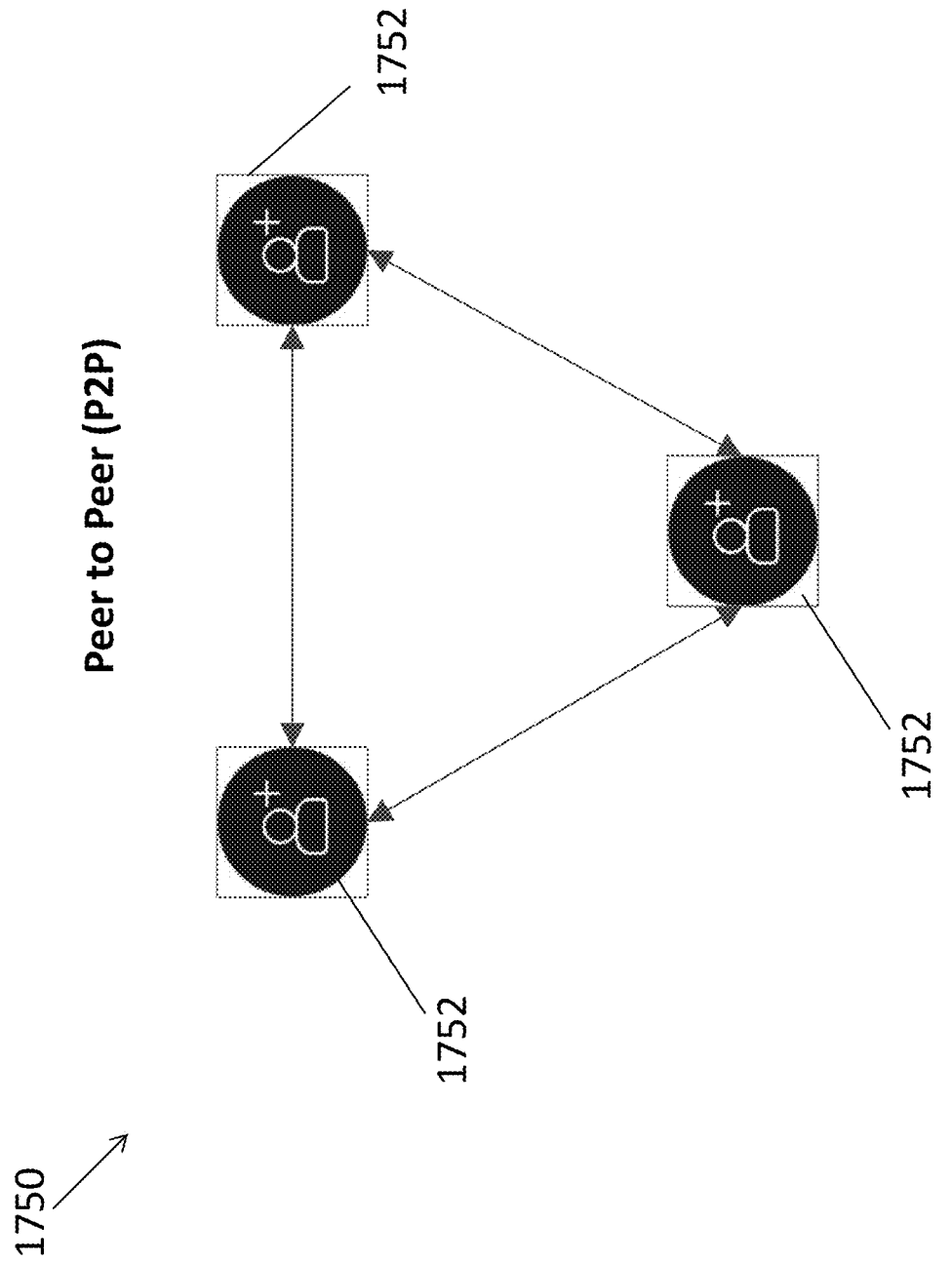
Figure 17C:
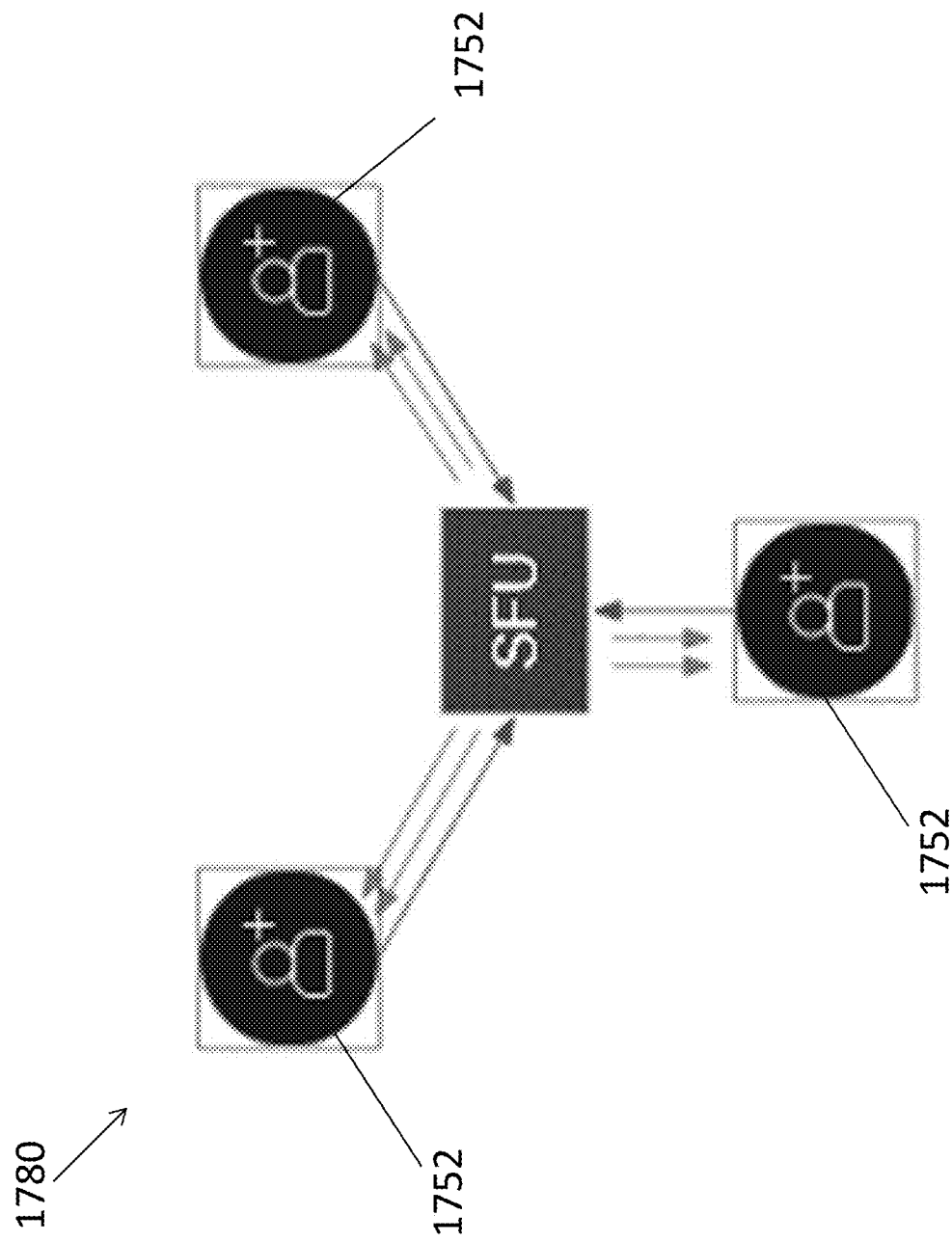

In an alternative arrangement and illustrated in FIG. 17B, a peer-to-peer ("P2P") removes the need for a central server, albeit potentially at a cost of less network performance in cases of many participants in an interactive video conferencing session. Accordingly, a P2P arrangement may be particularly useful for interactive video conferencing sessions with fewer participants. FIG. 17B is a block diagram illustrating a P2P arrangement 1750, in which each participant 1752 sends a video stream to every other participant 1752. Each participant 1752 receives a video from each other participant 1752. In view of potential bandwidth constraints, the P2P model can be ideal for small collaborative groups. FIG. 17C is a block diagram illustrating a Selective Forwarding Unit ("SFU") arrangement 1780, in which each participant 1782 sends one or more video streams of different sizes to a central SFU. The SFU determines the appropriate stream to send to participants 1782 based on each participant's request and bandwidth capabilities. In one or more implementations, participants 1782=1+ streams out, N−1 streams in. The SFU achieves central server scaling through optimized network traffic routing.

The implementation illustrated in FIG. 17C and described above is highly suitable for example, for large web conferences with a limited number of participants 1782 visible at any given time.

The present application can further include a feature that allows a user to simulate a laser pointer effect when presenting embedded content in a coordinated presentation. In an implementation, the on-board gyroscope provided with a mobile computing device, such as a smartphone, can be employed to locate where laser pointer functionality effectively should appear in a coordinated presentation. One or more elements within a coordinated presentation, in accordance with the present application, including in one or more vApps (substantially as shown and described in co-pending and commonly assigned patent application Ser. No. 14/316,536), can be interacted with as a function of the mobile computing device simulating a laser pointer. The user can perform various laser-pointer functionality, such as to navigate between slides, point to or identify respective portions of a display including in a coordinated presentation, or perform other automated tasks. The pointer can be moved around the screen as a function of the gyroscope within the mobile computing device.

In one or more implementations a mobile computing device that is configured with the MOBILE APP is configured to simulate the remote control, laser device and/or annotation and drawing tool. As noted herein, various vApps can be included in a respective interactive video conferencing session and can be manipulated (including pointed at) by a user using the remote control. This enables a user to be decoupled from the respective authoring platform, such as the iPad or other tablet computer, by using a simulated remote control, for example, across the room. In operation, for example, content that is curated, e.g., queued for inclusion in a video conferencing session, can be selected simply by pressing an option in a graphical user interface provided on the mobile computing device operating as the remote control. Interactive elements, e.g., vApps can be embedded in the conference session simply by the author selecting an option to include the element(s) in the remote control software app. The author can add and/or remove interactive elements by selecting options in the remote control app operating on the mobile computing device, which effectively frees the author from being tied to the authoring tool the iPad).

In addition users, or participants of a conferencing session of the present application can use a remote control, pointing and annotation functionality, including on their respective mobile computing devices (e.g., smartphones) to interact with coordinated presentations. For example, a viewer of a coordinated presentation can select a vApp during playback to be presented with the content therein, and thereafter highlight, draw on or perform other interactive functionality using the simulated remote control.

Thus, using the accelerometer and/or gyroscope in the smartphone or other mobile computing device, a virtual pointer, and annotating tool or other selection tool in a coordinated presentation can be remotely controlled. In this way, a smart hone or other mobile computing devices effectively doubles as a mouse, selection device, drawing tool or other interactive device. Unlike infrared or wired connection, the mobile computing device and coordinated presentation authoring/playback device preferably communicate over. The remote can ask the "master" device via Wi-Fi or other protocol, such as Bluetooth, for permission to connect therewith. The telematics of the mobile computing device, such as an accelerometer and/or gyroscope, is employed over a digital IP connection to transmit to the presentation authoring and/or playback software, which in turn functions to control a simulated laser red dot, drawing tool or other functionality, which can be configured as a core function of the presentation authoring and/or playback application.

In this way, a new form of remote control is provided by pairing a mobile computing device, such as a smartphone, with an authoring tool device, a display device, or other presentation device. Various functionality provided in connection with coordinated presentations, such as controlling teleprompters (e.g., speed), green screen functionality, whiteboard functionality, titles, interactive Web-based content, or the like, can be selected and controlled vis-à-vis the remote control in connection with the present application. As shown and described herein, the present application further provides for simulating laser pointer control, annotation and drawing devices, such as for controlling publicly viewed or accessible displays. In addition to controlling a privately viewed coordinated presentation, the present application is also useful for public speaking or other public presentation activities. Thus, in addition to remote control functionality, the present application supports simulation of a laser pointer, annotation and drawing tool.

Thus, as shown and described herein, the present application provides a simple to use, yet powerful interactive remote video conferencing platform that incorporates a plurality of computing devices, e.g., smartphones, tablets, laptops and desktops, and enables live, real-time sharing and conferencing. One or more televisions 112 can be implemented in the present application via an Internet media extender 110, and content can be provided from a plurality of remote sources, such as cameras and/or microphones configured with user computing devices 104 that are located remotely and communicating over the Internet.

Figure 18:
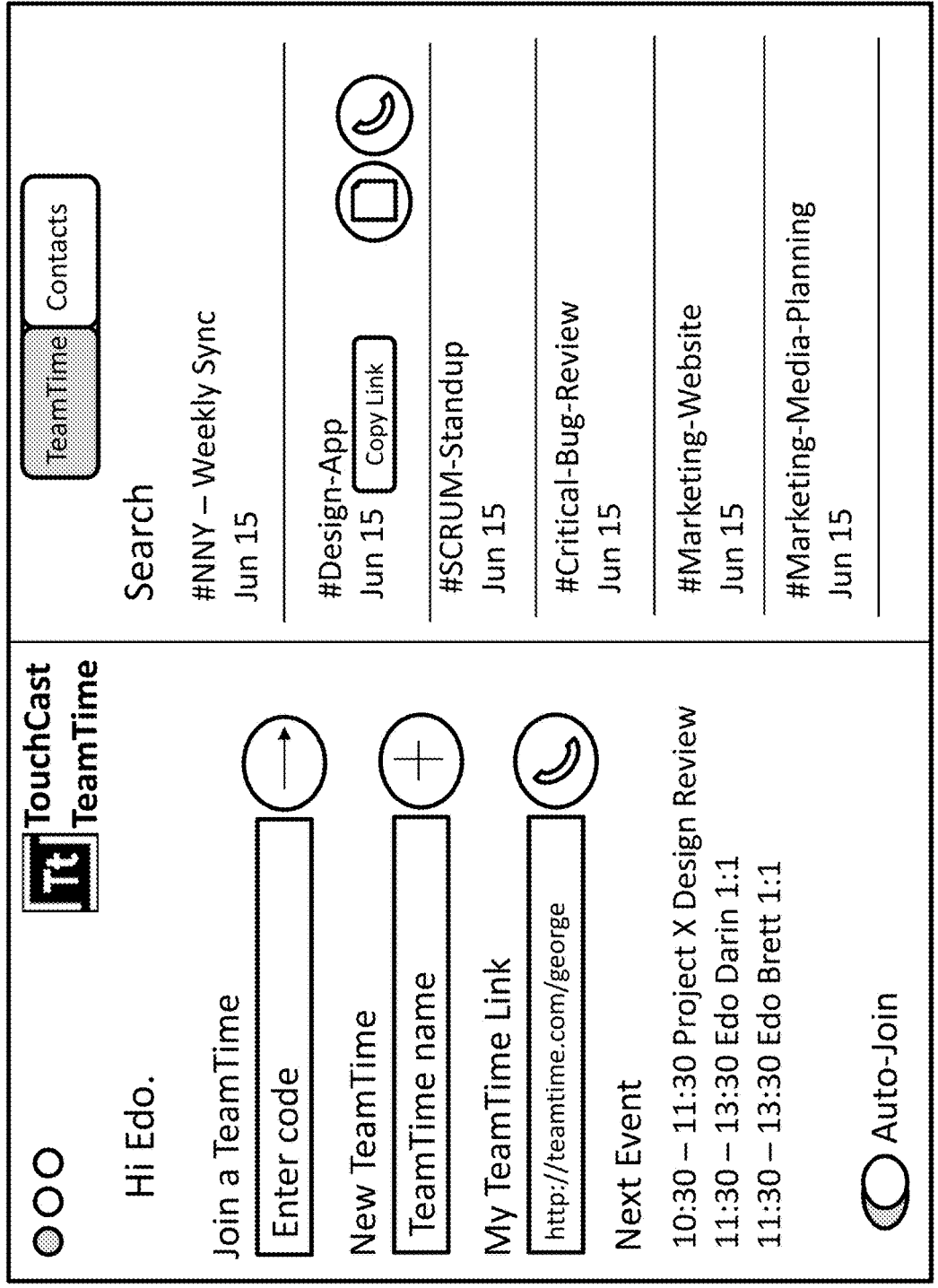
FIG. 18 illustrates an example data entry display screen including a user interface that is provided in accordance with an implementation of the present application.

FIG. 18 illustrates an example data entry display screen 1800 that is provided in accordance with an implementation of the present application. As shown in FIG. 18, a graphical user interface is provided for the user, "Edo," who is prompted to join an interactive video conference session (shown as "TeamTime"). In the example shown in display screen 1800, the user is prompted to enter the UEI ("code") and select an arrow to join the session. Moreover, the user is prompted to enter a new interactive video conference session ("New TeamTime") name and a hyperlink to the new session. Moreover, scheduling information is provided, and the next interactive video conference session ("event") is provided, along with a configuration setting to enable the user's computing device to auto-join the session. In addition, the user can select an option to filter for interactive conference sessions, and search for future session, such designated using hashtags and dates. Moreover, a contact filter option is provided, which enables access to the user's contacts, and the user can search for and invite contacts to one or more interactive video conference sessions. Also illustrated in FIG. 18 are options to connect to interactive video conference sessions (e.g., via telephone), and to access and/or upload content, such as documents, for sharing in the conference.

Thus, the present application includes robust options for joining, adding and contributing content in and for interactive video conference sessions.

Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present application.

What is claimed is:

1. A system for providing respectively customizable interactive audio/video content to each of a plurality of computing devices during a networked communication session, the system comprising:
   non-transitory processor readable media;
   at least one processor operatively coupled to the non-transitory processor readable media, wherein the non-transitory processor readable media have instructions that, when executed by the at least one processor, causes the at least one processor to perform the following steps:
   access, from the plurality of computing devices, metadata;
   process the metadata to effect predictive intelligence and automatically provide access to the networked communication session to each of the plurality of computing devices, for which access the plurality of computing devices use to join the networked communication session automatically and without input from users of the plurality of computing devices;
   receive from each of the plurality of computing devices, audio and video content representing each respective user of the plurality of devices, wherein the audio content is captured via a microphone and the video content is captured via a camera respectively operable with each of the plurality of computing devices;
   generate a composited interactive audio/video feed including the audio and video content received from each of the plurality of computing devices during the networked communication session;
   transmit to each of the plurality of computing devices during the networked communication session the composited interactive audio/video feed;
   periodically receive, from each of at least some of the plurality of computing devices, updated respective audio and video content captured by the microphone and camera respectively operable with each of the at least some of the computing devices;
   revise the composited interactive audio/video feed with at least one of the updated audio and video content received from each of the at least some computing devices during the networked communication session; and
   transmit to each of the plurality of computing devices during the networked communication session the revised composited interactive audio/video feed, thereby providing updated multi-camera and multi-microphone content to each of the plurality of computing devices during the network session.

2. The system of claim 1, wherein the non-transitory processor readable media have further instructions that, when executed by the at least one processor, causes the at least one processor to:
   detect a change in audio content from one of the computing devices; and
   revise the composited interactive audio/video feed by altering the format of some of the video content received from the one of the computing devices.

3. The system of claim 2, wherein the altered format includes enlarging the height and width of at least some of the revised composited interactive audio/video feed associated with the video content received from the one of the computing devices.

4. The system of claim 1, wherein the non-transitory processor readable media have further instructions that, when executed by the at least one processor, causes the at least one processor to:
   receive, from one the plurality of computing devices, information representing at least one video application ("vApp") that, when executed by the one computing device and/or at least one additional computing device, results in functionality, information and/or content to be provided during the networked communication session; and
   transmit, to at least one computing device during the network session, vApp identification information representing the at least one vApp, wherein the vApp identification information is usable to access the vApp and/or configure the at least one computing device to execute the vApp.

5. The system of claim 1, wherein the non-transitory processor readable media have further instructions that, when executed by the at least one processor, causes the at least one processor to:
   detect from each of the at least some of the computing devices a respective position of a pointer respectively associated with each of the at least some of the computing devices; and
   provide, at corresponding locations in a gesture-based user interface configured with each of the at least one additional computing device, the received video content respectively received from each of the at least some of the computing devices.

6. The system of claim 1, wherein the non-transitory processor readable media have further instructions that, when executed by the at least one processor, causes the at least one processor to:
   automatically adjust volume levels associated with each of the respective audio content received from each of the respective computing devices in the generated composited interactive audio/video feed and/or the revised composited interactive audio/video feed.

7. The system of claim 1, wherein at least one of the computing devices communicate on the networked communication session via one or more of Real Time Streaming Protocol, Web Real-Time Communication and/or hypertext transport protocol live streaming.

8. The system of claim 1, wherein the non-transitory processor readable media have further instructions that, when executed by the at least one processor, causes the at least one processor to:
   control the distribution of audio/video input from at least one of the first user computing device and each of the at least one additional user computing device, wherein controlling the distribution includes including or preventing audio and/or video content received from one of the user computing devices in the composite audio/video feed.

9. A method for providing respectively customizable interactive audio/video content to each of a plurality of computing devices during a networked communication session, the method comprising:
   accessing, by at least one processor configured by executing instructions on non-transitory processor readable media, from the plurality of computing devices, metadata;
   processing, by the at least one processor, the metadata to effect predictive intelligence and automatically providing, by the at least one processor, access to the networked communication session to each of a plurality of computing devices, for which access the plurality of computing devices use to join the networked communication session automatically and without input from users of the plurality of computing devices;

receiving, by the at least one processor from each of the plurality of computing devices, audio and video content representing each respective user of the plurality of devices, wherein the audio content is captured via a microphone and the video content is captured via a camera respectively operable with each plurality of computing devices;

generating, by the at least one processor, a composited interactive audio/video feed including the audio and video content received from each of the plurality of computing devices during the networked communication session;

transmitting, by the at least one processor, to each of the plurality of computing devices during the networked communication session the composited interactive audio/video feed;

periodically receiving, by the at least one processor from each of at least some of the plurality of computing devices, updated respective audio and video content captured by the microphone and camera respectively operable with each of the at least some of the computing devices;

revising, by the at least one processor, the composited interactive audio/video feed with at least one of the updated audio and video content received from each of the at least some computing devices during the networked communication session; and transmitting, by the at least one processor, to each of the plurality of computing devices during the networked communication session the revised composited interactive audio/video feed, thereby providing updated multi-camera and multi-microphone content to each of the plurality of computing devices during the network session.

10. The method of claim 9, further comprising:

detecting, by the at least one processor, a change in audio content from one of the computing devices; and revising, by the at least one processor, the composited interactive audio/video feed by altering the format of some of the video content received from the one of the computing devices.

11. The method of claim 10, wherein altering the format includes enlarging the height and width of at least some of the revised composited interactive audio/video feed associated with the video content received from the one of the computing devices.

12. The method of claim 9, further comprising:

receiving, by the at least one processor from one the plurality of computing devices, information representing at least one video application ("vApp") that, when executed by the one computing device and/or at least one additional computing device, results in functionality, information and/or content to be provided during the networked communication session; and transmitting, by the at least one processor to at least one computing device during the network session, vApp identification information representing the at least one vApp, wherein the vApp identification information is usable to access the vApp and/or configure the at least one computing device to execute the vApp.

13. The method of claim 9, further comprising:

detecting, by the at least one processor from each of the at least some of the computing devices a respective position of a pointer respectively associated with each of the at least some of the computing devices; and providing, by the at least one processor at corresponding locations in a gesture-based user interface configured with each of the at least one additional computing device, the received video content respectively received from each of the at least some of the computing devices.

14. The method of claim 9, further comprising:

automatically adjusting, by the at least one processor, volume levels associated with each of the respective audio content received from each of the respective computing devices in the generated composited interactive audio/video feed and/or the revised composited interactive audio/video feed.

15. The method of claim 9, wherein at least one of the computing devices communicate on the networked communication session via one or more of Real Time Streaming Protocol, Web Real-Time Communication and/or hypertext transport protocol live streaming.

16. The method of claim 9, further comprising:

controlling, by the at least one processor, the distribution of audio/video input from at least one of the at least some of the computing devices by including or preventing the received audio and/or video content in the composite audio/video feed.

\* \* \* \* \*